(12) United States Patent
Kim et al.

(10) Patent No.: US 11,564,523 B2
(45) Date of Patent: Jan. 31, 2023

(54) JUICER

(71) Applicant: HUROM Co., Ltd., Gimhae-si (KR)

(72) Inventors: Young Ki Kim, Gimhae-si (KR); Soo Hee Yea, Changwon-si (KR); Sung Ha Jung, Gimhae-si (KR); Dae Il Kim, Gimhae-si (KR); Sang Min An, Gimhae-si (KR); Chang Ho Han, Changwon-si (KR); Jae Hong Ham, Busan (KR); Seung Min Yeo, Gimhae-si (KR)

(73) Assignee: Hurom Co., Ltd., Gimhae-si (KR)

( * ) Notice: Subject to any disclaimer, the term of this patent is extended or adjusted under 35 U.S.C. 154(b) by 0 days.

(21) Appl. No.: 16/972,802

(22) PCT Filed: Oct. 14, 2020

(86) PCT No.: PCT/KR2020/013987
§ 371 (c)(1),
(2) Date: Dec. 7, 2020

(87) PCT Pub. No.: WO2021/080234
PCT Pub. Date: Apr. 29, 2021

(65) Prior Publication Data
US 2022/0240708 A1    Aug. 4, 2022

(30) Foreign Application Priority Data

Oct. 22, 2019  (KR) .................. 20-2019-0004271
Jun. 29, 2020  (KR) .................. 20-2020-0002250

(51) Int. Cl.
*A47J 19/02*     (2006.01)
*A47J 19/06*     (2006.01)
*A23N 1/02*      (2006.01)

(52) U.S. Cl.
CPC .............. *A47J 19/025* (2013.01); *A23N 1/02* (2013.01); *A47J 19/06* (2013.01)

(58) Field of Classification Search
CPC .. A23N 1/02; A23N 1/003; A23N 1/00; A47J 19/02; A47J 19/025; A47J 19/06; A47J 43/07
(Continued)

(56) References Cited

U.S. PATENT DOCUMENTS

2014/0053741 A1    2/2014  Chou
2014/0283693 A1*   9/2014  Raude ..................... A23N 1/02
                                                      99/513
2019/0125118 A1    5/2019  Han et al.

FOREIGN PATENT DOCUMENTS

CN        208371484 U       1/2019
CN        208425996 U       1/2019
(Continued)

OTHER PUBLICATIONS

Office Action dated Aug. 30, 2022 in Korean Application No. 20-2021-0002574.
(Continued)

*Primary Examiner* — Reginald Alexander
(74) *Attorney, Agent, or Firm* — Saliwanchik, Lloyd & Eisenschenk

(57) ABSTRACT

The present disclosure relates to juice extractor comprising a cutting part for cutting a material for juice extraction beforehand by rotation above a screw, wherein the cutting part is formed in a dual structure of a core body and an outer shell covering the outer side of the core body with a material different from the core body.

19 Claims, 59 Drawing Sheets

(58) Field of Classification Search
USPC .................................................. 99/510, 513
See application file for complete search history.

(56) References Cited

FOREIGN PATENT DOCUMENTS

| | | | | | |
|---|---|---|---|---|---|
| CN | 208693083 | U | 4/2019 | | |
| CN | 208740618 | U | 4/2019 | | |
| CN | 209220038 | U | 8/2019 | | |
| DE | 102018212162 | B4 * | 6/2020 | ............ | A47J 19/025 |
| JP | 3205673 | U | 8/2016 | | |
| KR | 1997-0005239 | Y1 | 5/1997 | | |
| KR | 20-0262463 | Y1 | 3/2002 | | |
| KR | 2002-0023988 | A | 3/2002 | | |
| KR | 10-2003-0092817 | A | 12/2003 | | |
| KR | 10-0793852 | B1 | 1/2008 | | |
| KR | 10-0966608 | B1 | 6/2010 | | |
| KR | 10-2010-0083725 | A | 7/2010 | | |
| KR | 10-2012-0086609 | A | 8/2012 | | |
| KR | 10-2013-0083958 | A | 7/2013 | | |
| KR | 10-2014-0097344 | A | 8/2014 | | |
| KR | 10-2015-0030391 | A | 3/2015 | | |
| KR | 1020150053028 | | * 5/2015 | .............. | A47J 19/02 |
| KR | 10-2015-0094102 | A | 8/2015 | | |
| KR | 10-1541829 | B1 | 8/2015 | | |
| KR | 10-2015-0130799 | A | 11/2015 | | |
| KR | 10-1682100 | B1 | 12/2016 | | |
| KR | 10-2017-0019221 | A | 2/2017 | | |
| KR | 10-2017-0069577 | A | 6/2017 | | |
| KR | 10-2017-0127754 | A | 11/2017 | | |
| KR | 10-2018-0057480 | A | 5/2018 | | |
| KR | 20-0489601 | Y1 | 7/2019 | | |
| KR | 10-2020-0005626 | A | 1/2020 | | |
| WO | WO-2018/226008 | A1 | 12/2018 | | |
| WO | WO-2019153713 | A1 * | 8/2019 | .............. | A47J 19/02 |

OTHER PUBLICATIONS

Office Action dated Oct. 26, 2022 in Korean Application No. 20-2021-0002562.

Supplementary European Search Report dated Nov. 8, 2022 in European Application No. 20816075.4.

* cited by examiner

FIG. 9a
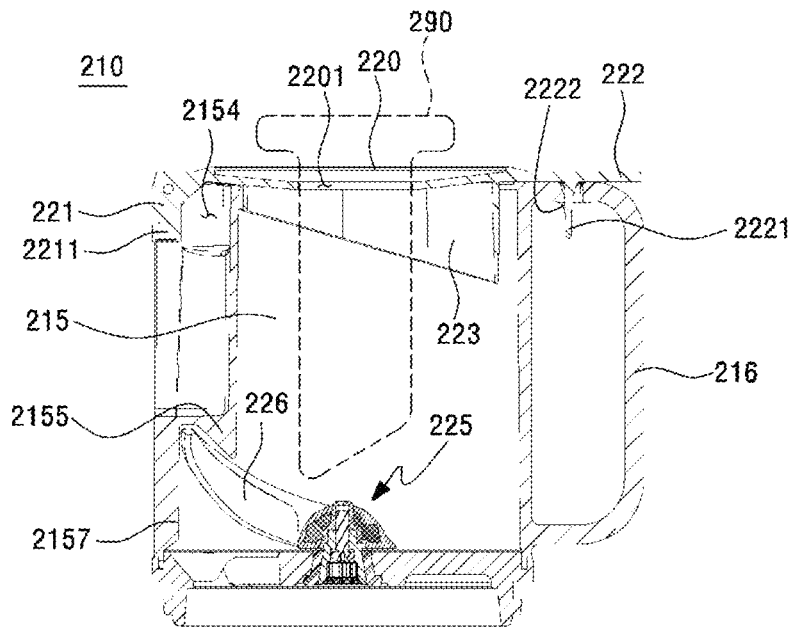
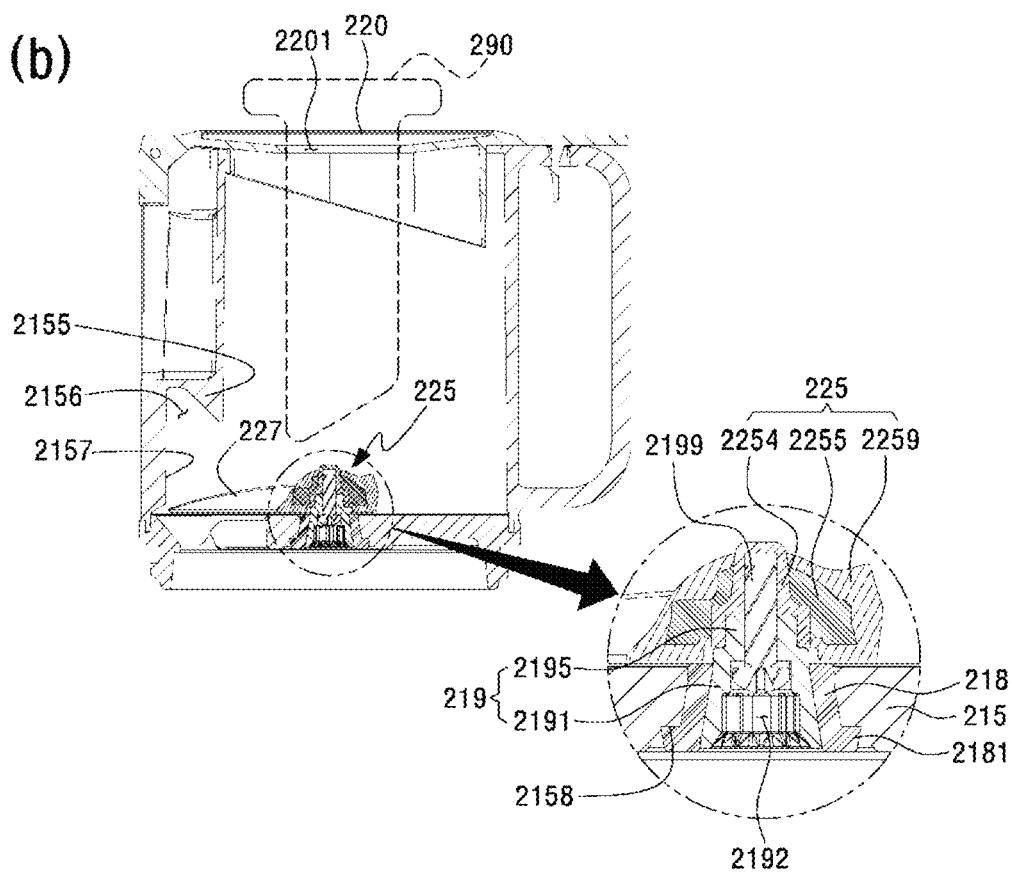
FIG. 9b

FIG. 10a
(a)
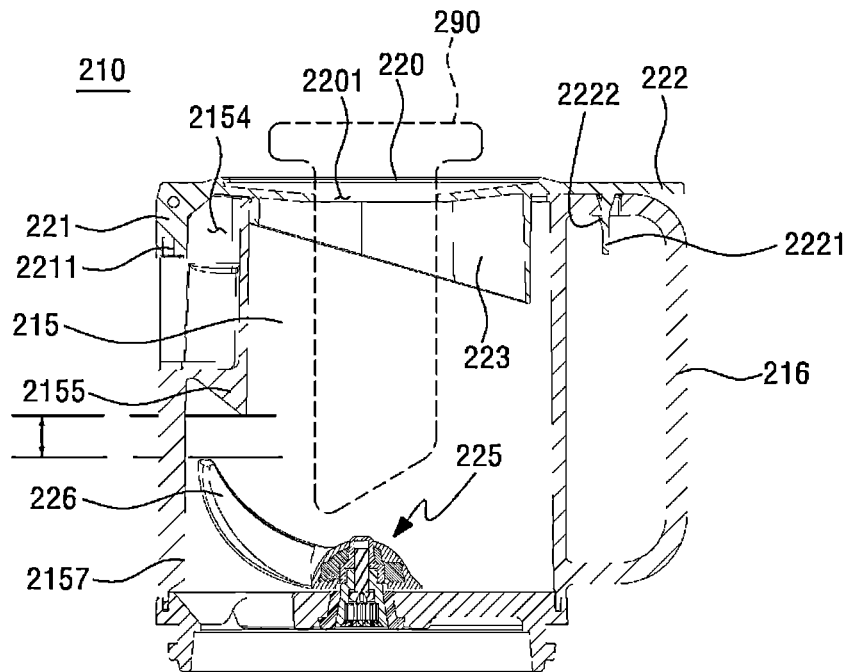
(b)
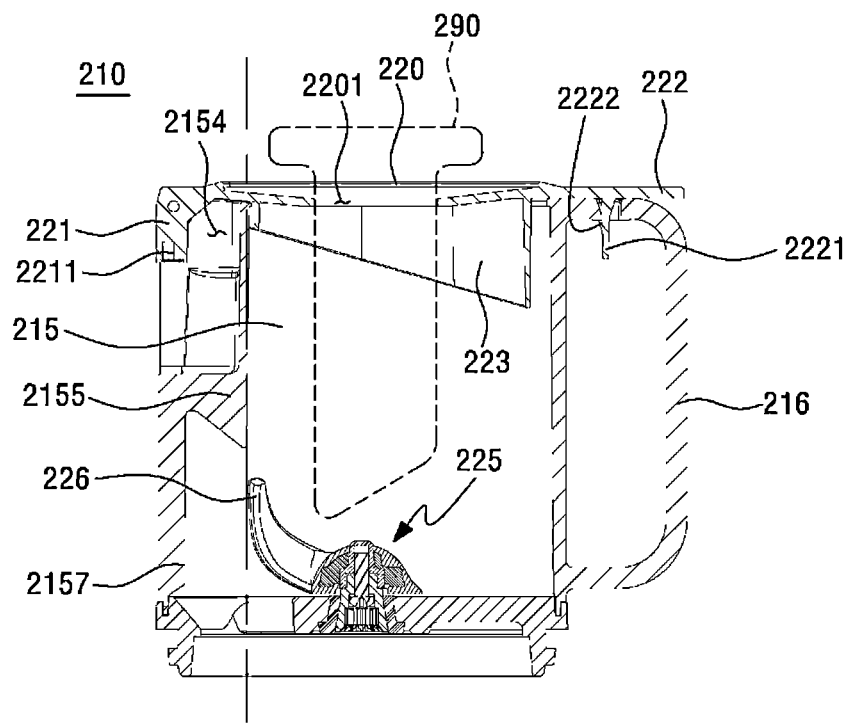
FIG. 10b

FIG. 16a
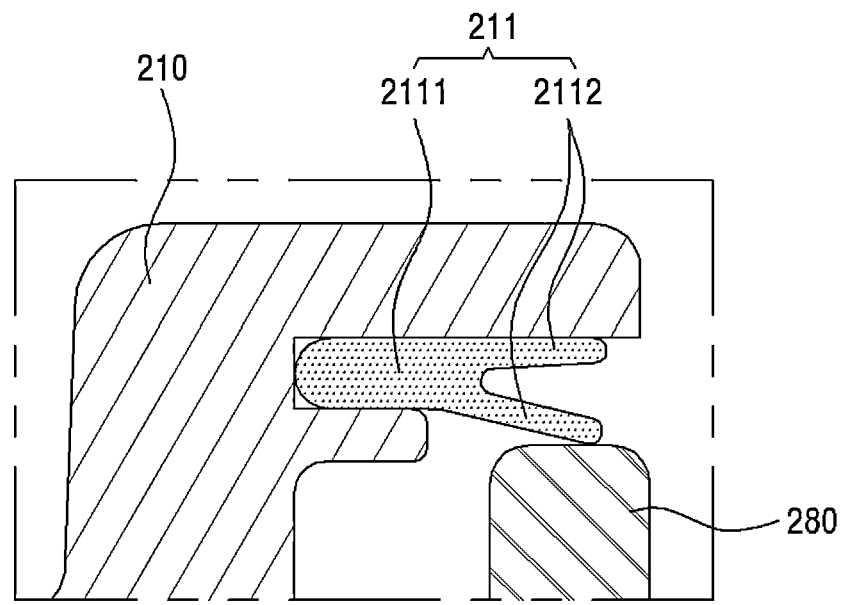
(a)
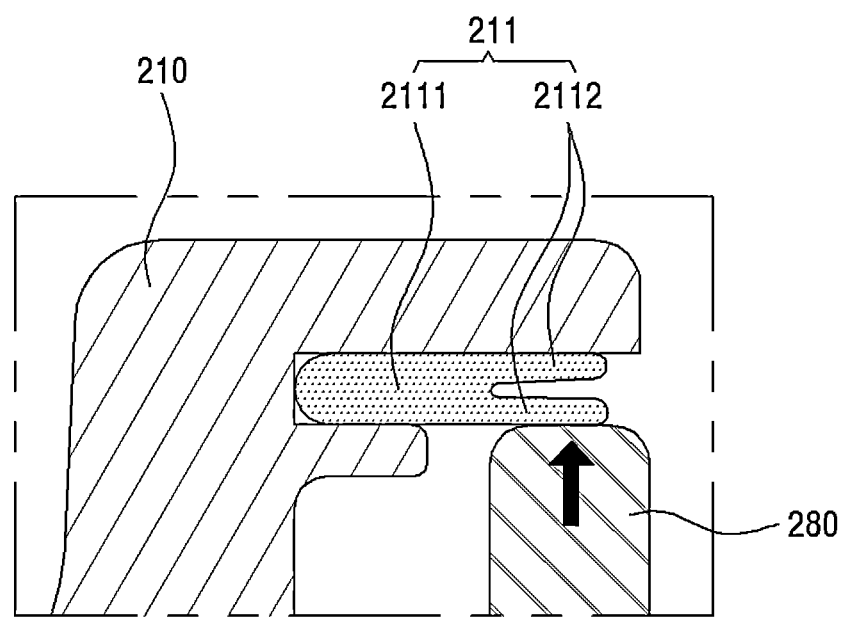
(b)
FIG. 16b

FIG. 30a
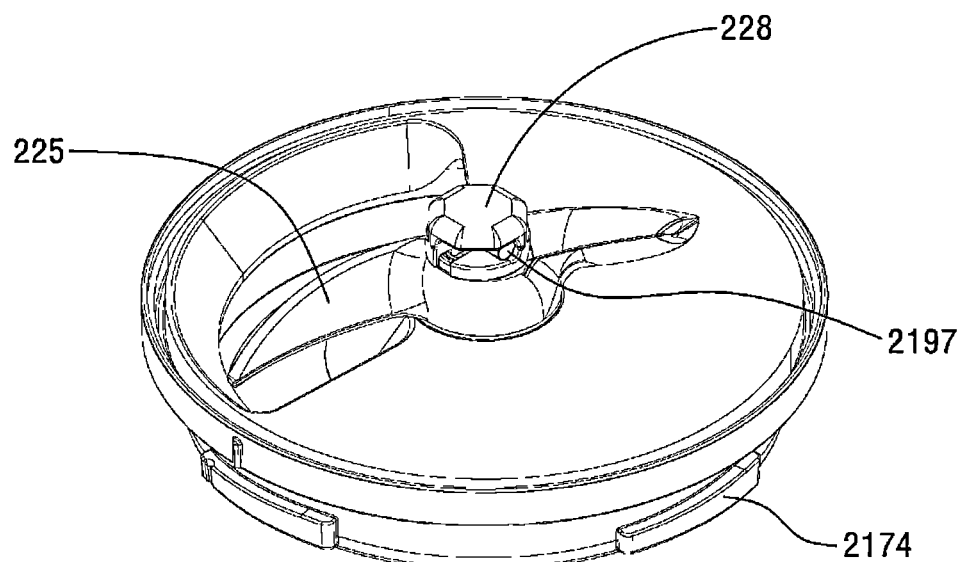
(a)
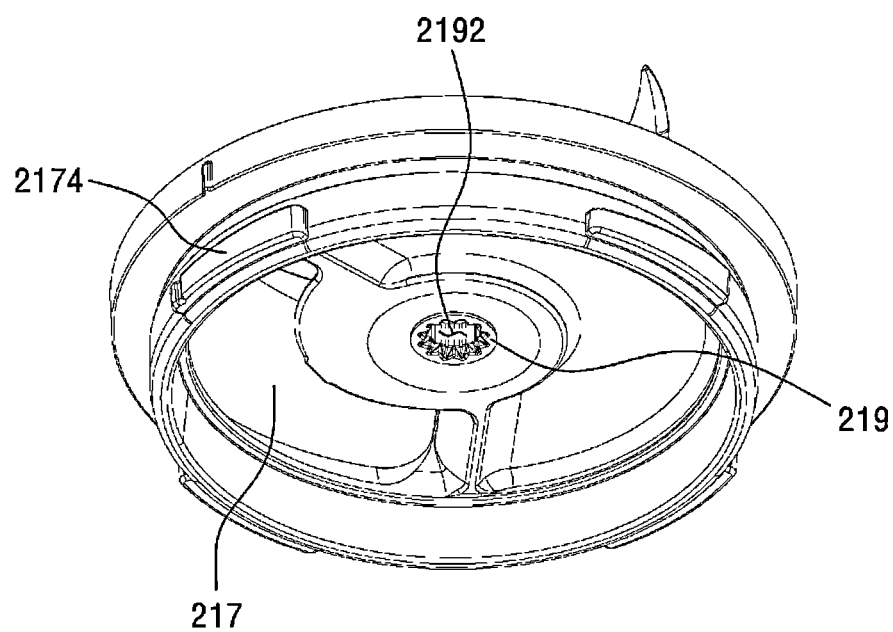
(b)
FIG. 30b

FIG. 33a
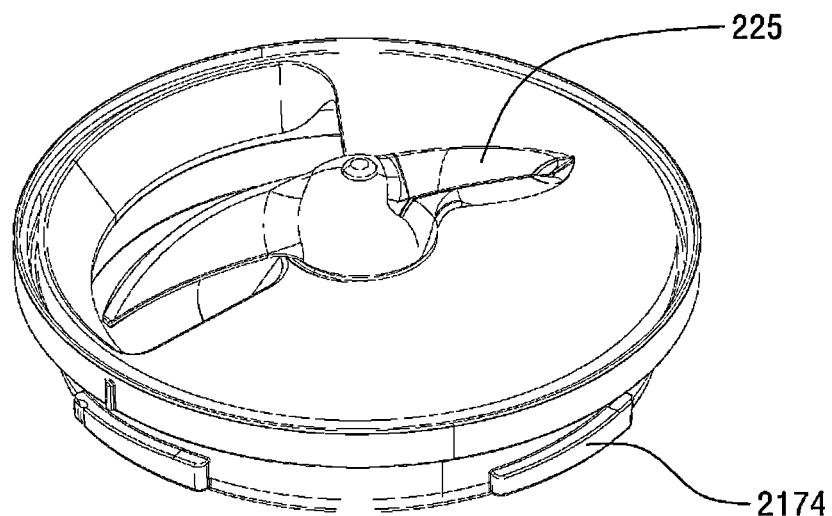
(a)
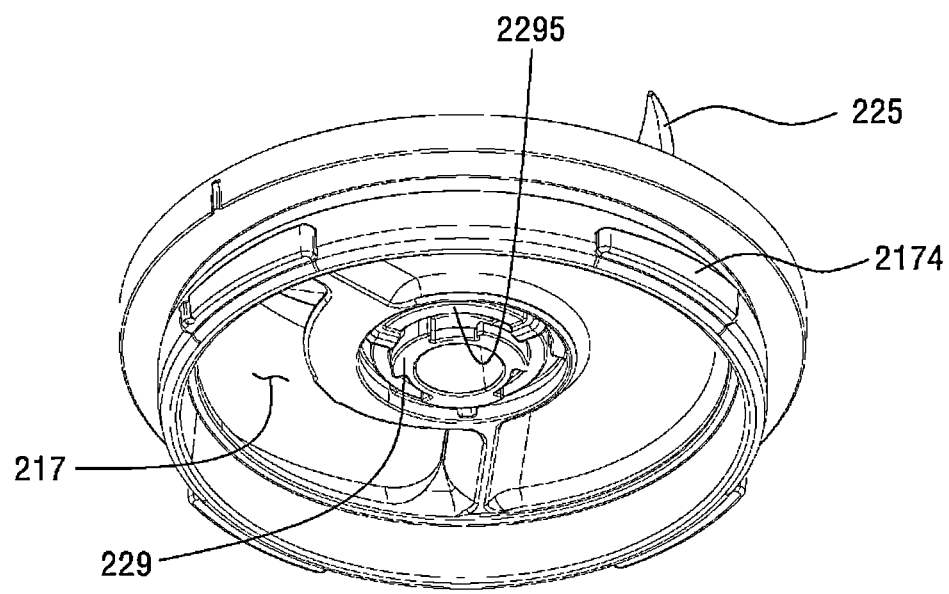
(b)
FIG. 33b

FIG. 36a
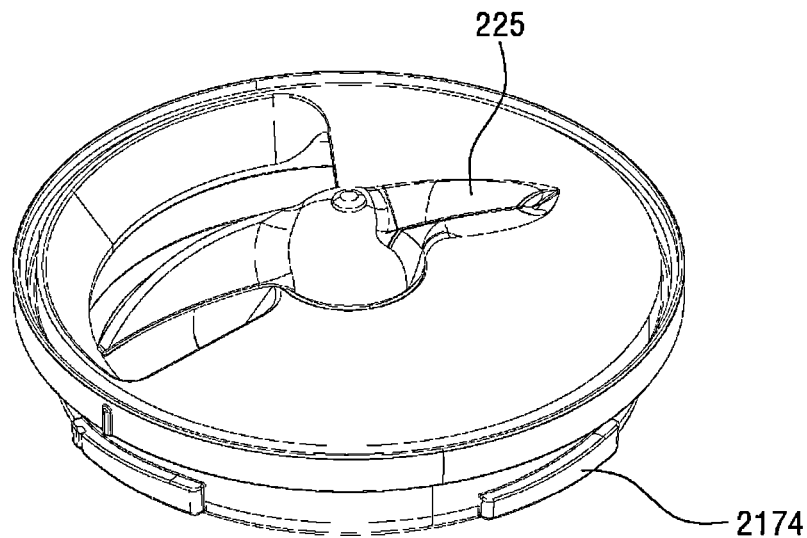
(a)
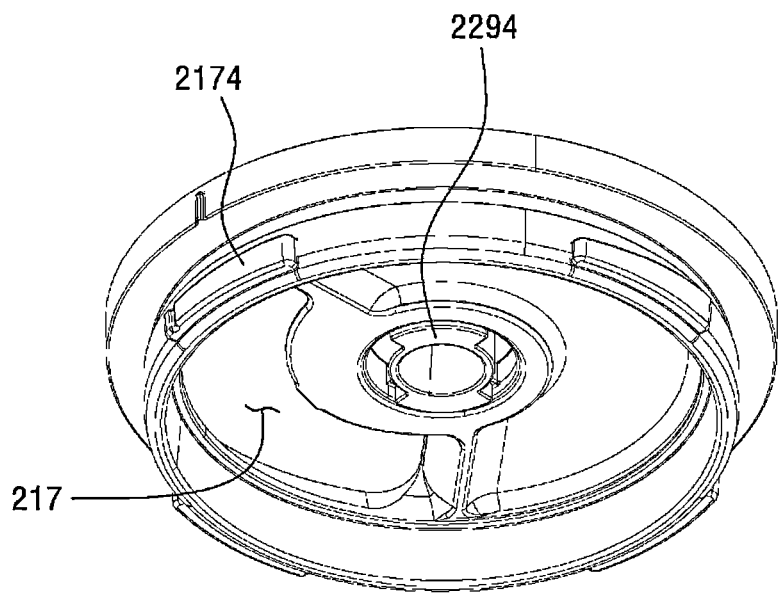
(b)
FIG. 36b

FIG. 51a
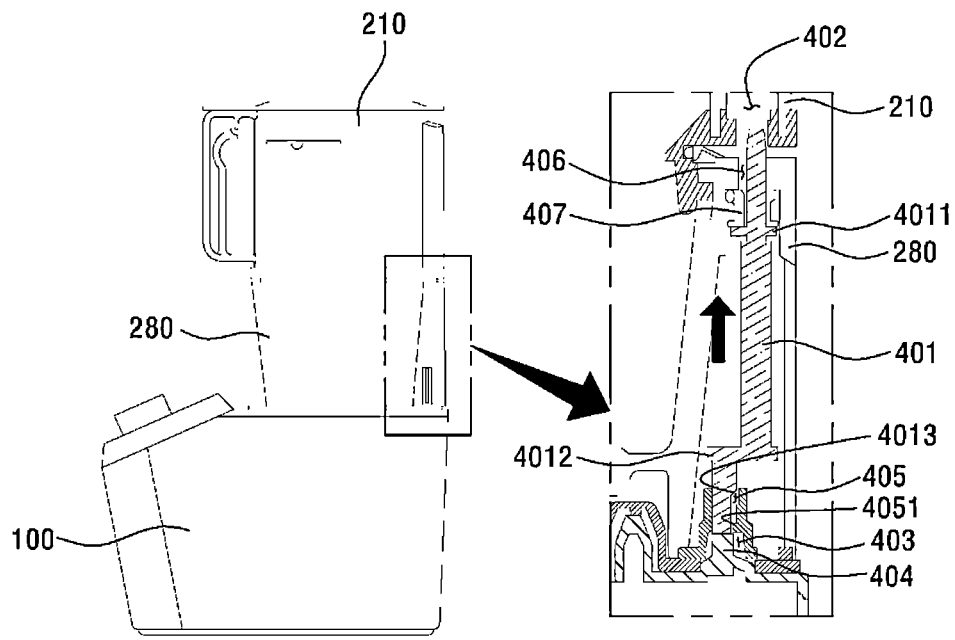
(a)
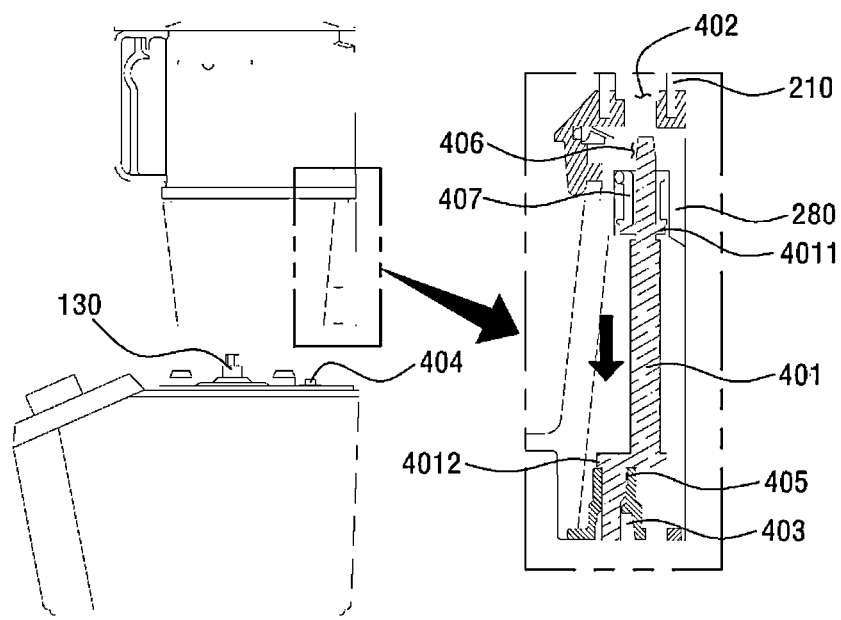
(b)
FIG. 51b

FIG. 52a
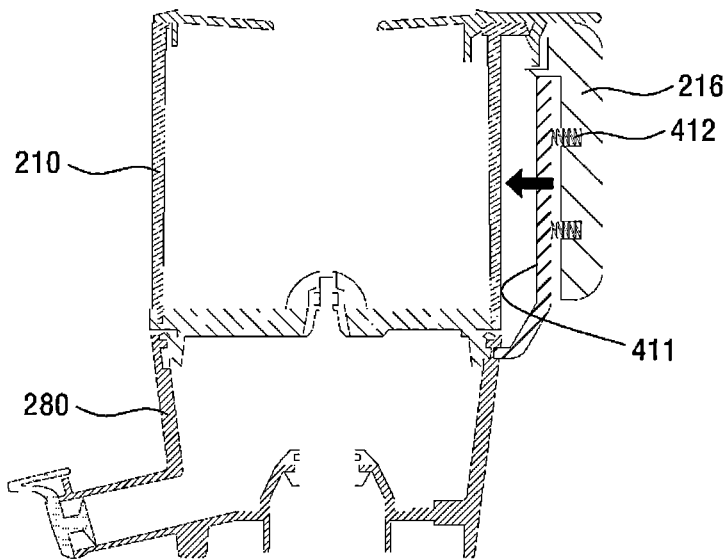
(a)
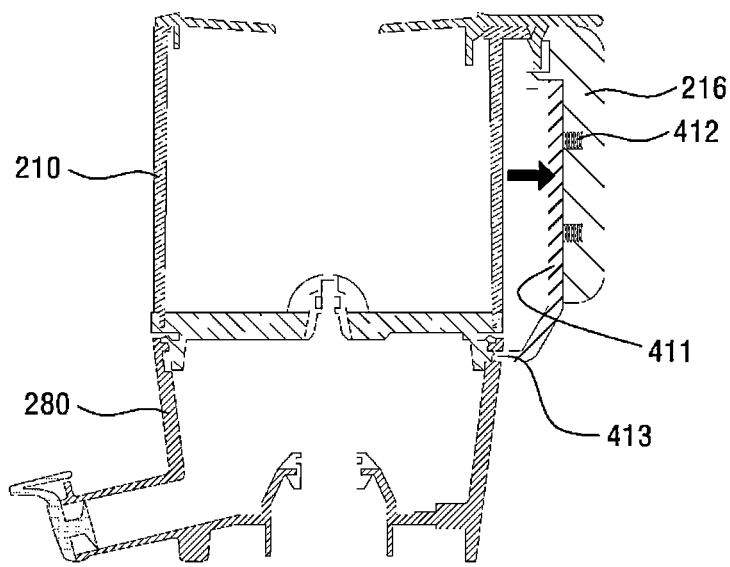
(b)
FIG. 52b

FIG. 53a
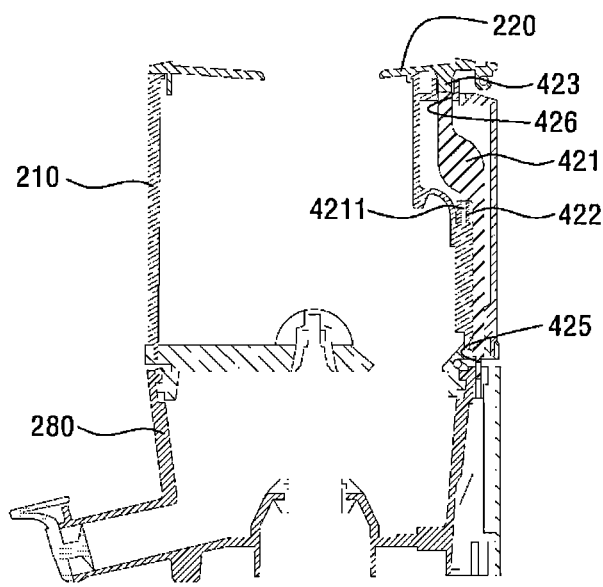
(a)
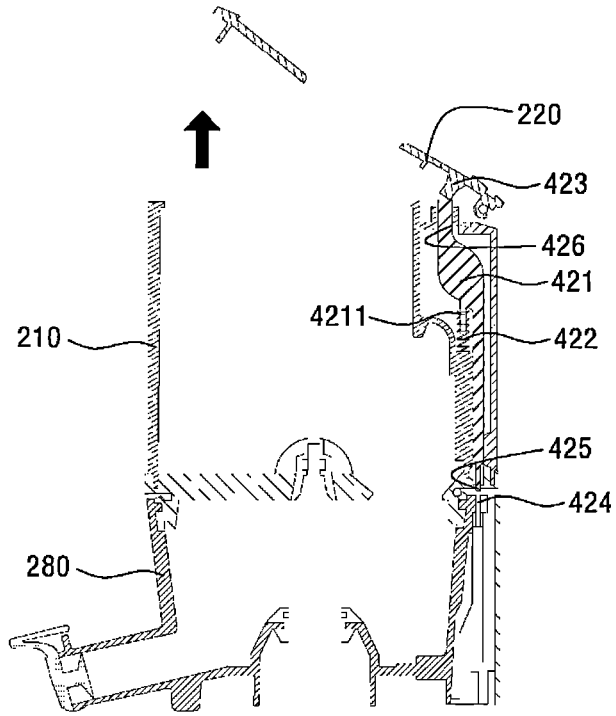
(b)
FIG. 53b

FIG. 54a
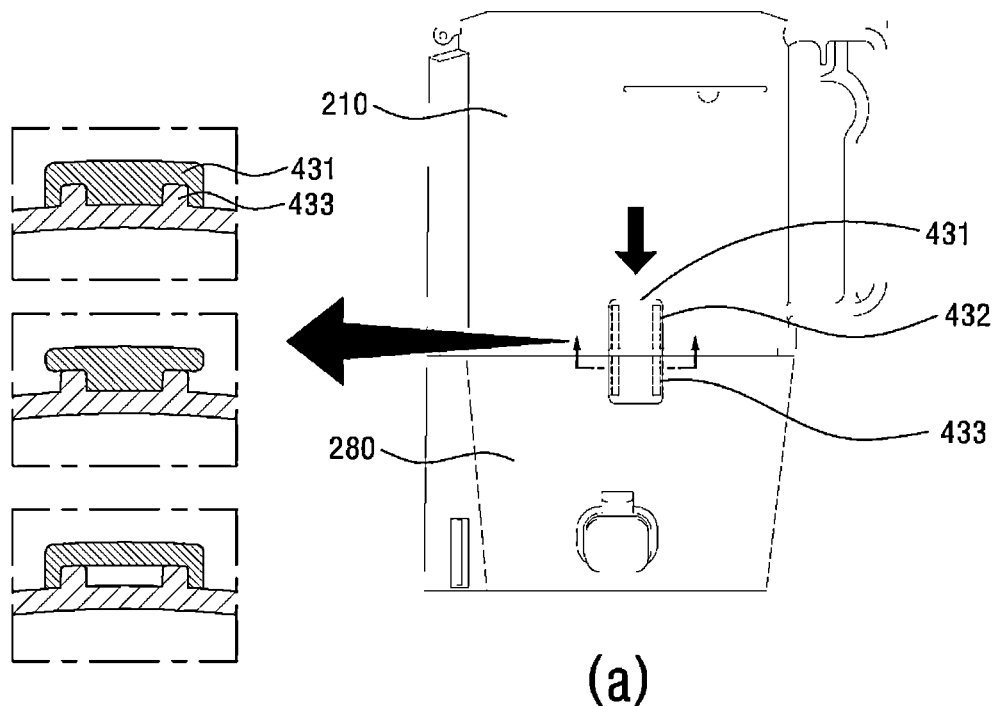
(a)
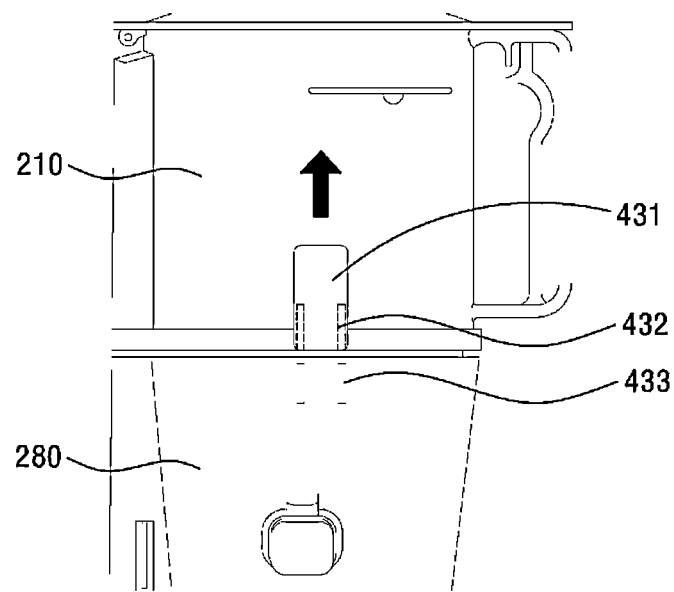
(b)
FIG. 54b

FIG. 55a
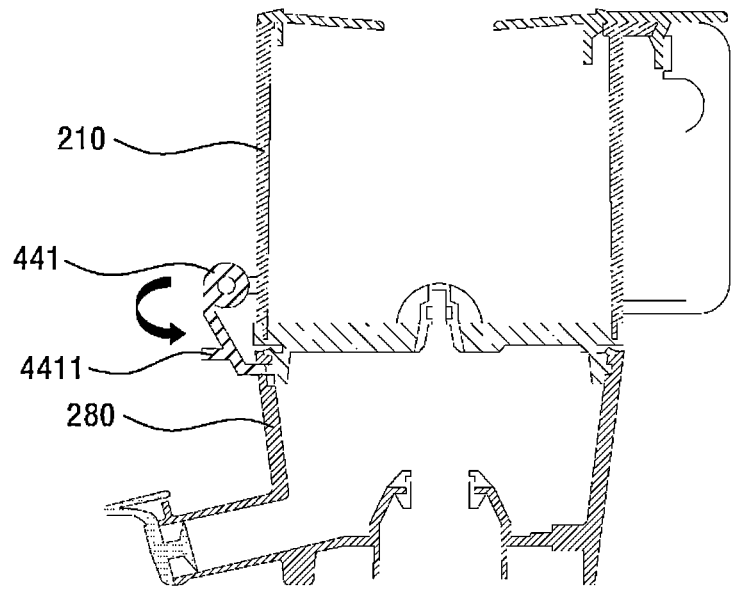
(a)
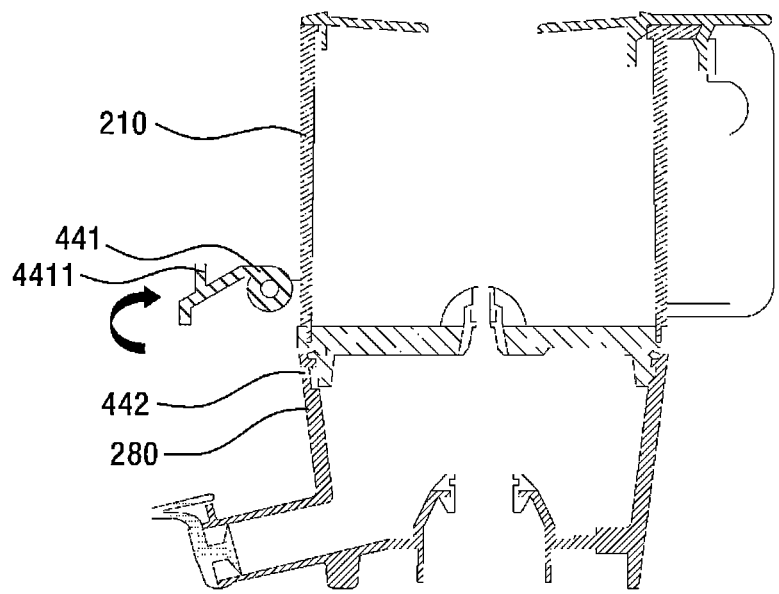
(b)
FIG. 55b

FIG. 56a
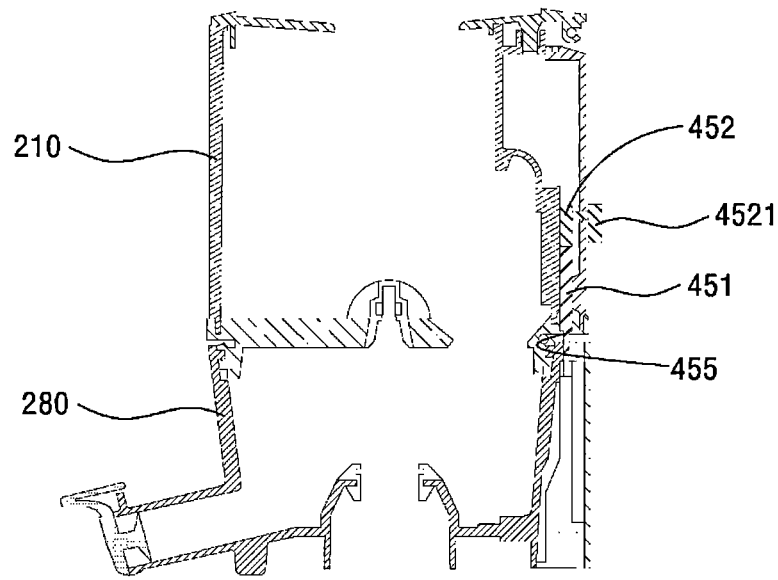
(a)
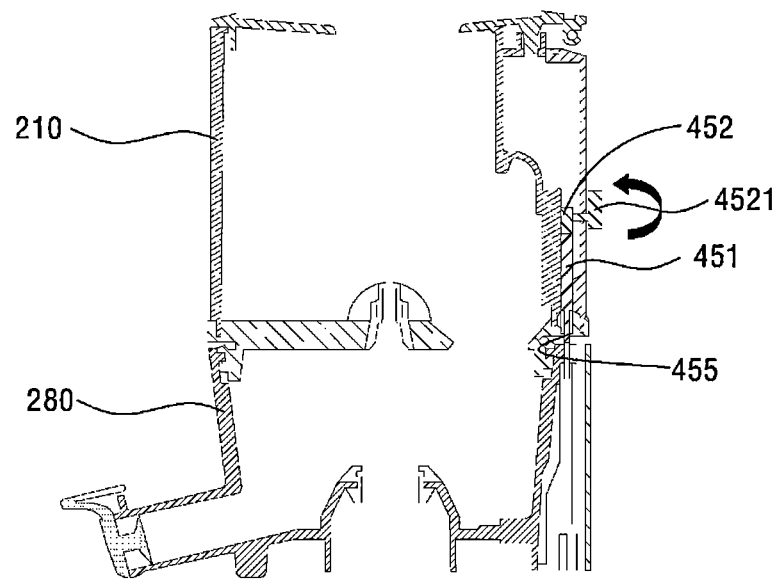
(b)
FIG. 56b

FIG. 58a
(a) 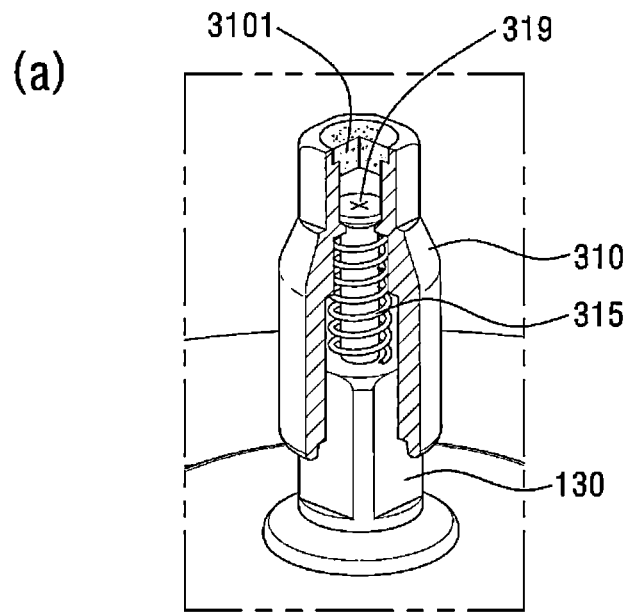
(b) 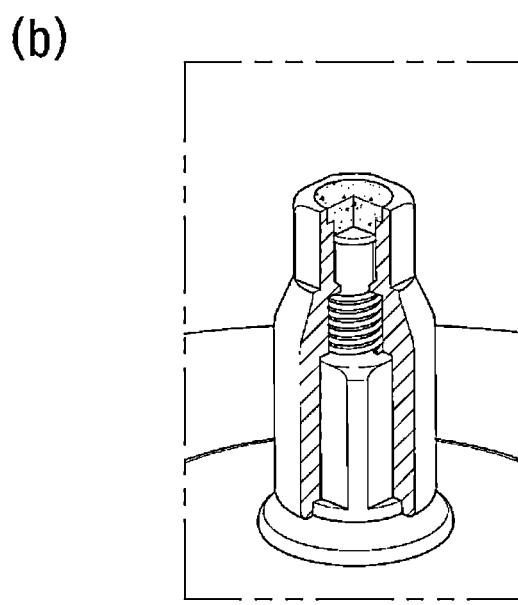
FIG. 58b

JUICER

CROSS-REFERENCE TO RELATED APPLICATIONS

This application is the U.S. national stage application of International Patent Application No. PCT/KR2020/013987, filed Oct. 14, 2020, which claims the benefit under 35 U.S.C. § 119 of Korean Patent Application Nos. 20-2019-0004271, filed Oct. 22, 2019, and 20-2020-0002250, filed Jun. 29, 2020, the disclosures of each of which are incorporated herein by reference in their entirety.

1. FIELD

The present disclosure relates to a juice extractor, and more particularly, to a juice extractor that compresses and crushes vegetables or fruits to produce extracted juice.

2. BACKGROUND

There is an increasing number of people making and drinking green vegetable juice or juice by themselves at home for their health, and for this purpose, numerous devices have been disclosed that can be used to extract juice from vegetables or fruits simply at home.

When using conventional juicers, a material put into the inlet is crushed by blades rotating at high speed, and juice is made by centrifugation. However, in such juicers, the unique taste and nutrients of the material can be destroyed in the process of being crushed at high speed, and further, it was difficult to make green vegetable juice with vegetables having stems or leaves, nor with fruits such as kiwis or strawberries having high viscosity, and making soy milk with soy beans was not possible at all.

In order to solve such a problem, Korean Patent Registration No. 10-0793852 disclosed using a method of compressing and crushing the material between a mandrel and a screw rotating at a low speed. According to this method, it is possible to make soy milk using the principle of grinding beans and then pressing and squeezing them out, and there is also an effect of making juice by grinding and then pressing and squeezing fruits having high viscosity such as tomatoes, kiwis and strawberries, thereby solving the problem of conventional juicers as described above.

However, even in this case, due to the size of the screw and the size of the inlet, which is made so that material of an appropriate size can be fed according to the size of the screw, there was inconvenience of having to cut the material in advance before inserting them into the inlet.

SUMMARY

Therefore, a purpose of the present disclosure is to resolve the problems of prior art, that is, to provide a juice extractor which includes a hopper configured to be settled on an upper portion of a juice extracting drum to cut the material for juice extraction beforehand, and allows big materials for juice extracting such as whole fruits to be cut, prior to being put into the juice extracting drum, by a cutting part that is supported only on a lower end surface of the hopper and that is interlocked with the screw, and allows an open space formed inside the hopper on an upper side of the cutting part so that the size of the material for juice extraction to be put into the hopper may be further increased.

The tasks to be solved by the present disclosure are not limited to the tasks mentioned above, and other tasks that are not mentioned will be clearly understood by those skilled in the art from the following description.

The above purposes may be achieved by a juice extractor including a cutting part for cutting a material for juice extraction beforehand by rotation inside a hopper above a screw, the cutting part including a chopping blade extending upwards in a spiral form from a center of rotation; and a slicing blade extending horizontally on a lower end surface of the hopper.

Here, the cutting part may be formed in a dual structure of a core body and an outer shell covering an outer side of the core body with a material different from the core body.

Here, the core body may be made of a material having a stronger hardness than the outer shell.

Here, the core body may be made of an Ultem material.

Here, the outer shell may be made of a material of one of Polyoxymethylene or Polyacetal (POM) or Acrylonitrile butadiene styrene (ABS).

Here, the cutting part may be formed by insert injection.

Here, the core body may include at least one of a protrusion protruding from a surface of the core body, a groove dented from the surface of the core body and a penetrating hole penetrating the core body.

Here, an outer side of the protrusion, inner side of the groove, and inner side of the penetrating hole may be made as curved surface.

Here, the penetrating hole may be formed by penetrating the core body in the part corresponding to the chopping blade.

Here, the cutting part may be detachable.

Here, the cutting part may be detachably immobilized by a driving force transmission part that may be inserted into a connecting hole formed at the center of the lower end surface of the hopper, that includes a shaft hole on the lower end where an upper rotation shaft of the screw may be inserted, and a step protruding in a radial direction from one side of the upper end, the step being inserted through a penetrating hole formed on the rotation shaft of the cutting part and protrudes above the cutting part; and an immobilizing cap for inserting the step and immobilizing the step.

Here, the immobilizing cap may include an up/down guide part that is upwardly open from its lower end, to provide a path where the step may be inserted in up/down direction; and an insertion part for inserting the step from the upper end of the up/down guide part in the circumferential direction.

Here, on the bottom surface at the end of the circumferential direction of the insertion part, a seating groove may be formed so as to seat the step.

Here, on the lower surface of the immobilizing cap, an elastic body made of an elastic material may be immobilized, and the lower surface of the elastic body may be formed to extend further than the lower surface of the immobilizing cap.

Here, the elastic body may be formed in a ring form, and on the lower surface of the immobilizing cap, an immobilizing groove of a ring form may be formed so that the elastic body may be inserted and immobilized.

Here, a rotation support part for rotatably supporting the cutting part on the rotation shaft of the cutting part may be further included, and the rotation support part may detachably immobilize the cutting part by an immobilizing part that may be inserted into a connecting hole formed at the center of the lower end surface of the hopper, and immobilized on the circumference of the rotation support part below the lower end surface of the hopper.

Here, on the outer circumference surface of the rotation support part, a guide protrusion for guiding the position of insertion in the connecting hole may be formed, and on the inner side of the connecting hole, a guide groove part may be formed, where the guide protrusion may be inserted.

Here, the immobilizing part may be formed in a circular ring form, and at least one or more immobilizing protrusions may be formed inwardly of the radial direction, and on the outer circumference surface of the rotation support part, an up/down guide part may be formed that is open upwards from the lower end of the rotation support part to provide a path so that the immobilizing protrusion may be inserted in up/down direction, and an insertion part that enables the immobilizing protrusion part to be inserted from the upper end of the up/down guide part in the circumferential direction.

Here, a rotation support part for rotatably supporting the cutting part on the rotation shaft of the cutting part may be further included, and the rotation support part may be detachably immobilized to the connecting hole formed at the center of the lower end surface of the hopper.

Here, on the outer side of the rotation support part, a protruding immobilizing protrusion may be formed, and on the inner circumference surface of the connecting hole, an insertion part may be formed where the immobilizing protrusion may be formed.

Here, on the outer side of the rotation support part, a protruding immobilizing protrusion may be formed, and on the inner circumference surface of the connecting hole, a spaced apart and protruding immobilizing step may be formed, and through the distanced space between the immobilizing step, the immobilizing protrusion may be inserted, and thus the immobilizing protrusion may be placed below the immobilizing step and be immobilized.

Here, the hopper further includes a bushing part formed on the connecting hole formed on the center of the lower end surface of the hopper; and a driving force transmission part that is inserted into the hole formed inside the bushing part and rotates and where a shaft hole for inserting the upper rotation shaft of the screw is formed, the cutting part being coupled to the upper end of the driving force transmission part.

Here, the cutting part may be screw coupled by a screw that may be inserted through the shaft hole of the driving force transmission part and penetrates upwards.

Here, the inner side of the bushing part may be formed in a conical form of which the radius decreases as it gets closer to the upper portion.

Here, the driving force transmission part may include a coupling part that includes the shaft hole and the outer side formed in a conical shape to correspond to the inner side of the bushing part; and an upper protrusion that protrudes from the upper end of the coupling part above the upper surface of the bushing part and having a screw hole where the screw may be inserted.

Here, the upper protrusion may be formed in an n square-shape, and on the lower end surface of the cutting part, an n square-shaped groove may be formed so that the upper protrusion may be inserted.

Here, the upper rotation shaft of the screw is formed as an n square-shaped shaft, and the shaft hole may be formed as an 2*n square-shaped shaft hole, wherein n is a natural number not less than 3.

Here, on the lower end surface of the hopper, at least one or more outlets may be formed, that moves the material for juice extraction crushed in the hopper inside the juice extracting drum, and an inclined surface that is inclined downwards in a radial direction towards the outlet from the center of the lower end surface of the hopper, may be formed.

Here, the outlet may be formed such that the width gradually increases along the rotation direction of the cutting part.

Here, a juice extracting drum mounted above the hopper, to accommodate the screw, and a juice separating drum having an outflow hole that discharges the juice produced from the material and separates the juice and the residue, may be further included, and the upper end of the juice separating drum may be formed to have an expansion part of which the radius increases as it gets closer to the upper portion.

Here, at one side of the expansion part, at least one or more material inflow guide part may be formed in a curved surface form gradually facing towards the inner side along the rotation direction of the screw, and at least one of the material inflow guide part may be placed below the outlet.

Here, the hopper may include a hopper housing of which the upper portion is open and the cutting part is mounted on the lower end surface, and a lid part that is hinge-coupled on the upper end of the hopper housing to open or close the upper portion, and the lid part may include a safety guide part that may be inserted inside the upper end of the hopper housing.

Here, the safety guide part may be formed such that the lower surface of the lid part is inserted inside the hopper housing.

Here, a juice extracting drum may be further included, that is coupled below the hopper and that accommodates the screw for compressing the material for juice extraction, and a packing ring for sealing when the hopper and the juice extracting drum are being coupled, is immobilized along the edge at the outer side of the lower end of the hopper, wherein the packing ring may be formed in an up/down symmetrical structure.

Here, the packing ring may include an immobilizing part that may be inserted into an immobilizing groove that is a groove formed along the edge of the outer side of the lower end of the hopper; and a packing wing part that extends in a radial direction respectively from the upper and the lower end of the immobilizing part.

Here, a plurality of coupling protrusions, protruding longitudinally in a horizontal direction along the edge of the outer side of the lower end of the hopper, are spaced apart below the packing ring, and a plurality of settling protrusions protruding longitudinally in a horizontal direction along the edge of the inner side of the juice extracting drum, are spaced apart, and after the coupling protrusions are inserted through the distanced space between the settling protrusions, the coupling protrusions are placed below the settling protrusions, to couple the hopper and the juice extracting drum, wherein by forming an inclined surface on one of the coupling surfaces of the settling protrusions and the coupling protrusions, the contact position in the up/down direction of the settling protrusion and the coupling protrusion is changed depending on the relative position of the settling protrusion and the coupling protrusion, and the upper end of the juice extracting drum may pressurize the packing wing part.

Here, the lower surface of the cutting part and the lower end surface of the hopper may be coupled by an uneven structure having a circular ring form.

Here, on the lower surface of the cutting part, a circular protrusion protruding in a circular ring form is formed, and on the lower end surface of the hopper, a circular groove for inserting the circular protrusion is formed, and one end of the circular groove communicates with the circular groove, thereby forming a residue discharge part that discharges the residue placed in the circular groove outside the circular groove.

Here, the residue discharge part may be made of a groove further dented inwardly from one end of the circular groove, and an open surface of which one side of the outer side of the circular groove is open.

Here, a juice extracting drum is further included, that is coupled below the hopper and that accommodates the screw for compressing the material for juice extraction, and a release prevention part that inhibits the coupling of the hopper and the juice extracting drum from being released by reverse direction rotation of the hopper during juice extraction.

Here, the release prevention part may include a movement settling part that makes an up/down movement within the juice extracting drum, and a settling groove formed on the lower surface of the hopper, and where the upper end of the movement settling part protruding above the upper end of the juice extracting drum, may be inserted when the movement settling part moves above.

Here, a main body part is further included, that includes a driving shaft protruding upwards and supports the lower end surface of the juice extracting drum, and the release prevention part may further include a movement guide protrusion that protrudes upwards on the upper surface of the main body part, so that when the juice extracting drum is settled in the main body part, contacts with the lower end of the settling part to move the movement settling part upwards.

Here, on the lower surface of the juice extracting drum, an insertion groove where the movement guide protrusion may be inserted, may be formed, and the lower end of the movement settling part may be formed to protrude inside the insertion groove.

Here, a cam part may be further included, that contacts the lower end of the movement settling part, and rotates, to move the movement settling part up/down.

Here, a rotation knob may be further included, that extends from the rotation shaft of the cam part towards outside of the juice extracting drum.

Here, the hopper further includes a handle part that protrudes from the outer side of the hopper so that the user can grip the handle part, and the release prevention part may include an elastic settling part that is elastically coupled to the inner side of the handle part where the user grips with the fingers and makes the elastic movement; and a settling groove formed on the outer side of the juice extracting drum where the lower end of the elastic settling part curved towards the outer side of the juice extracting drum may be inserted.

Here, the release prevention part may include a settling part that makes an up/down movement in the hopper; and a settling groove that is formed on the upper surface of the juice extracting drum and where the lower end of the movement settling part protruding below the lower end of the hopper when the movement settling part is moved downwards, may be inserted.

Here, the hopper includes a hopper housing of which the upper portion is open and where the cutting part may be mounted; and a lid part that is hinge-coupled to the upper end of the hopper housing to open/close the upper portion, wherein the movement settling part may have an elastic movement guide protrusion that is elastically supported in up/down direction, and protrudes downwards from the lower surface of the lid part, and thus when the lid part closes, contacts with the upper end of the settling part, to elastically move the movement settling part downwards.

Here, the movement settling part may further include a cam part that is elastically supported in up/down direction, and that contacts with the upper end of the movement settling part to rotate, and that moves the movement settling part up/down.

Here, a rotation knob may be further included, that extends from the rotation shaft of the cam part towards the outside of the hopper.

Here, the release prevention part may include a sliding settling part that makes a sliding movement along the guide formed on the outer side of the juice extracting drum and the hopper, and settles the juice extracting drum.

Here, the release prevention part may include a rotation settling part that is hinge-coupled to the hopper or the juice extracting drum, to rotate; and a settling groove that is formed on the outer side of the juice extracting drum or the hopper and where one end of the rotation settling part may be inserted.

According to the juice extractor of the present disclosure as described above, material for juice extraction is cut and stirred inside the hopper and then provided to the juice extracting drum, and thus, there is no need to cut the material for juice extraction beforehand, thereby improving user convenience.

Further, there is also an advantage that since the cutting part is supported and rotates only on the lower end surface inside the hopper, an open space is secured at the upper side of the cutting part inside the hopper, and therefore, the size of the material for juice extraction being put into the hopper is further increased.

In addition, there is an advantage that since the cutting part is formed in a dual structure of heterogeneous materials, consisting of a core body and an outer shell covering the core body, the hardness of the cutting part is strengthened.

Further, there is also an advantage that by forming a protruding portion, groove or penetrating hole on the surface of the core body, the coupling surface area between the core body and the outer shell is increased, thereby increasing the coupling force between the heterogeneous materials.

Further, there is also an advantage that since the cutting part may be separated from the hopper, it is easy to clean the cutting part.

Further, there is also an advantage that the settling structure between the juice extracting drum and the hopper inhibits the bond between the hopper and the juice extracting drum from being released by reverse direction rotation of the hopper during juice extracting.

BRIEF DESCRIPTION OF THE DRAWINGS

FIGS. 9*a* and 9*b* are vertical cross-sectional views of the hopper illustrated in FIG. 5, according to the position of a chopping blade and a slicing blade.

FIGS. 10*a* and 10*b* are vertical cross-sectional views of the hopper, illustrating a modified example of the relationship between a first inner projection and the chopping blade.

FIGS. 16*a* and 16*b* are views illustrating how the sealing looks like before and after the coupling of the hopper and a juice extracting drum.

FIGS. 30*a* and 30*b* are combined perspective views of FIGS. 27 to 28.

FIGS. 33*a* and 33*b* are combined perspective views of FIGS. 31 to 32.

FIGS. 36*a* and 36*b* are combined perspective views of FIGS. 34 to 35.

FIGS. 51*a* to 56*b* each illustrate other modified examples of anti-loosening structure of the hopper.

FIGS. 58*a* and 58*b* are partially cut-away perspective views of a flow motor shaft describing motions of the flow motor shaft.

DETAILED DESCRIPTION

Figure 1:
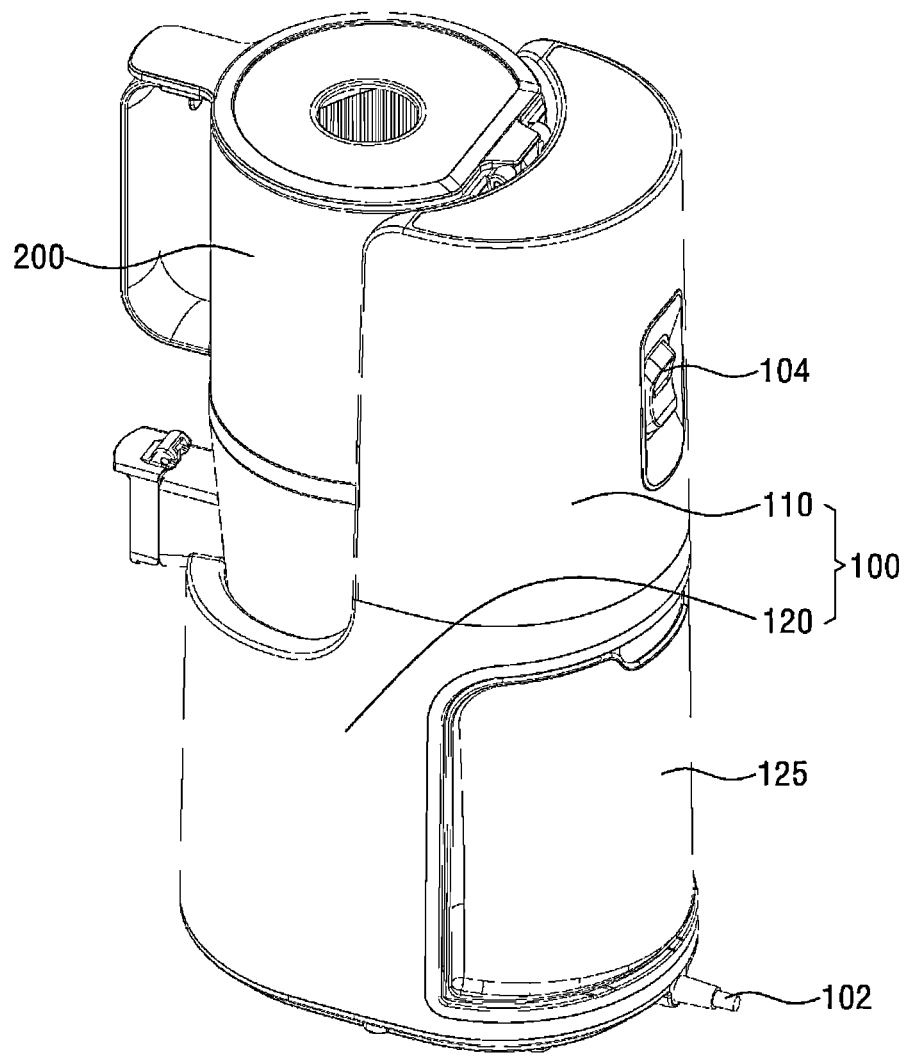
FIG. 1 is a perspective view of a juice extractor according to an embodiment of the present disclosure.

Specific matters of the embodiments are included in the detailed description and the drawings.

Advantages and features of the present disclosure, and the methods for achieving those advantages and features will become apparent with reference to the embodiments described hereinafter in detail together with the drawings attached. However, the present disclosure is not limited by the embodiments disclosed hereinafter, but may be embodied in various different forms. That is, the present embodiments are provided to complete the disclosure of the present invention, and to fully inform the scope of the present disclosure to those of ordinary skill in the art to which the present disclosure pertains, and the present disclosure will be defined by the scope of the claims. Like reference numerals indicate like components throughout the specification.

Figure 2:
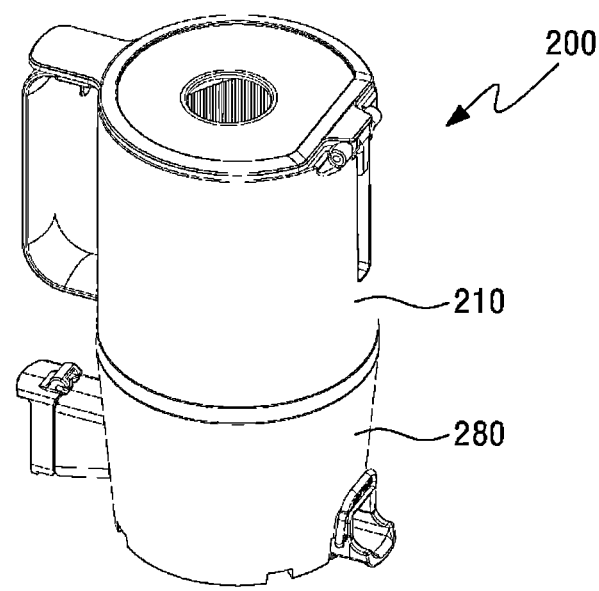
FIG. 2 is an exploded perspective view of a main body and a juice extracting part in FIG. 1.
Figure 2:
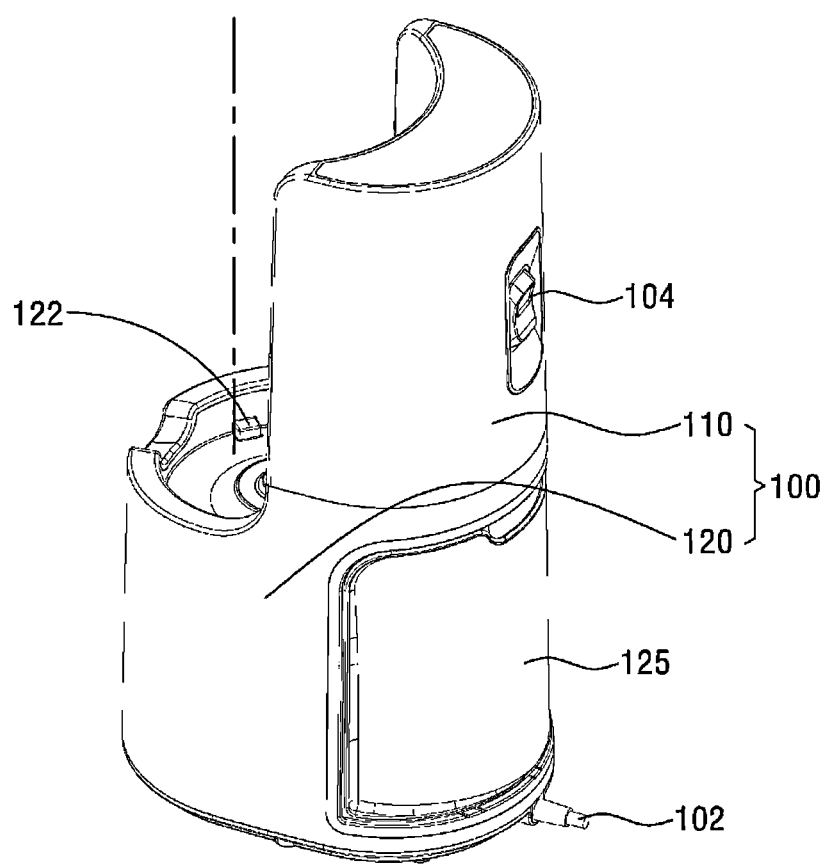
Figure 3:
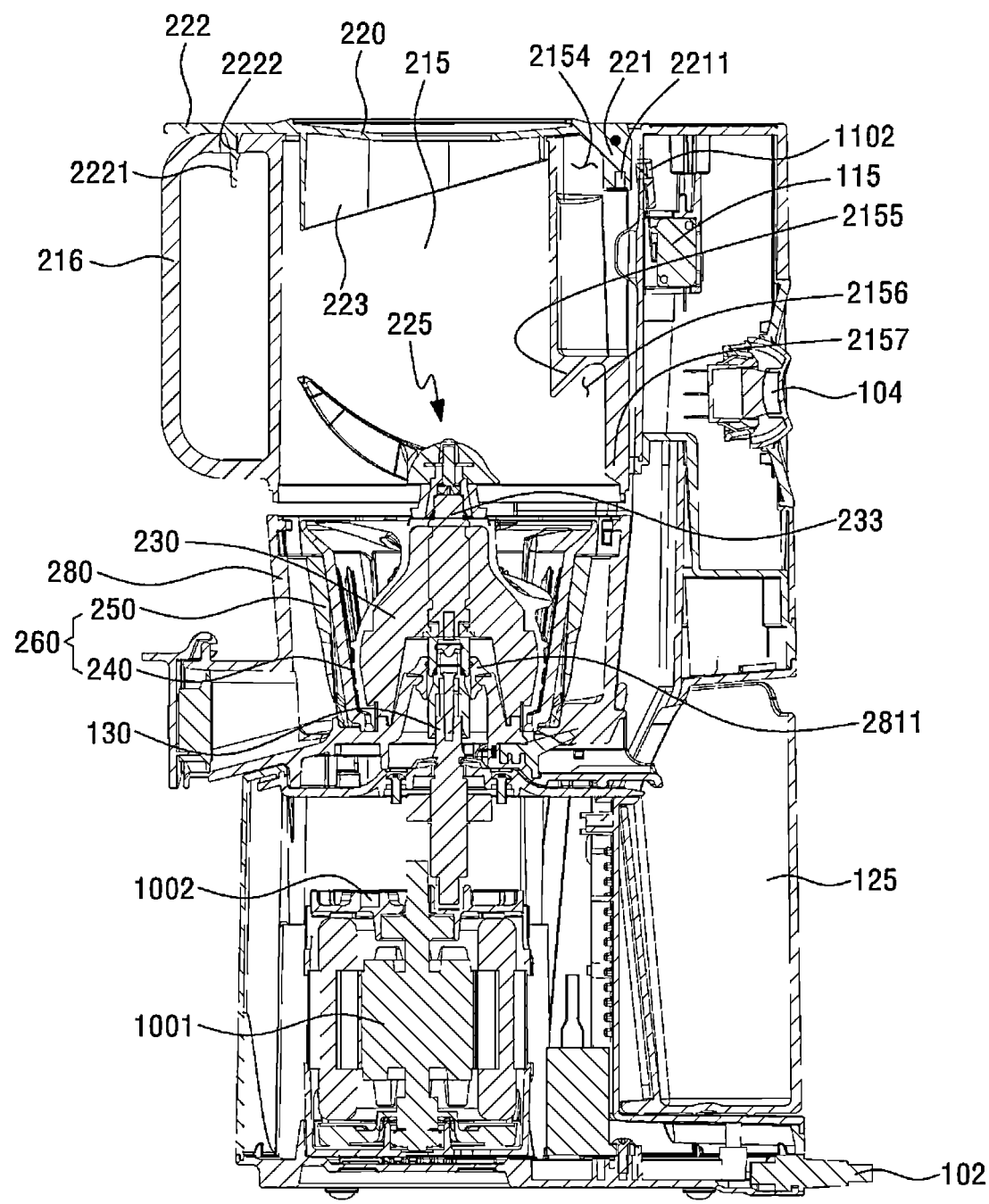
FIG. 3 is a cross-sectional view of FIG. 1.
Figures 4A, 4B:
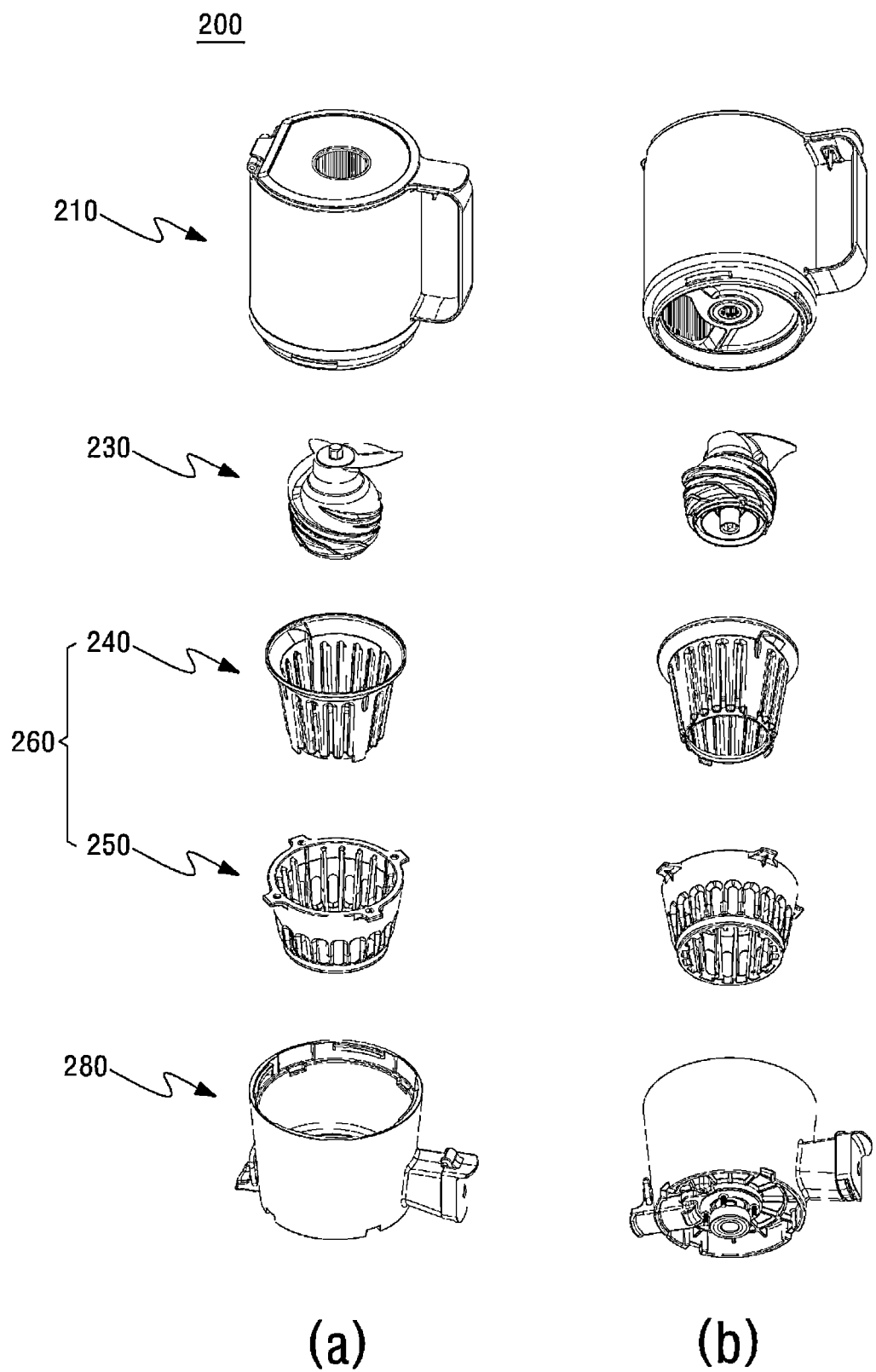
FIGS. 4a and 4b are exploded perspective views of the juice extracting part illustrated in FIG. 2.

FIG. 1 is a perspective view of a juice extractor according to an embodiment of the present disclosure, FIG. 2 is an exploded perspective view of a main body and a juice extracting part shown in FIG. 1, FIG. 3 is a cross-sectional view of FIG. 1, and FIGS. 4*a* and 4*b* are exploded perspective views of the juice extracting part shown in FIG. 2.

The juice extractor according to an embodiment of the present disclosure may be largely divided into a main body 100 and a juice extracting part 200.

The main body 100 seats and immobilizes the juice extracting part 200, and receives external power from a power cable 102 connected to a lower end of the main body 100 and rotates a motor 1001 therein to provide the driving force for rotating a screw 230 constituting the juice extracting part 200.

The juice extracting part 200 may be configured to include a hopper 210, a juice extracting drum 280, a juice separating drum 260 and the screw 230, as illustrated in FIGS. 4*a* and 4*b*.

Assembling the juice extracting part 200 is completed as the hopper 210 is fastened on an upper portion of the juice extracting drum 280 in a state where the juice separating drum 260 consisting of an inner module 240 and an outer module 250, and the screw 230, are mounted inside the juice extracting drum 280.

As such, with the juice extracting drum 280 at the lower portion and the hopper 210 at the upper portion, fastened, the juice extracting part 200 may be seated on the main body 100. The juice extracting part 200 operates by receiving power from a driving shaft 130 protruding from a bottom surface of the main body 100. That is, the juice extracting part 200 receives the rotating force of the driving shaft 130 to rotate the screw 230 inside the juice extracting drum 280 and a cutting part 225 inside the hopper 210, so as to cut and compress the input material for juice extraction, thereby producing juice, and then separates the produced juice from the residue, and discharges the juice.

As illustrated in FIG. 2, the juice extracting part 200 may be installed in the main body 100 as in FIG. 1 only when the hopper 210 is fastened to an upper portion of the juice extracting drum 280. That is, in the present disclosure, the hopper 210 cannot be settled on the upper portion of the juice extracting drum 280 in a state where the juice extracting drum 280 is seated on the main body 100. If the juice extractor operates with only the juice extracting drum 280 seated on the main body 100, the user may sustain an unexpected injury. As will be described hereinafter, the present disclosure allows power to be supplied to the juice extractor only when a lid part of the hopper 210 is closed with the juice extracting part 200 seated on the main body, thereby inhibiting the user from sustaining any injury due to unexpected motion of the juice extractor. Not only that, the present disclosure even mechanically allows the entirety of the juice extracting part 200 to be seated on the main body 100 only when the juice extracting part 200 is assembled, thereby further securing the safety of the user. Explanation on the related structure will be made hereinafter.

Hereinbelow, each component of the juice extracting part 200 and components of the main body 100 will be described in further detail with reference to the drawings.

First of all, the hopper 210 according to an embodiment of the present disclosure will be described with reference to FIGS. 5 to 36.

Figure 5:
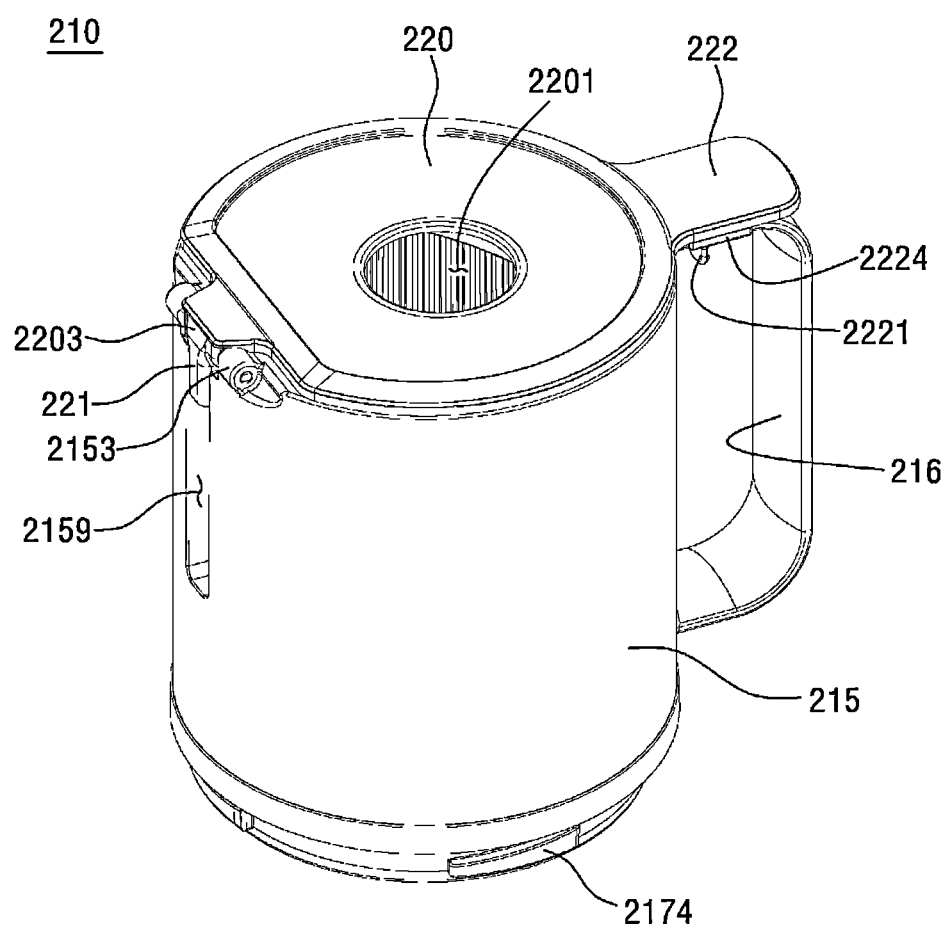
FIGS. 5 and 6 are perspective views of a hopper illustrated in FIGS. 4a and 4b.
Figure 6:
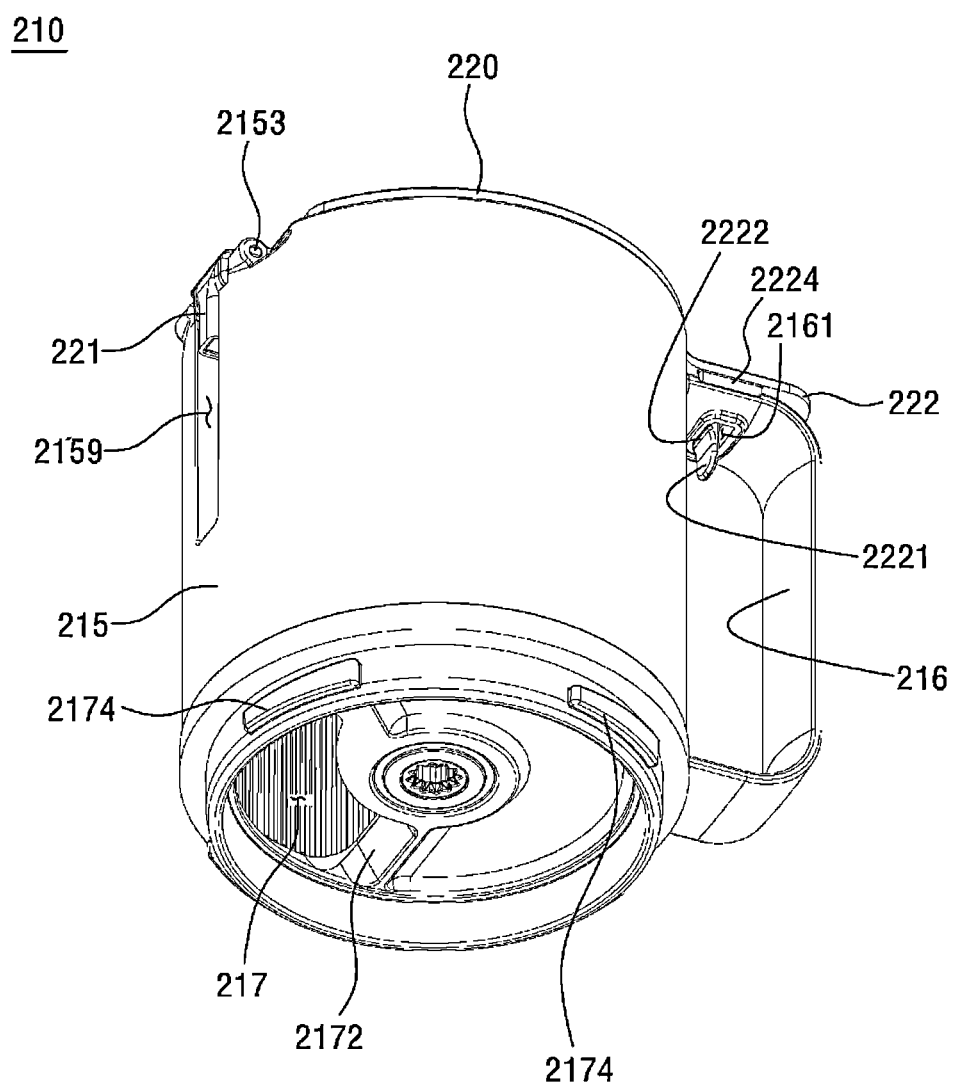
Figure 7:
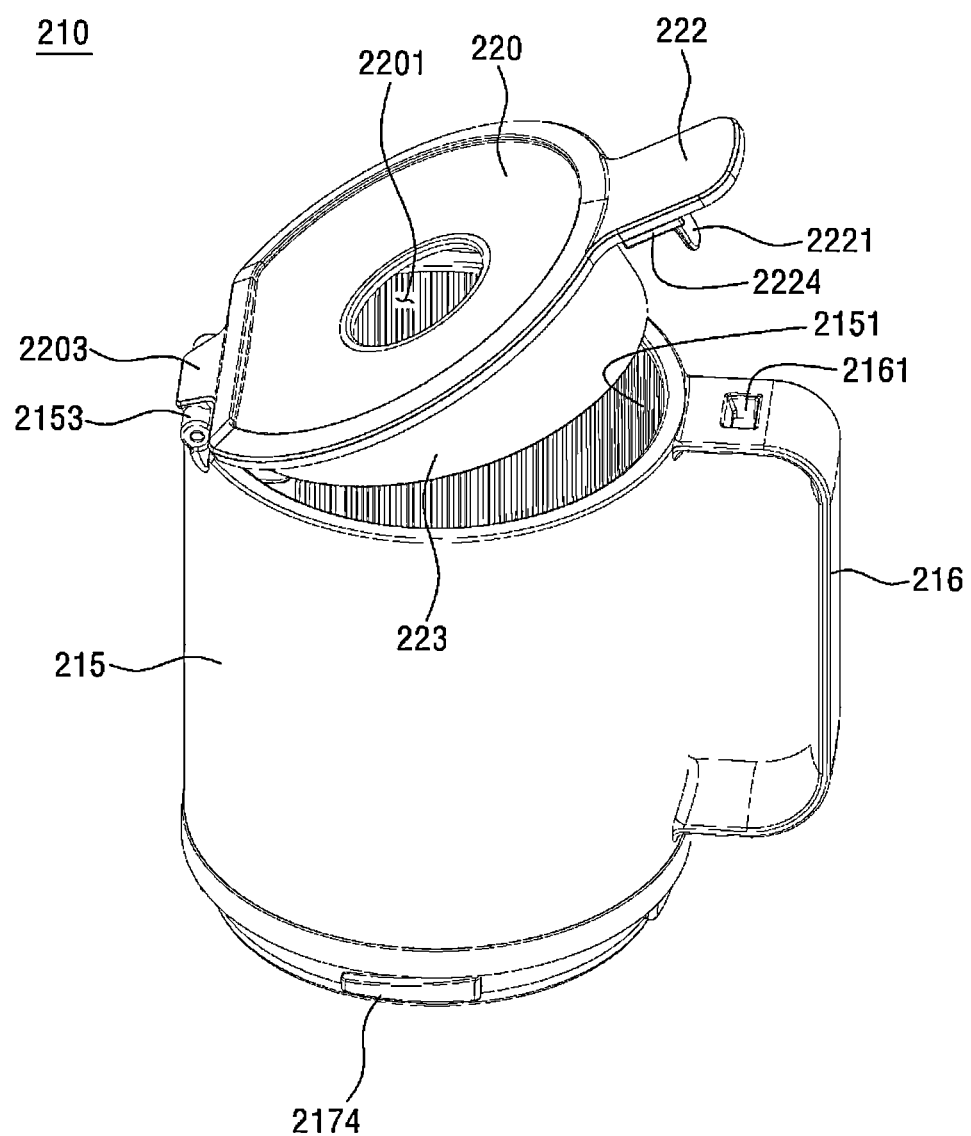
FIG. 7 is a perspective view of the hopper, with its lid part opened.
Figure 8A:
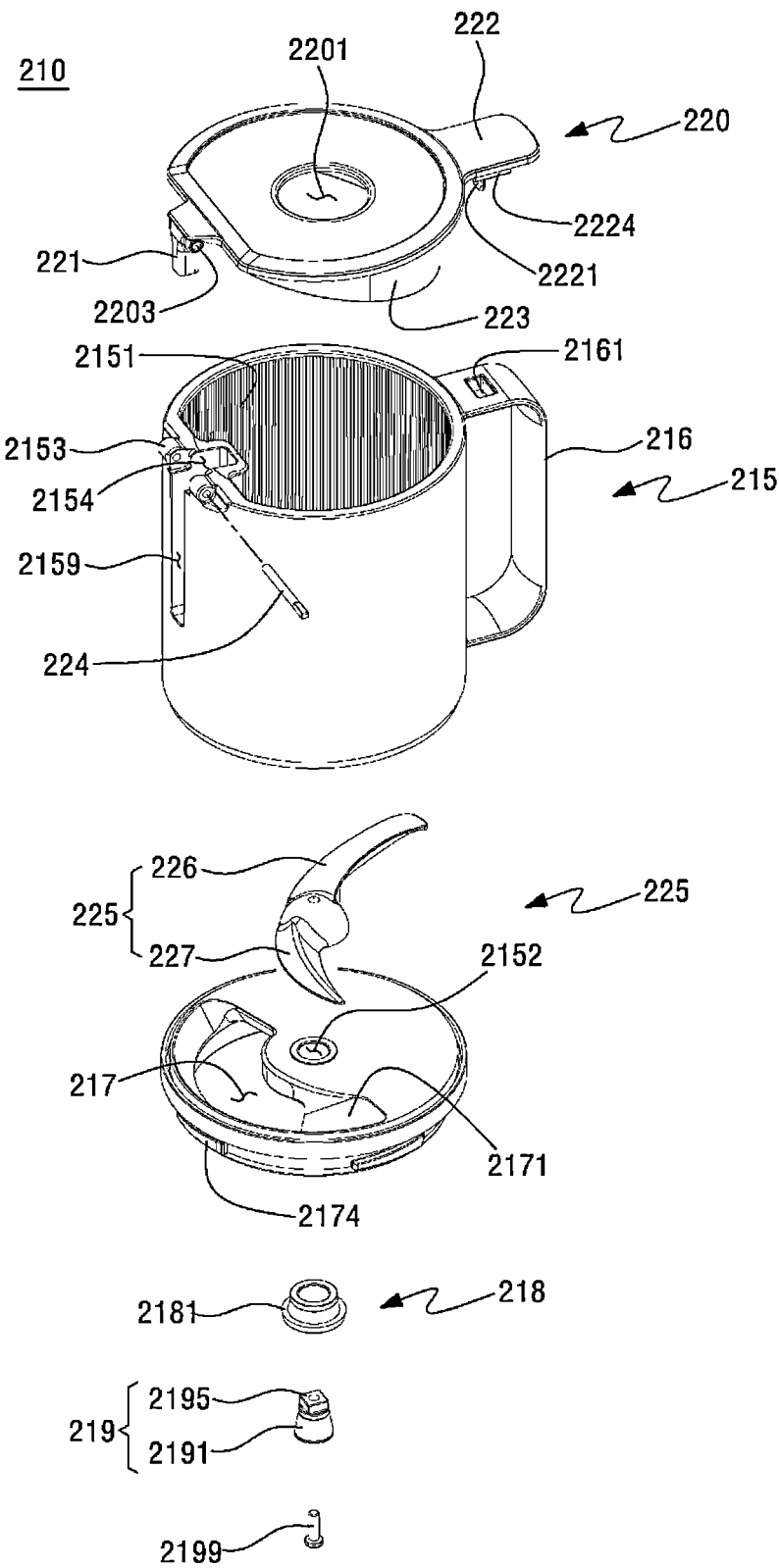
FIG. 8a and FIG. 8b are exploded perspective views of the hopper illustrated in FIG. 5.
Figure 8B:
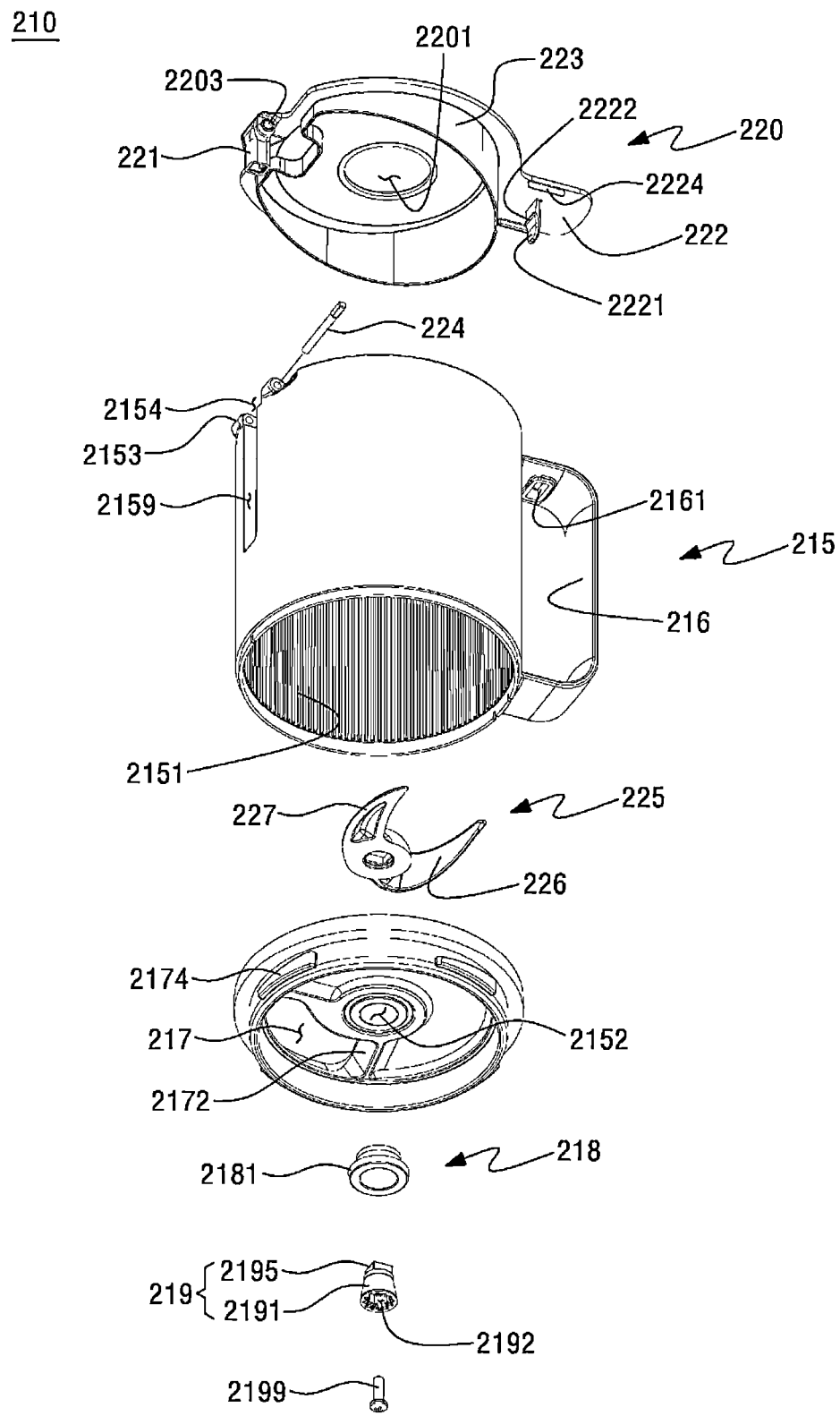
Figure 11:
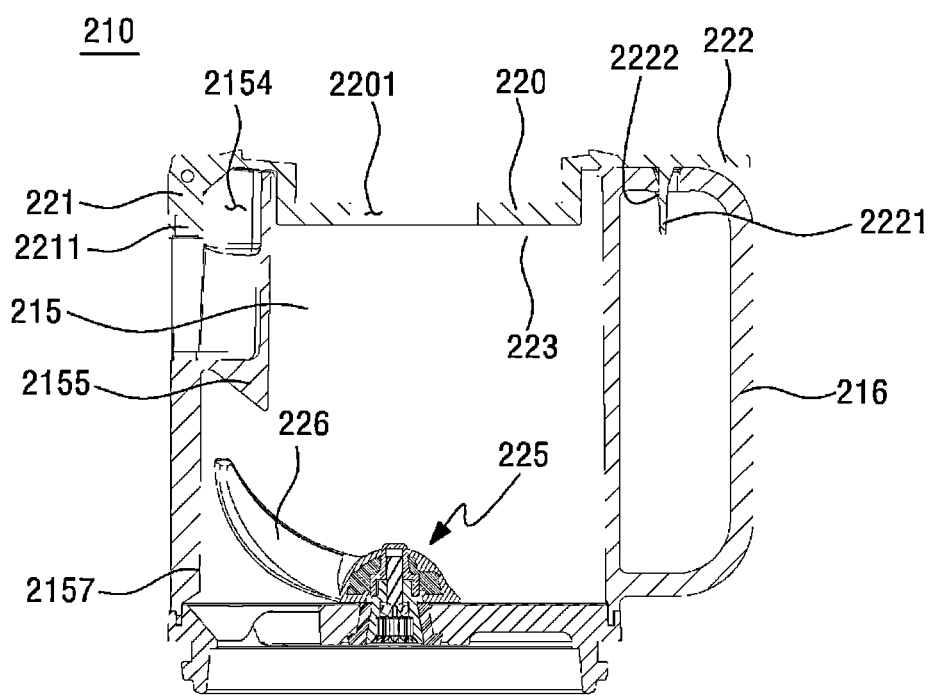
FIG. 11 is a view illustrating a modified example of a safety guide part.
Figure 12:
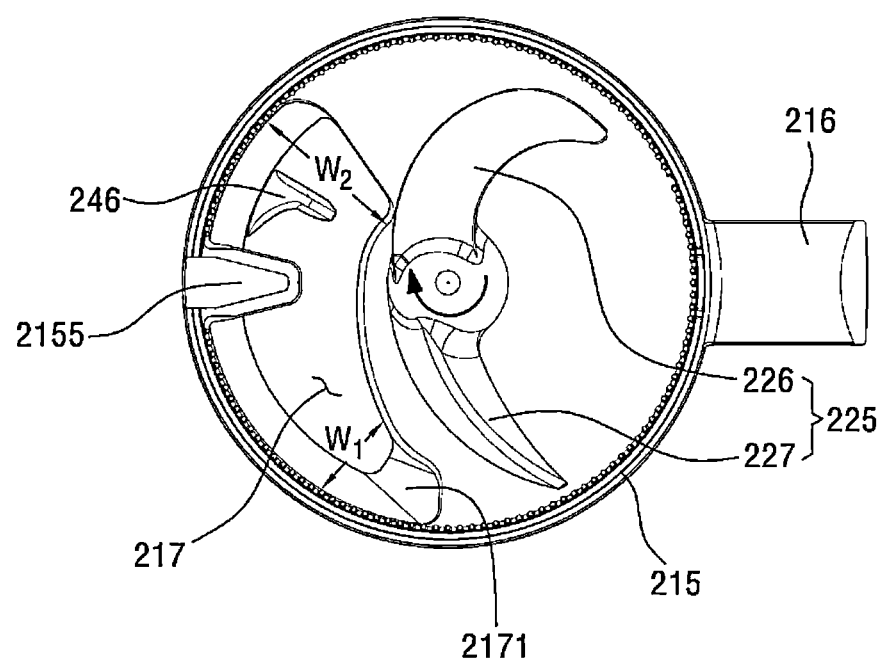
FIG. 12 is a horizontal cross-sectional view of the hopper, illustrating a bottom surface of the hopper.
Figure 13:
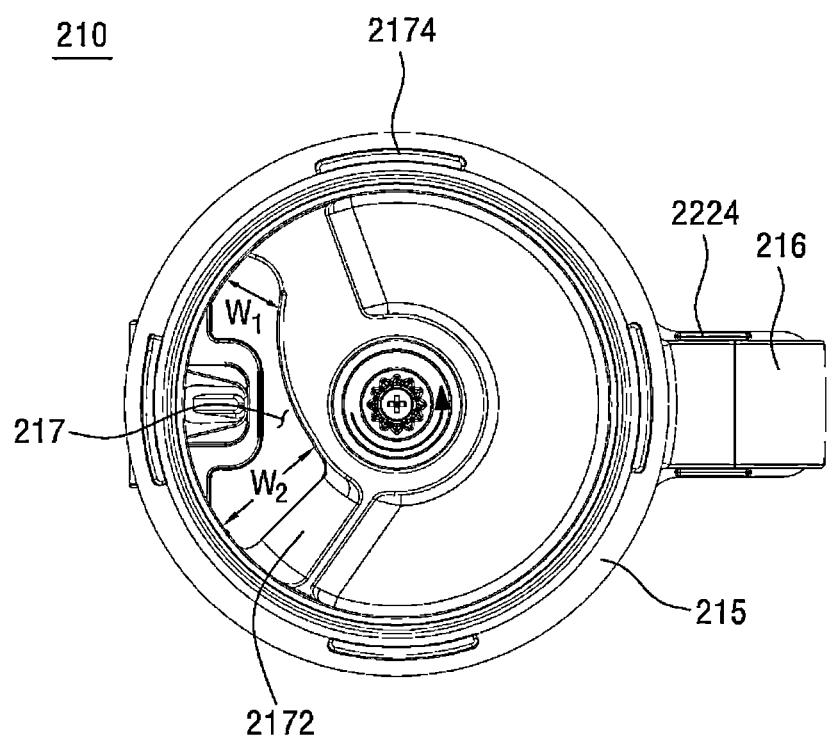
FIG. 13 is a low surface view illustrating a low surface of the hopper illustrated in FIG. 5.
Figure 14:
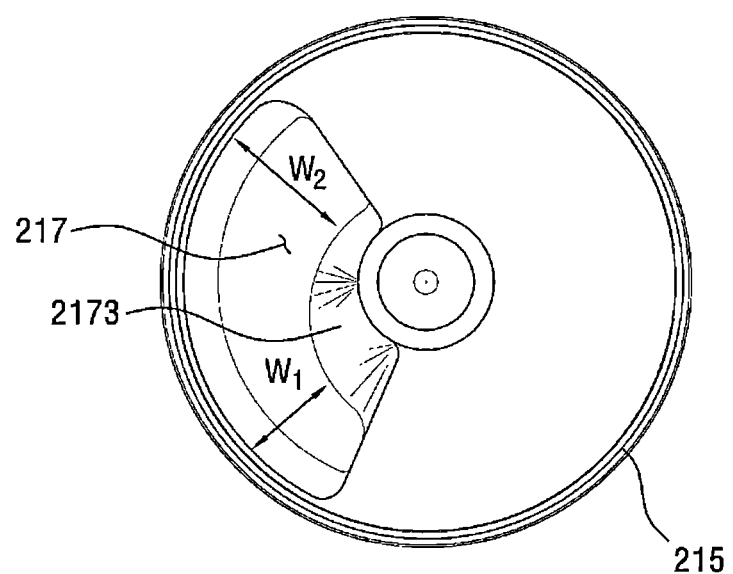
FIG. 14 is a view illustrating a modified example of the bottom surface of the hopper of FIG. 12.
Figure 15:
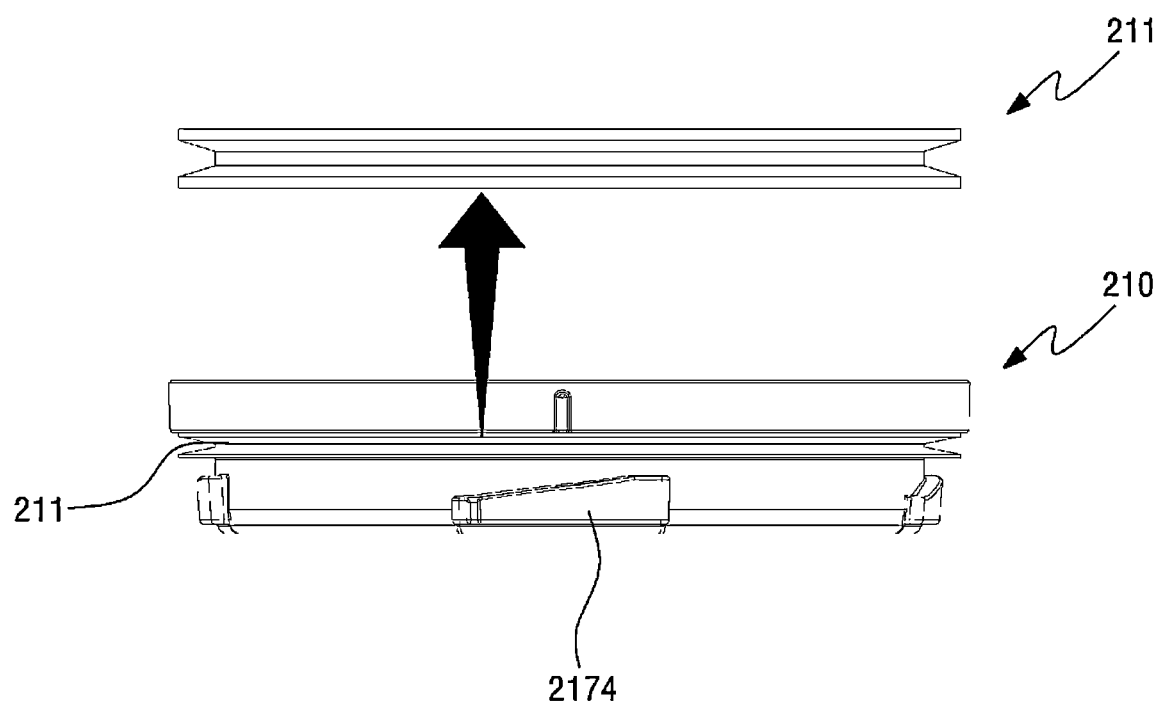
FIG. 15 is a view illustrating a sealing structure of the hopper.
Figure 17:
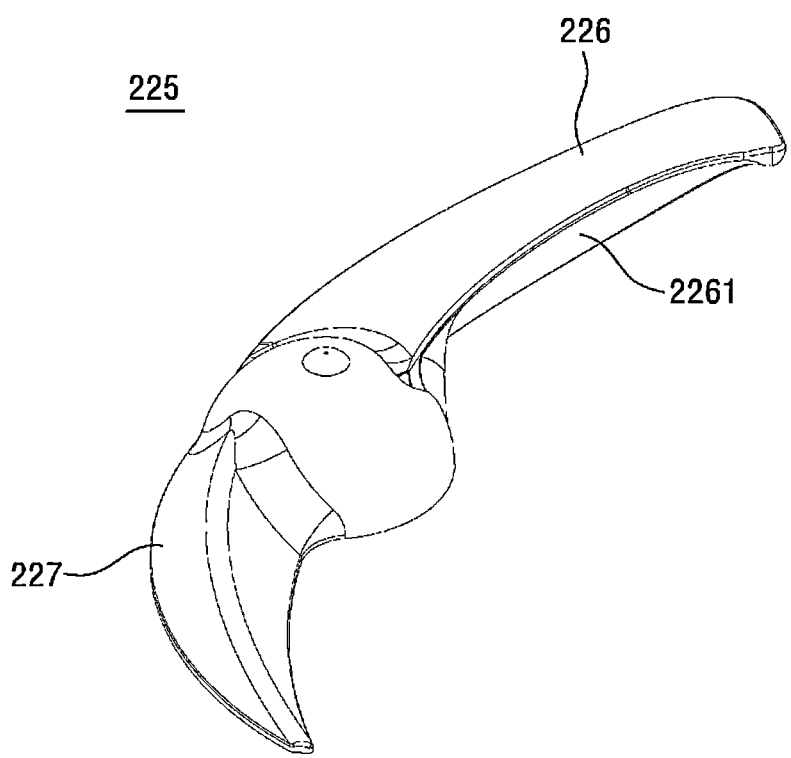
FIG. 17 is a perspective view of the cutting part illustrated in FIG. 8.
Figure 18:
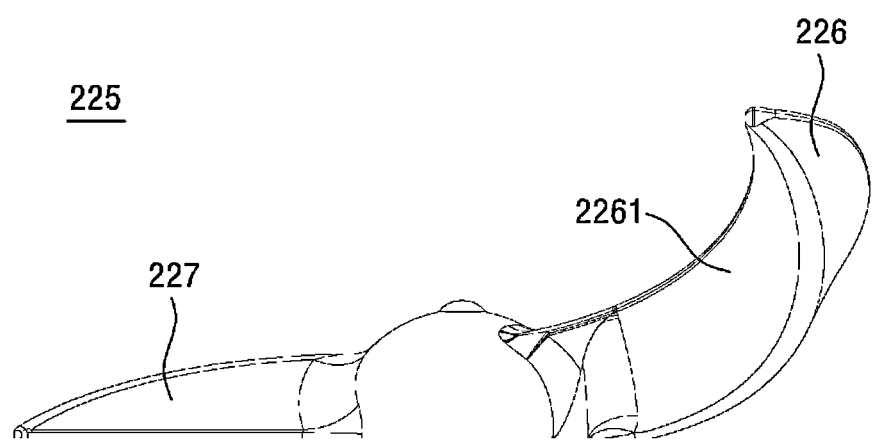
FIG. 18 and FIG. 19 are side views of the cutting part illustrated in FIG. 17.
Figure 19:
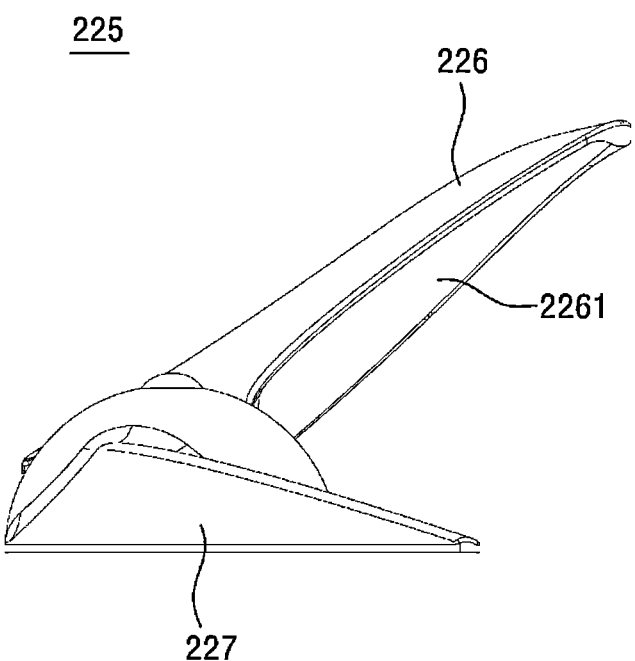
Figure 20:
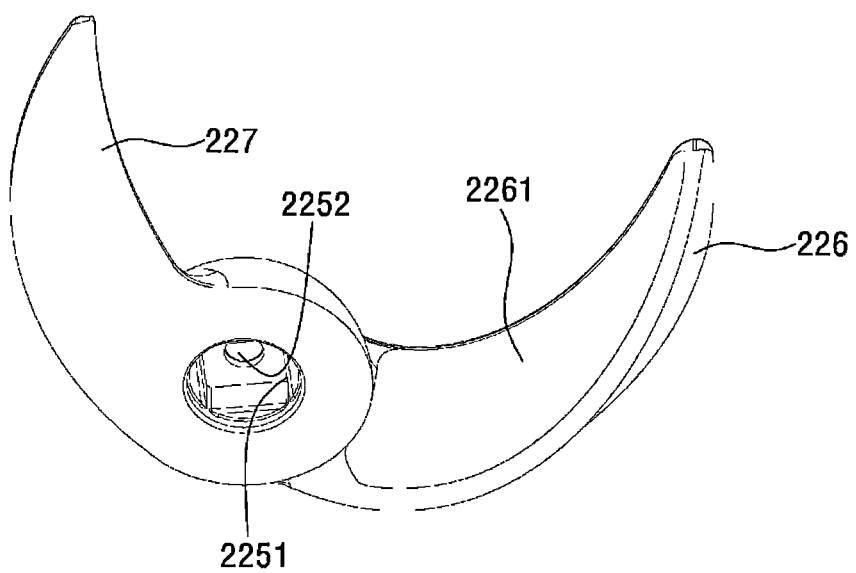
FIG. 20 is a perspective view illustrating a low surface of the cutting part illustrated in FIG. 17.
Figure 21:
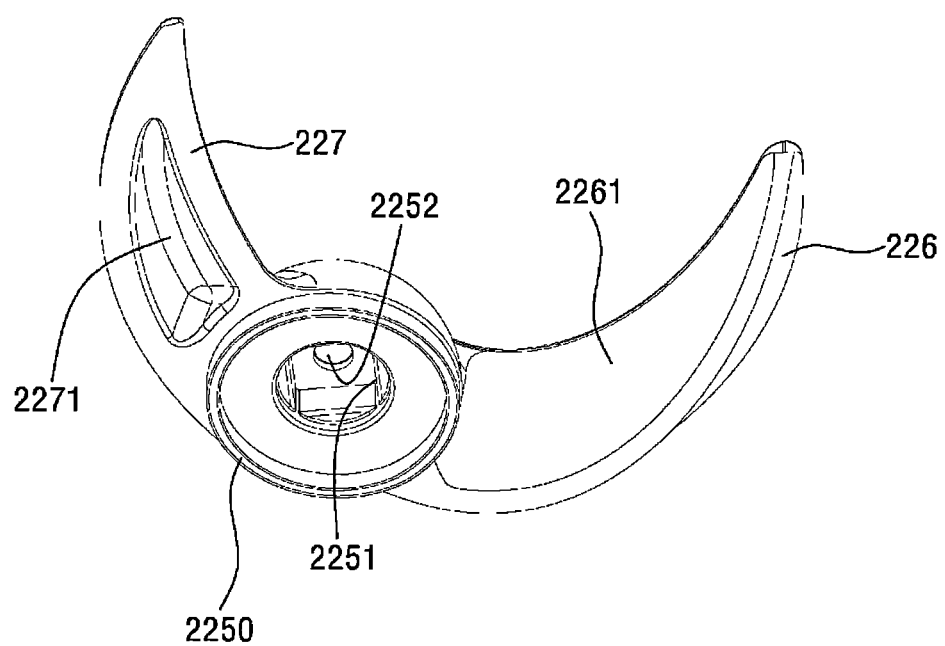
FIG. 21 is a low surface perspective view illustrating a modified example of the cutting part.
Figure 22:
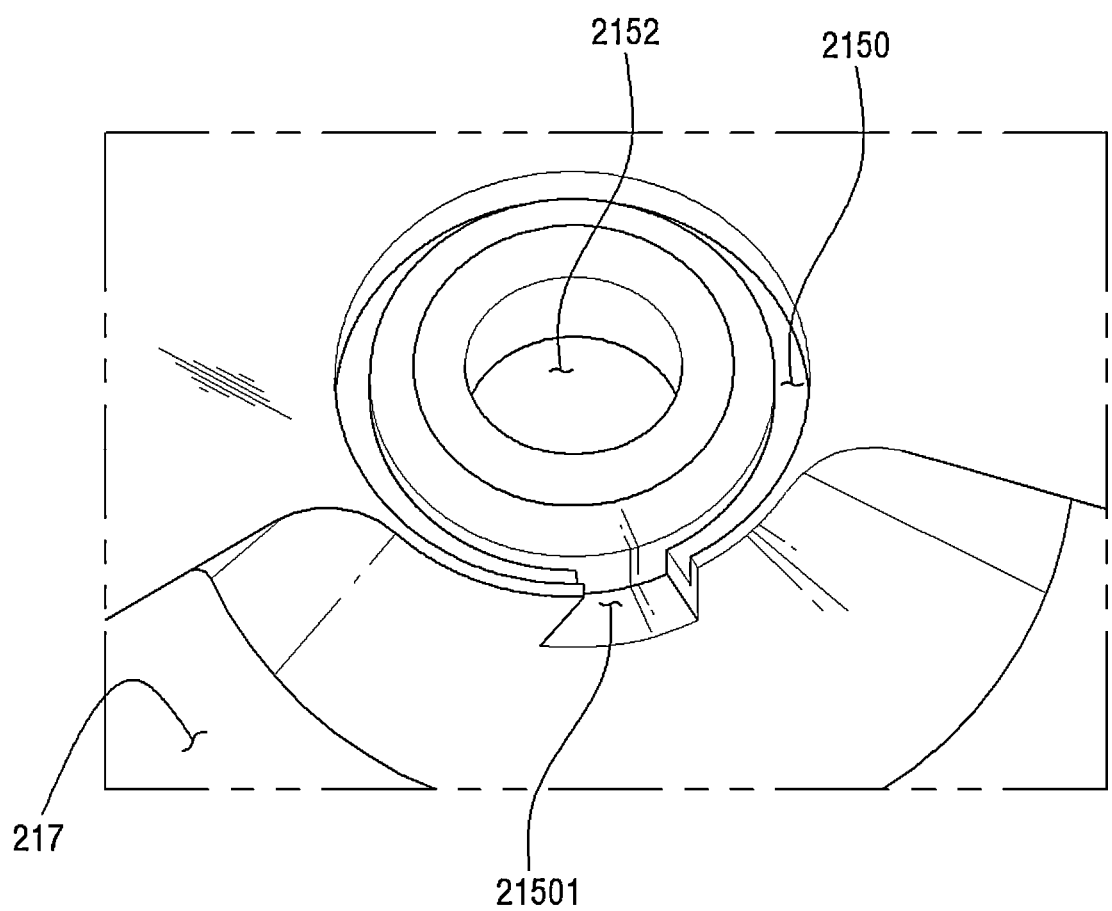
FIG. 22 is a view illustrating the structure of the bottom surface of the hopper according to FIG. 21.
Figure 23:
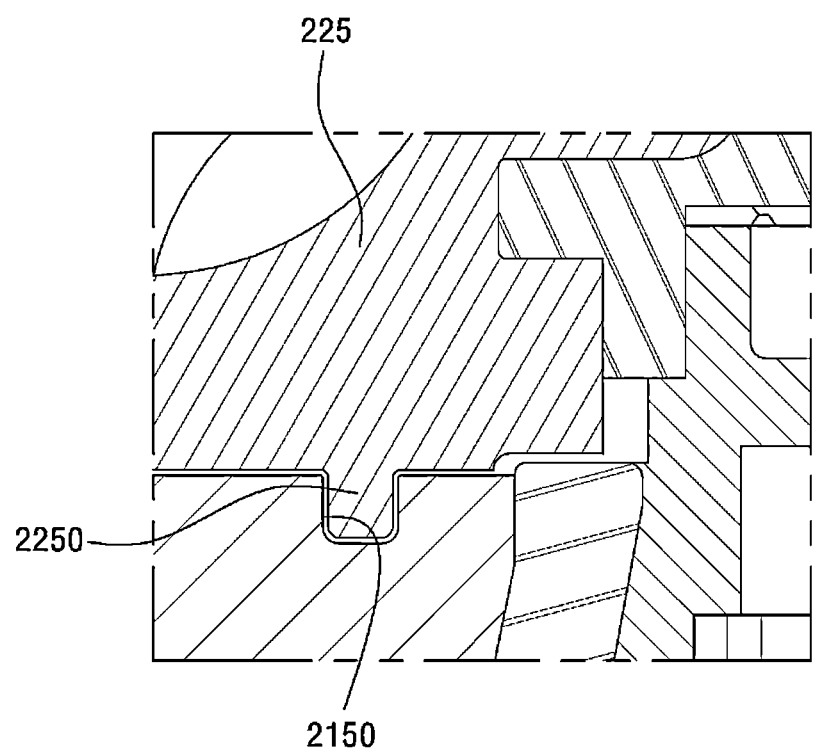
FIG. 23 is a cross-sectional view illustrating the state the cutting part of FIG. 21 is bonded to the bottom surface of the hopper of FIG. 22.
Figure 24:
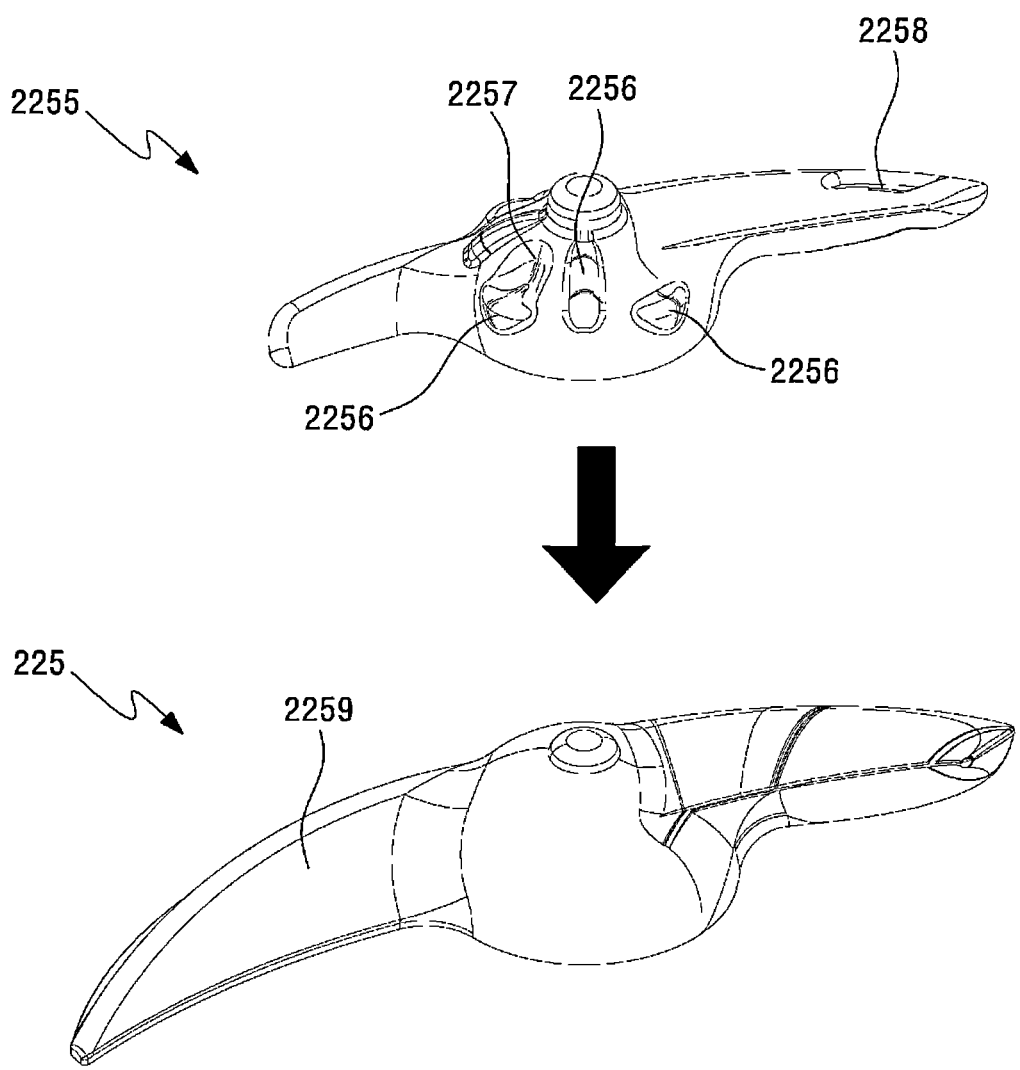
FIG. 24 are views comparatively illustrating a core body formed inside the cutting part and a final form of the cutting part in order to describe the dual structure form of the cutting part according to an embodiment of the present disclosure.
Figure 25:
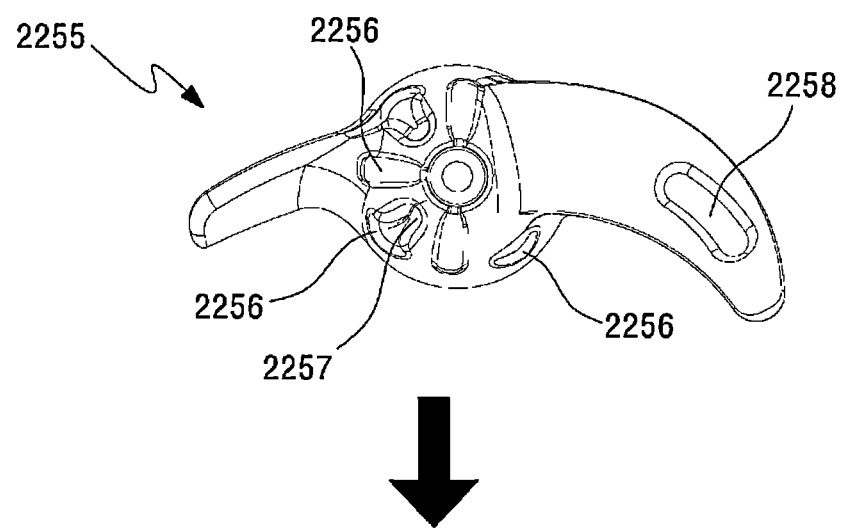
FIG. 25 are views illustrating FIG. 24 from different angles.
Figure 25:
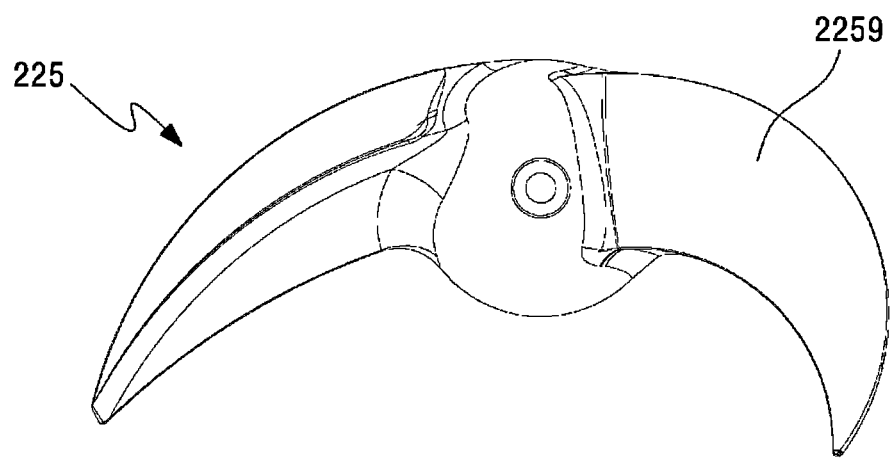
Figure 26:
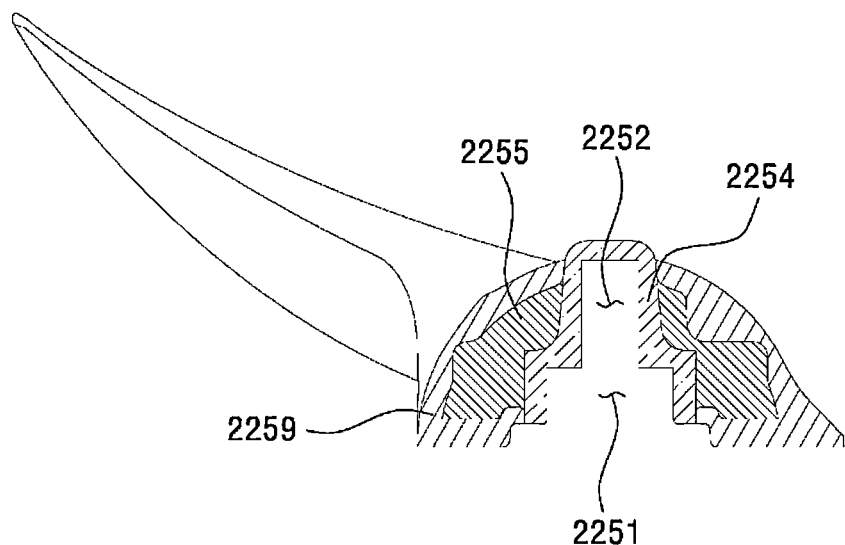
FIG. 26 illustrates a cross-section of the cutting part.
Figure 27:
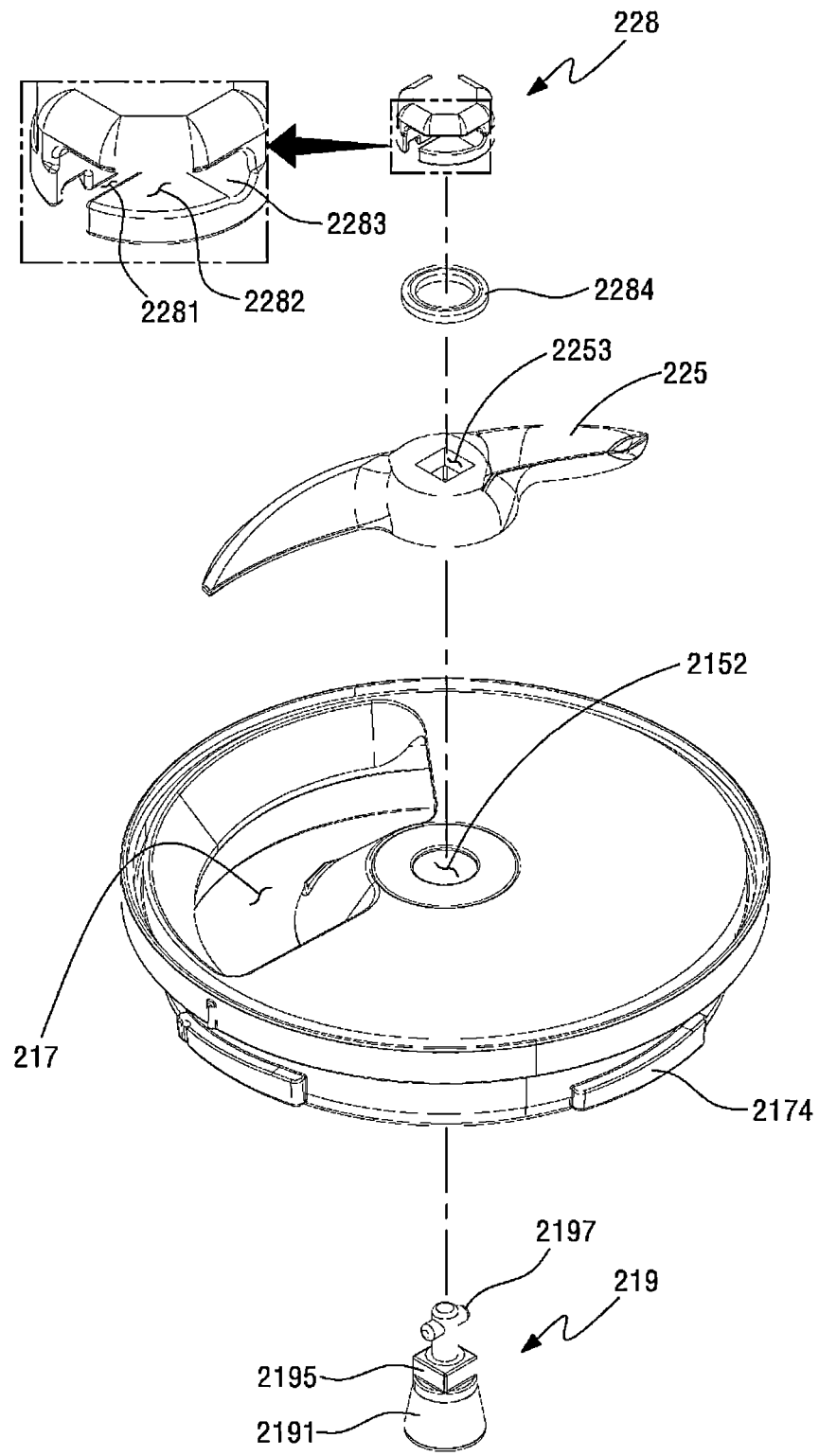
FIGS. 27 to 28 are partial perspective views for describing the detachable structure of the cutting part according to an embodiment of the present disclosure.
Figure 28:
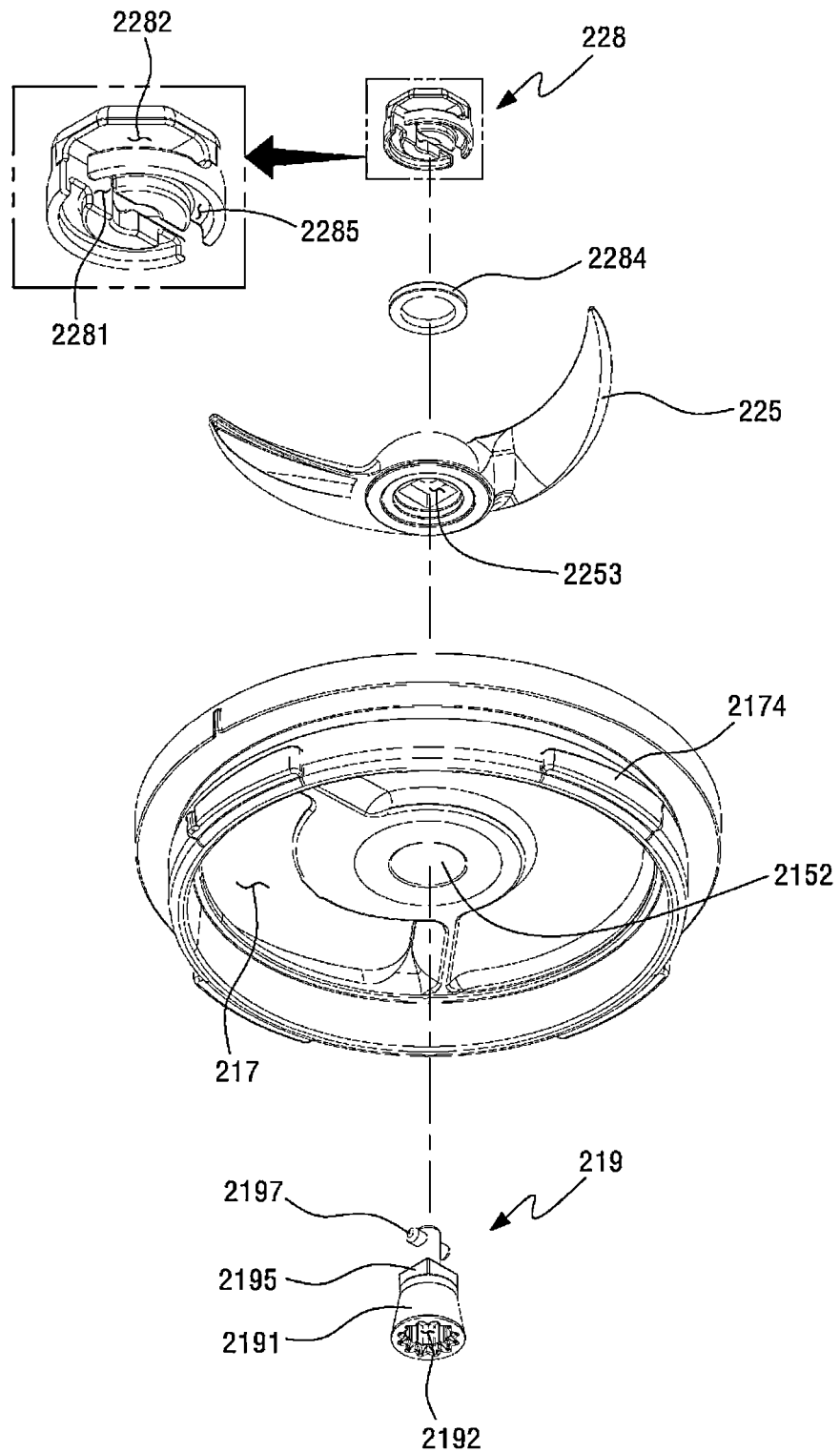
Figure 29:
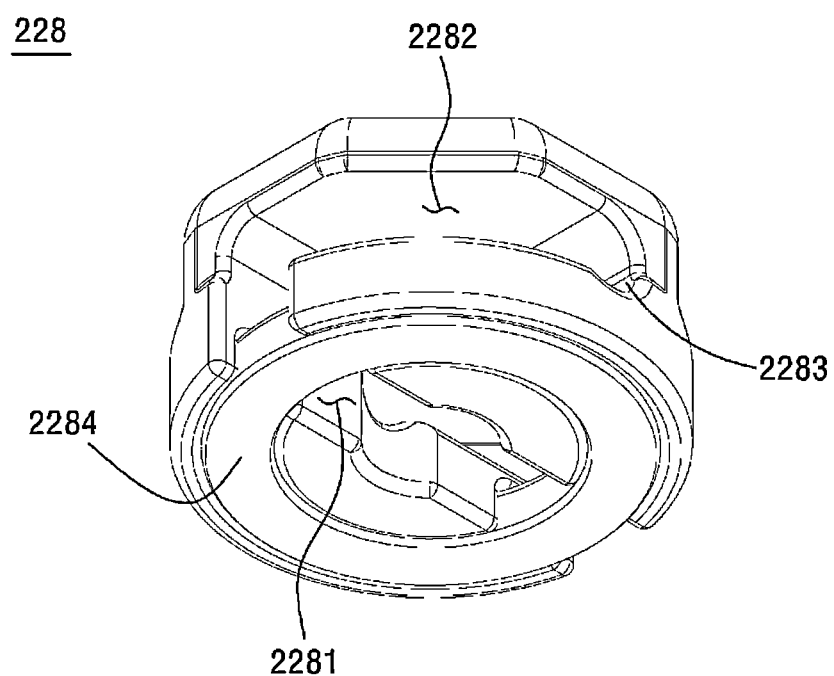
FIG. 29 is a low surface perspective view of a fixing cap, illustrating a state in which an elastic body is fixed to the low surface of the fixing cap in FIGS. 27 to 28.
Figure 31:
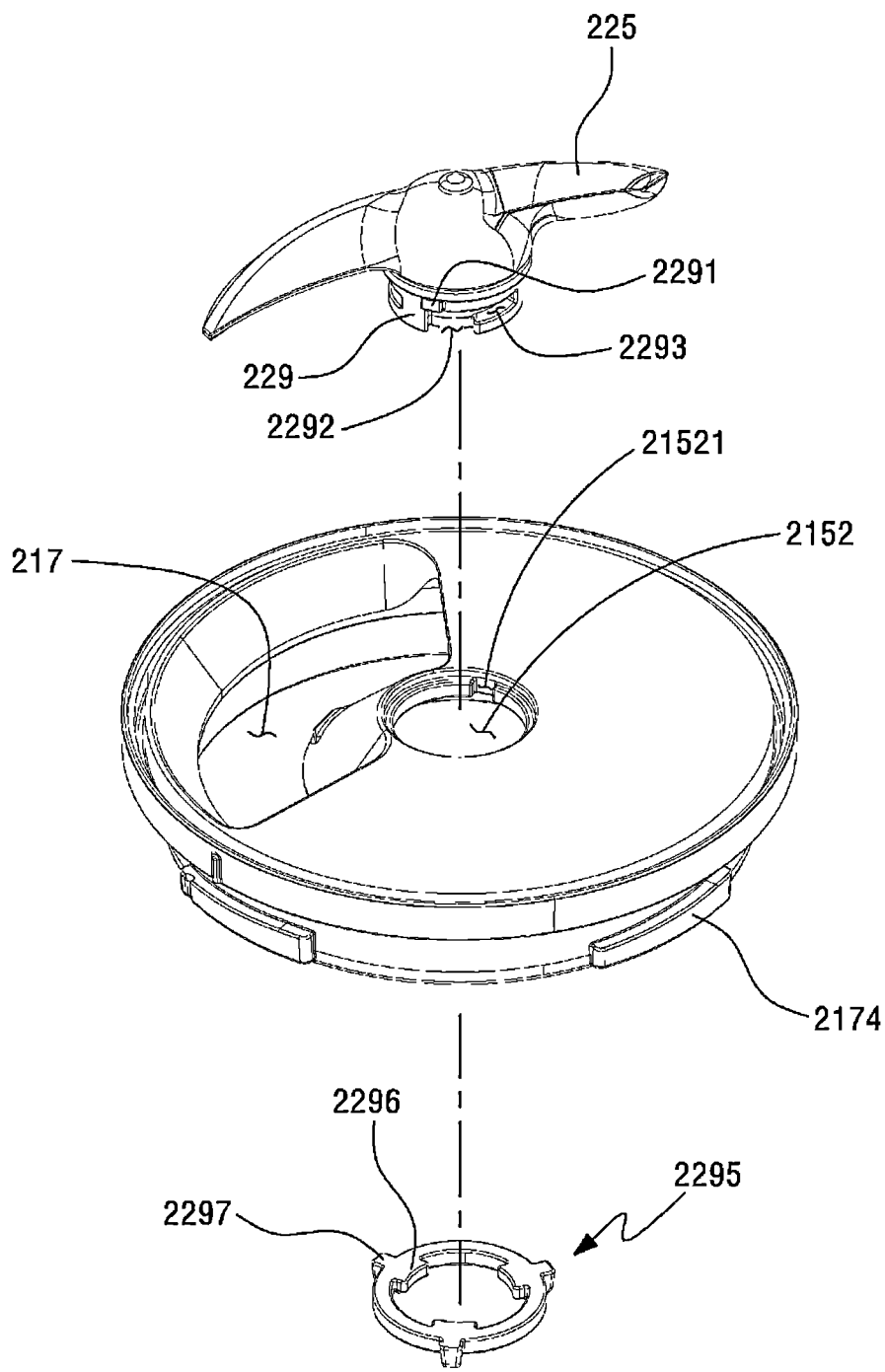
FIGS. 31 to 32 are partial perspective views for describing the detachable structure of the cutting part according to another embodiment of the present disclosure.
Figure 32:
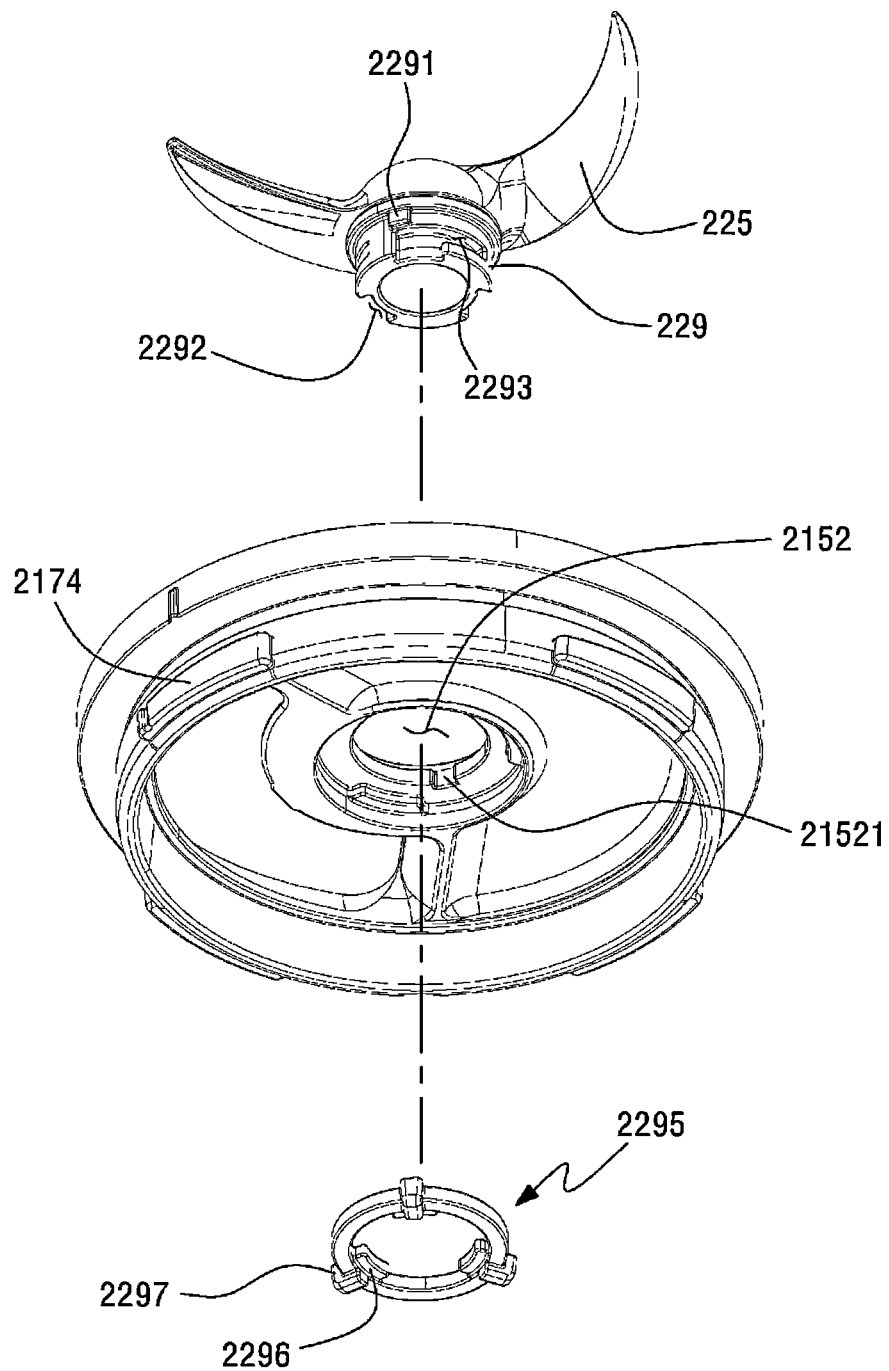
Figure 34:
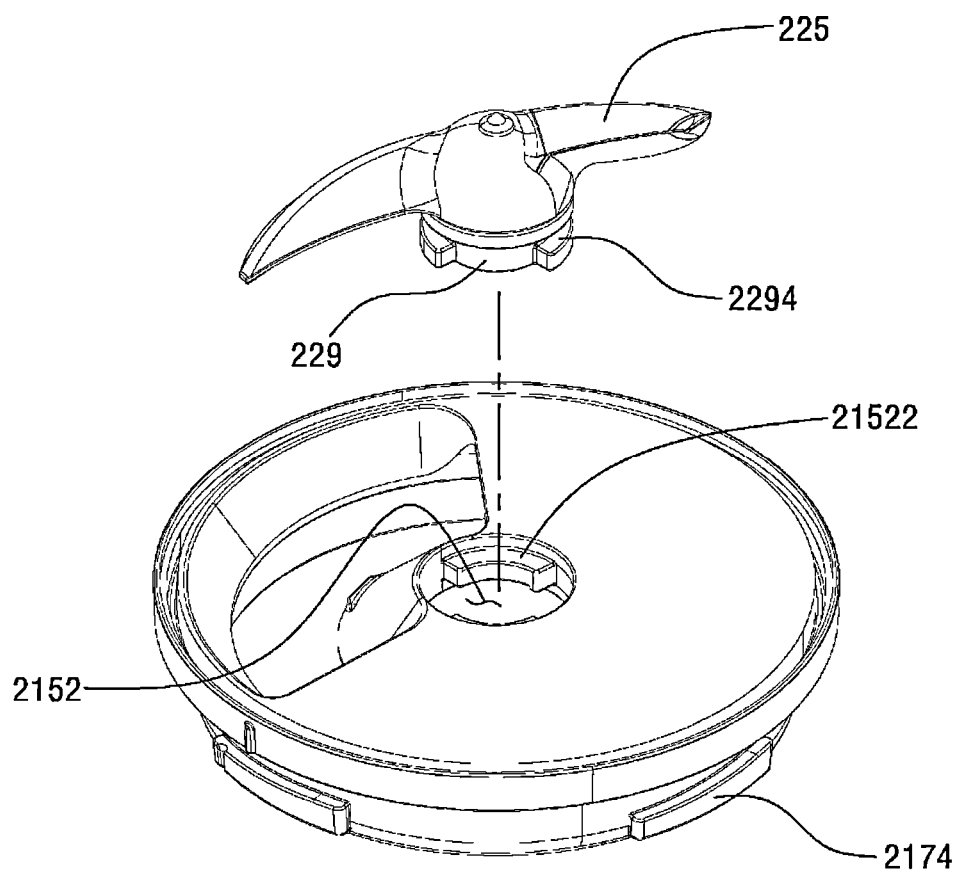
FIGS. 34 to 35 are partial perspective views for describing the detachable structure of the cutting part according to another embodiment of the present disclosure.
Figure 35:
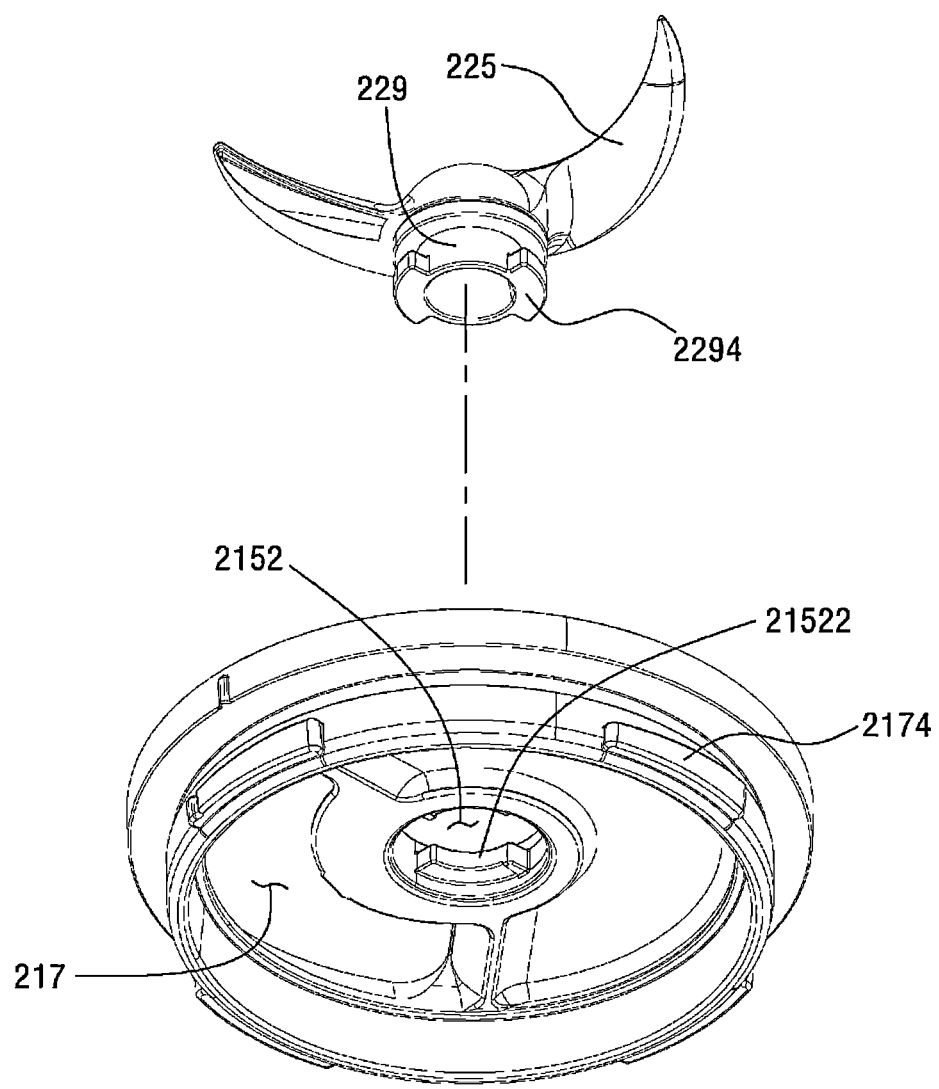

FIGS. 5 and 6 are perspective views of the hopper illustrated in FIGS. 4a and 4b, FIG. 7 is a perspective view of the hopper, illustrating the state where the lid part is open, FIGS. 8a and 8b are exploded perspective views of the hopper illustrated in FIG. 5, FIGS. 9a and 9b are vertical cross-sectional views of the hopper illustrated in FIG. 5, FIGS. 10a and 10b are vertical cross-sectional views of the hopper, illustrating a modified example of the relationship between a first inner projection and the chopping blade. FIG. 11 is a view illustrating a modified example of a safety guide part. FIG. 12 is a horizontal cross-sectional view of the hopper, illustrating a bottom surface of the hopper. FIG. 13 is a low surface view illustrating a low surface of the hopper illustrated in FIG. 5. FIG. 14 is a view illustrating a modified example of the bottom surface of the hopper of FIG. 12. FIG. 15 is a view illustrating a sealing structure of the hopper. FIGS. 16a and 16b are views illustrating how the sealing looks like before and after the coupling of the hopper and a juice extracting drum. FIG. 17 is a perspective view of the cutting part illustrated in FIG. 8. FIG. 18 and FIG. 19 are side views of the cutting part illustrated in FIG. 17. FIG. 20 is a perspective view illustrating a low surface of the cutting part illustrated in FIG. 17. FIG. 21 is a low surface perspective view illustrating a modified example of the cutting part. FIG. 22 is a view illustrating the structure of the bottom surface of the hopper according to FIG. 21. FIG. 23 is a cross-sectional view illustrating the state the cutting part of FIG. 21 is bonded to the bottom surface of the hopper of FIG. 22. FIG. 24 are views comparatively illustrating a core body formed inside the cutting part and a final form of the cutting part in order to describe the dual structure form of the cutting part according to an embodiment of the present disclosure. FIG. 25 are views illustrating FIG. 24 from different angles. FIG. 26 illustrates a cross-section of the cutting part. FIGS. 27 to 28 are partial perspective views for describing the detachable structure of the cutting part according to an embodiment of the present disclosure. FIG. 29 is a low surface perspective view of a fixing cap, illustrating a state in which an elastic body is fixed to the low surface of the fixing cap in FIGS. 27 to 28. FIGS. 30a and 30b are combined perspective views of FIGS. 27 to 28. FIGS. 31 to 32 are partial perspective views for describing the detachable structure of the cutting part according to another embodiment of the present disclosure. FIGS. 33a and 33b are combined perspective views of FIGS. 31 to 32. FIGS. 34 to 35 are partial perspective views for describing the detachable structure of the cutting part according to another embodiment of the present disclosure. FIGS. 36a and 36b are combined perspective views of FIGS. 34 to 35.

The hopper 210 is detachably bonded to an upper portion of the juice extracting drum 280. The hopper 210 forms a space for storing material (for example, fruit, vegetable, grain, etc.) put therein. The cutting part 225 rotatably immobilized on a bottom surface inside the hopper 210 receives the driving force from the screw 230, and rotates, so as to cut and stir the material for juice extraction, and then supplies the cut material for juice extraction to the juice extracting drum 280 which is below the cutting part 225. Therefore, according to the present disclosure, cutting the material for juice extraction is conducted inside the hopper 210, and therefore, there is no need to cut the material for juice extraction beforehand and put them inside.

The hopper 210 may be largely divided into a hopper housing 215 and a lid part 220, and the cutting part 225 may be mounted inside the hopper 210, and therefore, the hopper 210 may be referred to include the cutting part 225.

The hopper housing 215 may have a cylindrical or conical shape, that forms a space for receiving the material for juice extraction through its open upper portion.

As illustrated in FIG. 8, the bottom surface of the hopper housing 215 may be formed to be detachable from the cylindrical main body on the upper portion of the hopper housing 215, but there is no limitation thereto, that is, the bottom surface of the hopper housing 215 may be formed integrally instead.

On the upper portion of the bottom surface of the hopper housing 215, the cutting part 225 may be rotatably mounted. The cutting part 225 may receive the driving force from the screw 230 that is inside the juice extracting drum 280, and rotate together with the screw 230.

On an inner surface of the hopper housing 215, a comb protrusion 2151 that protrudes inwardly longitudinally may be formed along a circumferential direction. This is to inhibit light juice extraction material such as leaf vegetables from absorbing moisture and adhering to the inner surface of the hopper housing 215, and to be easily removeable. Here, it is desirable to form the comb protrusion 2151 on an entirety of the inner surface of the hopper housing 215.

At one side of an outer circumference of the hopper housing 215, a handle part 216 that enables the user to hold the container may be formed. As illustrated, the handle part 216 may extend from an upper end at one of the cylindrical hopper housing 215 in a ring form and extend to a lower end of the hopper housing 215, but the lower end of the handle part 216 may not necessarily be configured to be connected to the lower end of the hopper housing 215.

As illustrated, the handle part 261 may be formed to include a horizontal surface that extends from the upper end of the hopper housing 215 and then a vertical surface that extends vertically downwards, wherein on the horizontal surface of the upper end, a fastening hole 2161 may be formed to allow a hook fastening part 2221 of the lid part 220 to be inserted therein and settled.

On the center of the bottom surface of the hopper housing 215, a connecting hole 2152 that penetrates the bottom surface is formed. Through this connecting hole 2152, an upper rotation shaft 233 of the screw 230 located below the hopper 210 and the cutting part 225 located above the bottom surface of the hopper 210 may be connected such that power can be delivered. Its detailed structure will be described hereinafter.

Between the center of the bottom surface of the hopper housing 215 and the edge of the hopper housing 215, at least one penetrating outlet 217 may be formed. The juice extraction material inside the hopper 210 may be cut and stirred by the cutting part 225 that is rotatably immobilized on the bottom surface inside the hopper 210, and then pass through the outlet 217, and supplied to the juice extraction drum 280 disposed below the hopper 210. In the drawings, one outlet 217 is formed at one side of the bottom surface of the hopper 210, but the greater the number of the outlet 217 or the greater the surface area of the outlet 217, the greater amount (or size) of the material for juice extraction can be supplied to the juice extraction drum 280. However, when a too large amount of juice material is supplied into the juice drum 280, a load may be applied to the screw 230, and thus it is desirable to set the size and number of outlets 217 so that an appropriate amount and appropriate size of material for juice extraction can be supplied.

As illustrated in FIGS. 12 and 13, the width of the outlet 217 may be formed to gradually increase along the rotation direction of the cutting part 225. Therefore, soft material for juice extraction or material for juice extraction that is crushed into small pieces may be immediately introduced into the screw 230 through a narrow part at a front end of the outlet 217, and hard material for juice extraction or material for juice extraction that is crushed into relatively large pieces may be left inside the hopper 210 longer so that it may be crushed additionally by the cutting part 225 and be discharged through the wider part at a rear end of the outlet 217 in a rotation direction.

Further, on an inner surface of the bottom surface of the hopper housing 215, an inclined surface 2171 inclined toward the outlet 217 may be formed. Here, it is preferable that the inclined surface 2171 is formed to be inclined downward along the rotation direction of the cutting part 225. Since the height of the part where the inclined surface 2171 and the outlet 217 meet each other is lower than the height of the bottom surface of the inner side of the hopper housing 215, the material for juice extraction may be guided efficiently towards the outlet 217. By the inclined surface 2171, the material for juice extraction that may be fixed or stagnated between the inner surface of the bottom surface of the hopper housing 215 and the cutting blade 227 of the cutting part 225 may be smoothly moved downward.

Further, as illustrated in FIG. 13, in the present disclosure, an inclined surface 2172 may also be formed on an outer surface of the bottom surface of the hopper housing 215 (lower surface of the hopper 210). The inclined surface 2172 is formed to be inclined downward from the outlet 217 along the rotation direction of the cutting part 225, so that the material for juice extraction can be supplied smoothly to the juice extracting drum 280 through the outlet 217. The inclined surface 2171 formed on the inner surface of the bottom surface of the hopper housing 215 and the inclined surface 2172 formed on the outer surface of the bottom surface of the hopper housing 215 are each formed at the front end and the rear end of the outlet 217 along the rotation direction of the cutting part 225, and the inclination direction is inclined downward along the rotation direction of the cutting part 226.

FIG. 14 illustrates a modified example of the bottom surface of the hopper 210, and in the present embodiment, just as in the aforementioned embodiment, the width of the outlet 217 is formed to gradually increase along the rotation direction of the cutting part 225. Here, there is formed an inclined surface 2173 that is inclined downward from a center of the hopper 210 toward the outlet 217 in a radial direction. Since the width of the outlet 217 gradually increases along the rotation direction of the cutting part 225, the radial direction width of the inclined surface 2173 gradually decreases along the rotation direction of the cutting part 225. By the inclined surface 2173, the size of the outlet 217 in up and down direction may be formed to gradually decrease. By such an inclined surface 2173 that is formed towards the outlet 217 in a radial direction, there is an effect of guiding the material for juice extraction efficiently downwards and letting the material for juice material to remain inside the outlet 217 a little longer, thereby additionally cutting the material for juice material.

On an outer edge of a lower end of the hopper housing 215, a predetermined number of coupling protrusions 2174 are formed protrusively longitudinally in a horizontal direction along the circumference. These coupling protrusions 2174, together with settling protrusions 2801 formed on an inner edge at an upper portion the juice extracting drum 280, detachably couples the juice extracting drum 280 and the hopper 210.

The lid part 220 is formed to enable opening and closing of the open upper portion of the hopper housing 215. On the center of the lid part 220, an additional inlet 2201, that is a penetrating hole, may be formed. When putting relatively smaller sized material for juice extraction during a juice extracting operation, the material for juice extraction may be supplied inside the hopper 210 through the additional input 2201. Further, a pushing rod 290 may be inserted through the additional inlet 2201 to apply force so that the material for juice extraction inside the hopper 210 can move downwards inside the hopper 210. Although not illustrated, a separate lid for plugging the additional inlet 2201 may be formed.

As illustrated in FIGS. 9a and 9b, the additional inlet 2201 is located at the center of the lid part 220. Here, the additional inlet 2201 is formed such that when the pushing rod 290 is inserted through the additional inlet 2201, a lower end of the pushing rod 290 is placed above the center part of the cutting part 225 disposed on the lower end surface of the inner side of the hopper 210, and thus the additional inlet 2201 does not cause interference with the cutting part 225. Especially, as will be described hereinafter, the cutting part 225 of the present disclosure consists of a chopping blade 226 that extends above in a spiral form and a slicing blade 227 that extends horizontally on the lower end surface of the hopper, and since the chopping blade 226 is formed to extend above in a spiral form, even when the lower end of the pushing rod 290 is inserted towards the inner side of the chopping blade 226, interference does not occur, and thus the length of the pushing rod 290 can be made sufficiently long to just above the center of rotation of the cutting part 225.

At one side of the edge of the lid part 220, more specifically, at one side opposite of where the handle part 216 of the hopper housing 215 is formed, a hinge coupling part having a horizontally penetrating pin hole 2203 is formed. The lid part 220 may be hinge-bonded to the upper portion of the hopper housing 215 by placing the pin hole 2203 of the hinge coupling part between a pin immobilizing hole 2153 formed at both sides of the upper end of the hopper housing 214 and then inserting a pin 224 into the pin immobilizing hole 2153 and the pin hole 2203. That is, in the present disclosure, the lid part 220 is hinge bonded from the hopper housing 215 and is formed separately from or integrally with the hopper housing 215.

A magnet placement part 221 is formed to extend vertically downwards from the hinge coupling part. A first magnet 2211 for sensing whether the lid is open or closed is disposed inside the magnet placement part 221. As will be described hereinafter, a second magnet 1102 may be disposed inside an upper main body part 110.

As the magnet placement part 221 rotates and changes its position due to an opening or closing of the lid part 220, the distance between a first magnet 2211 and a second magnet 1102 will change, which will change the magnetism, and by the movement of the second magnet 1102 caused by the change of magnetism, it is possible to sense whether the lid part 220 is open or closed. This will be described in more detail hereinafter with reference to FIGS. 49 to 50.

As the lid part 220 opens, the magnet placement part 221 extending vertically downwards from the hinge coupling part will rotate towards the inner side of the hopper housing 215, and thus interference with the outer side of the hopper housing 215 may occur. Therefore, as illustrated, at an outer surface of the hopper housing 215, an interference prevention groove 2154 may be formed, that is dented inwardly towards the hopper housing 215 so as to form a space allowing the magnet placement part 221 to move towards the center of the hopper.

A lid handle part 222 is formed to protrude outwardly from the lid part 220 that covers the open upper surface of the cylindrical hopper housing 215 at one side opposite the hinge coupling part, and is located above the handle part 216. The lid handle part 222 may be fastened with the handle part 216 at above the handle part 216. The lid handle part 222 is a horizontal surface having a predetermined width, that is formed to protrude from the lid part 220 covering the open upper surface of the hopper housing 215, and at a lower surface of the lid handle part 222, a hook fastening part 2221 is formed to protrude downwardly. Here, the hook fastening part 2221 protrudes vertically downwards to have a plate surface in the width direction of the lid handle part 222 so that it can be pushed by a user's finger towards the user.

As described above, on the upper horizontal surface of the handle part 216, a fastening hole 2161 is formed, that penetrates longitudinally in the width direction in a shape corresponding to the cross-section of the hook fastening part 2221 so that the hook fastening part 2221 can penetrate and be inserted.

Further, an immobilizing step 2222 may be formed at an outer surface of the hook fastening part 2221 so that the hook fastening part 2221 can get caught at one side of a lower edge of the fastening hole 2161, and so that the lid part 220 is not opened but immobilized.

Therefore, when the hook fastening part 2221 of the lid part 220 is inserted into the fastening hole 2161 and the immobilizing step 2222 of the hook fastening part 2221 gets caught at one side of the lower edge of the fastening hole 2161, this inhibits the lid part 220 from being artificially opened while covering the upper open surface of the hopper housing 215.

On the contrary, if the user presses the hook fastening part 2221 towards the user using a second finger and the like while holding the handle part 216, to release the immobilizing step 2222 caught at one side of the edge of the fastening hole 2161, and then applies force to lift the lid handle part 222 upwards using a thumb and the like, the lid part 220 can be opened.

Moreover, at both edges of the bottom surface of the lid handle part 222, a rotation prevention rib 2224 that protrudes downwards longitudinally in the protrusion direction of the lid handle part 222 may be formed. The rotation prevention rib 2224 enables the lid part 220 to be supported from both edges on the upper end of the handle part 216 when the lid part 220 is closed, thereby inhibiting the lid part 220 fastened at the upper portion of the hopper housing 215 through the hinge coupling part from rotating in the horizontal direction.

Moreover, as illustrated in FIG. 7, a safety guide part 223 may be formed, that protrudes vertically downwards longitudinally along a bottom surface edge of the lid part 220 and that may be inserted inside the upper end of the hopper housing 215. The safety guide part 223 inhibits the user's hand from going inside the hopper housing 215 when the lid part 220 is opened by a certain angle. As aforementioned, the juice extractor of the present disclosure does not operate when the lid part is open due to the operations of the first magnet 2211 and the second magnet 1102, and the safety guide part 223 inhibits any unexpected safety incidents from occurring even if the lid part 220 is partially opened but not sensed due to a sensing error of the open/close sensing part 115. Further, the safety guide part 223 may, together with the rotation prevention rib 2224, play the role of inhibiting the lid part 220 from rotating in the horizontal direction.

The safety guide part 223 may be formed to protrude towards the inside of the hopper 200 in a certain height along the edge of the bottom surface of the lid part 220, but as illustrated, the safety guide part 223 may be formed to have an inclined lower end surface such that the protruding height gradually decreases as it gets closer to the hinge coupling part.

FIG. 11 illustrates a modified example of the safety guide part 223. As illustrated, the bottom surface of the lid part 220 is formed to protrude towards the inside of the hopper housing 215, and thus the bottom surface of the lid part 220 may be formed to be inserted inside the hopper housing 215. Further, the bottom surface of the lid part may be formed as an inclined surface such that the protrusion height gradually decreases as it gets closer to the hinge coupling part.

As such, the safety guide part 223 is formed such that a portion of the lid part 220 is inserted inside the upper end portion of the hopper housing 215, thereby inhibiting the user's hand from going inside the hopper housing 215 when the lid part 220 is open by a certain angle.

The cutting part 225 is rotatably bonded on the bottom surface inside the hopper 210, and when receiving a rotation force from the screw 230 located inside the juice extracting drum 280, the cutting part 225 rotates inside the hopper 210, and then cuts and stirs the material for juice extraction put inside the hopper 210, and supplies the cut material for juice extraction through the outlet 217 formed on the lower end surface of the hopper 210 to the inner side of the juice extracting drum 280 located below the hopper 210.

In the present disclosure, the cutting part 225 does not cut the material for juice extraction by rotating in a state where both sides are supported between the lower end and the upper end of the hopper 210, but rather, the cutting part 225 cuts the material for juice extraction in a state where it is supported at one side on the lower end of the hopper 210, and therefore, an open space that is not interfered is formed above the cutting part 225 inside the hopper 210. Therefore, since an entirety of the space above the cutting part 225 forms an open space, large size fruits such as whole fruits and the like can be put into the hopper 210 and cut.

Next, the structure of rotatably coupling the cutting part 225 on the bottom surface of the hopper housing 215, and rotating the cutting part 225 with the rotation force received from the screw 230 will be described with reference to FIGS. 8, 9, 20 and 26.

In a connecting hole 2152 formed on the bottom surface of the hopper housing 215, a bushing part 218 is disposed. The radial direction inner side and outer side of the bushing part 218 are formed in conical forms where the radius decreases as it gets closer to the upper side, and on its lower end, the bushing part 218 protrudes in a circular flange form to form a step 2181. On the inner side of the connecting hole 2152, a conical inclined surface and stumbling step 2158 is formed so as to correspond to the shape of the outer side of the bushing part 218. Here, the bushing part 218 may also be formed integrally on the bottom surface of the hopper housing 215 by an insert injection.

The connecting hole 2152 and the bushing part 218 meet each other in a conical shape where the radius decreases as it gets closer to the upper portion so that when the screw 230 rises due to the load in the juice extracting process and force is applied towards the upper portion, the coupling force between the hopper bottom surface and the bushing part 218 can be firmly maintained, and therefore, deformation by damage of the crew 120 may be inhibited.

Inner side of the bushing part 218 is formed as a hole of which the upper portion and lower portion are open, and thus a driving force transmission part 219 may be inserted therein. When the screw 230 rotates with its upper rotation shaft 233 inserted into the driving force transmission part 219, the driving force transmission part 219 inserted inside the bushing part 218 rotates inside the bushing part 218, and therefore, it is preferable to form the bushing part 218 with a material that is not easily deformed by friction occurring when the driving force transmission part 219 rotates.

The driving force transmission part 219 may consist of a coupling part 2191 and an upper protrusion part 2195. The outer side of the coupling part 2191 is formed in a conical form where the radius decreases as it gets closer to the upper portion so as to correspond to the shape of the inner side of the bushing part 218 having a conical shape of which the radius decreases as it gets closer to the upper portion. The inside of the coupling part 2191 is formed with a shaft hole 2192 into which the upper rotation shaft 233 of the screw 230 is inserted. The upper rotation shaft 233 of the screw 230 is formed as an n square-shaped shaft, and the shaft hole 2192 may be formed as an n square-shaped shaft hole. In the present embodiment, the upper rotation shaft 233 of the screw 230 is formed as a hexagonal shaft, and the shaft hole 2192 may be formed twice of that, that is, as a dodecagonal shaft. The shaft hole 2192 formed in the driving force transmission part 219 can also be formed as a hexagonal shaft hole to correspond to the shape of the upper rotation shaft 233 of the screw 230, but when formed as twice of that, that is, as a dodecagonal shaft hole 2192, the coupling between the upper rotation shaft 233 of the screw 230 and the driving force transmission part 219 may be facilitated. Further, at an entrance of the dodecagonal shaft hole 2192, an inclined surface of which the size of the shaft hole expands may be formed to facilitate the coupling. Therefore, in a case where the upper rotation shaft 233 of the screw 230 is formed as an n square-shaped shaft to facilitate the coupling between the two members, the shaft hole formed in the coupling part 2191 of the driving force transmission part 219 may be formed as an 2*n square-shaped shaft hole.

Here, when the driving force transmission part 219 is fastened to the bushing part 218, the lower surface of the driving force transmission part 219 is located above the lower surface of the bottom surface of the hopper 210, and thus the bottom surface of the shaft hole 2192 is located above the bottom surface of the step 2181. Therefore, the bottom surface of the shaft hole 2192 is located in a more inward side than the bottom surface of the hopper 210, thus not protruding the bottom surface of the hopper 210 (see the partial expansion view of FIGS. 9a and 9b). Therefore, there is an effect of inhibiting any interference from occurring due to unnecessary protrusion, and also an effect of saving the material cost.

On the upper portion of the coupling part 2191, an upper protrusion part 2195 is formed, and when the driving force transmission part 219 is inserted into the bushing part 218 on the lower surface of the hopper housing 215, the upper protrusion part 2195 penetrates the hole of the bushing part 218 to protrude above the upper surface of the bushing part 218, and is located inside the hopper 210. Here, the upper protrusion part 2195 is formed as an quadrangle, and an n square-shaped groove 2251 corresponding to the shape of the upper protrusion part 2195 is formed on the lower surface of the cutting part 225, thereby coupling the cutting part 225 to the upper protrusion part 2195. The shape of the upper protrusion part 2195 and the shape of the groove 2251 on the lower surface of the cutting part 225 corresponding thereto are not limited thereto, but may be modified in various forms including a cross shape, spline shape and the like.

With the upper protrusion part 2195 and the groove 2251 of the lower surface of the cutting part 225 (see FIGS. 20 and 26) coupled, by inserting a screw 2199 through the shaft hole 2192 of the coupling part 2191 to screw-couple to the screw hole 2196 penetrating the upper protrusion part 2195 and the screw groove 2252 (see FIGS. 20 and 26) formed at the center of rotation of the lower surface of the cutting part 22, it is possible to firmly immobilize the cutting part 225 to the upper protrusion part 2195.

At an upper end of the shaft hole 2192 formed on the inner side of the coupling part 2191, a step is formed to limit the insertion depth of the upper rotation shaft 233 of the screw 230, and based on the step, on the upper portion of the step, a screw 2199 head is located.

As aforementioned, as the inner side of the bushing part 218 and the outer side of the driving force transmission part 219 meet in a conical form where the radius decreases as it gets closer to the upper portion, when the screw 230 is applied with rising force, the screw 230 is inhibited from rising. Moreover, the more rising force is applied to the screw 230, the rising of the screw 230 is inhibited. Further, the more rising force is applied to the driving force transmission part 219, the driving force transmission part 219 and the bushing part 218 are located more concentrically, and thus mechanical stability may be improved.

FIGS. 15 and 16 illustrate a sealing structure formed in the hopper 210. As aforementioned, the hopper 210 is settled above the juice extracting drum 280, and this sealing structure plays the role of sealing between two members 210, 280. As illustrated, along the outer edge of the hopper 210, a packing ring 211 may be immobilized. Here, in the present disclosure, the packing ring 211 may be formed in a vertically symmetrical structure. As the packing ring 211 is formed in a vertically symmetrical structure, the packing ring 211 may be assembled to both directions, and it is possible to solve the problem of low packing performance due to change of vertical direction during assembling. For reference, FIG. 15 illustrate the bottom end of the hopper 210.

The packing ring 211 formed in a circular ring form may be formed to include an immobilizing part 2111 inserted into an immobilizing groove that is a groove formed along the outer edge on the lower end of the hopper 210 and a packing wing part 2112 each protruding in a wing form in a radial direction at the upper end and the lower end of the immobilizing part 2111.

As aforementioned, by a coupling protrusion 2174 formed at the outer edge of the lower end of the hopper housing 215 and a settling protrusion 2801 formed at the inner edge above the juice extracting drum 280, the hopper 210 and the juice extracting drum 280 may settled. By inserting and rotating the coupling protrusion through a distanced space between the settling protrusion 2801 and then positioning the coupling protrusion 2174 below the settling protrusion 2801, the two members 210, 2880 may be coupled.

Here, as illustrated, when an inclined surface is formed on a settling surface of the coupling protrusion 2174, depending on the relative position between the settling protrusion 2801 and the coupling protrusion 2174 when coupling the hopper 210 and the juice extracting drum 280, the up and down positioning of the hopper 210 with respect to the juice extracting drum 280 may change. As the coupling between the juice extracting drum 280 and the hopper 210 proceeds by the coupling protrusion 2174 and the settling protrusion 2801, by the inclined surface formed on the settling surface of the settling protrusion 2801, the up and down contact position of the settling protrusion 2801 and the coupling protrusion 2174 may change. Here, as the coupling proceeds, as the hopper 210 moves towards the juice extracting drum 280 by the direction of the inclined surface, the upper end surface of the juice extracting drum 280 contacts with the lower side of the packing wing part 2112, pressurizing the packing wing part 2112. Here, in the drawing, the inclined surface is formed on the settling surface of the coupling protrusion 2174, but if the upper end surface of the juice extracting drum 280 can pressurize the packing wing part 2112 as the coupling between the hopper 210 and the juice extracting drum 280 proceeds, an inclined surface can be formed on the settling surface of the settling protrusion 2801, or an inclined surface can be formed on the settling surface of both the settling protrusion 2801 and the coupling protrusion 2174.

FIGS. 16a and 16b each illustrate the shape of the packing ring 211 before and after the juice extracting drum 280 and the hopper 210 are coupled to each other. The settling protrusion 2801 seals as it rises to pressurize the lower side of the packing wing part 2112. Therefore, with the compression force increased by the inclined surface formed on the settling surface, the sealing force may be improved.

Here, it is preferable that when the coupling of the juice extracting drum 280 and the hopper 210 is completed as illustrated in FIG. 16b, the packing wing part 2112 located on the upper and lower portion do not touch each other, thereby reducing the friction force and improving the fastening o the hopper.

The cutting part 225 is rotatably coupled on the bottom surface of the hopper 210 to cut ad stir the material for juice extraction with the rotation force received from the screw 230 through the driving force transmission part 219.

The cutting part 225 may be configured to include the chopping blade 226 and the slicing blade 227. The chopping blade 226 and the slicing blade 227 may rotate at the same speed. Here, the chopping blade 226 and the slicing blade 227 may be formed integrally, and therefore, the chopping blade 226 and the slicing blade 227 rotate at the same speed.

The chopping blade 226 extends above in a spiral form in the rotation direction of the cutting part 225 from the center of rotation. It is preferable that the upper end of the chopping blade 226 has a cross-section that becomes smaller as it gets closer to the end to form a pointed hook. Further, the chopping blade 226 is not formed in a plate shape, but is formed to have a predetermined thickness, and the cross section becomes smaller as it goes upward, bent in a spiral, and extends upward, so it is formed in the shape of an ox horn.

The chopping blade 226 that faces upwards in a hook form mainly plays the role of chopping and shredding the material for juice extraction put into the upper portion. Further, the chopping blade 226 is formed in the shape having a predetermined thickness instead of a plate form, and therefore, it is possible to inhibit stem vegetable such as water parsley from winding around the chopping blade 226. Further, the shape of extending spirally in the shape of a ox horn plays the role of inducing the material for juice extraction that has been cut to move downwards. Here, the radial direction inner side of the chopping blade 226 has an inclined curved surface 2261 so as to face the radial direction outwards as it gets closer to the lower portion, and therefore allowing the material for juice extraction shredded by the rotating chopping blade 226 can smoothly move downwards along the curved surface.

The higher the height of the upper end of the chopping blade 226, the more the shredding effect, and it is preferable that the upper end of the chopping blade 226 is formed higher than the height of the upper end of the slicing blade 227. Further, it is preferable that the radial direction length of the chopping blade 226 is formed as longitudinally in the radial direction as possible within the range of not causing interference with the inner side of the hopper 210.

The slicing blade 227 is formed to extended horizontally on the lower end surface of the hopper 210. It is preferable that the slicing blade 227 is formed to have a predetermined thickness in the vertical direction as well. As illustrated, on the upper end of where the inclined surface of the front surface and the rear surface in the rotation direction of the slicing blade 227 meet each other, a blade is formed. Here, as illustrated in FIG. 18, an end of the slicing blade 227 may be formed such that its height gradually decreases as it gets closer in the radial direction. By the blade formed at the upper end, the slicing blade 227 plays the role of secondarily shredding the material for juice extraction that has moved downwards after being shredded in the chopping blade 226, and since the slicing blade 227 is formed to have a predetermined thickness, it pushes the material for juice extraction placed on the bottom surface of the hopper 210 so as to be smoothly discharged through the outlet 217. That is because, if the thickness of the slicing blade 227 is thin, a phenomenon may occur where the blade spins with no traction and is not able to push the material for juice extraction placed on the bottom surface of the hopper 210.

It is preferable that the slicing blade 227 is formed to extend from a position that is 180 degrees opposite to the direction in which the chopping blade 226 extends from the center of rotation of the cutting part 225, but there is no limitation thereto. Here, it is preferable that the slicing part 227 is formed to be bent in the opposite direction of the rotation direction of the cutting part 225.

Therefore, in the present disclosure, since the chopping blade 226 and the slicing blade 227 exist in the opposite direction to each other from the rotation center but the end of blades of the chopping blade 226 and the slicing blade 227 are bent to face each other, the overall shape of the cutting part 225 is similar to a crescent.

Further, the chopping blade 226 and the slicing blade 227 are not placed on the same plane, and the chopping blade 226 has a shape of extending upwards as it bends spirally, and therefore the overall shape of the cutting part 225 is similar to a crescent but has a shape as if the two blades are twisted in the space.

Just as the chopping blade 226, it is preferable that the slicing blade 227 is also formed to extend as longitudinally in the radial direction as possible within the range of not causing interference with the inner side of the hopper 210.

As aforementioned, at the rotation center of the lower surface of the cutting part 225, an n square-shaped groove 2251 may be formed to correspond to the shape of the upper protrusion part 2195 of the driving force transmission part 219 that is quadrangle shaped, and above the n square-shaped groove 2251, there is formed a screw groove 2252 where a screw may be fastened. With the n square-shaped groove 2251 fitted to the upper protrusion part 2195 of the driving force transmission part 219, by fastening the cutting part 225 using the screw 2199, it is possible to rotatably mount the cutting part 225 on the inner bottom surface of the hopper housing 215.

FIG. 21 illustrates a modified example of the cutting part 225, and in the present embodiment, on the lower surface of the cutting pat 225, a circular protrusion 2250 is formed, that protrudes in a circular ring form. As illustrated in FIG. 22, on the lower end surface of the hopper 210, a circular groove 2150 corresponding to the circular protrusion is formed, that is a circular groove where the circular protrusion 2250 may be inserted. Therefore, as illustrated in FIG. 23, since the cutting part 225 rotates with the circular protrusion 2250 inserted into the circular groove 2150, the residue inside the hopper 210 can be inhibited from being induced towards the rotation shaft of the cutting part 225. Moreover, it is possible to solve the problem of long vegetables such as stem vegetables or fiber from winding around the rotation shaft of the cutting part 225.

In the present disclosure, an uneven structure was exemplified where the circular protrusion 2250 is formed on the lower surface of the cutting part 225 and the circular groove 2150 is formed on the lower end surface of the hopper 210, but on the contrary, an uneven structure where the circular groove is formed on the lower surface of the cutting part 225 and the circular protrusion is formed on the lower end surface of the hopper 210, is also possible.

Here, in the circular groove 2150 of the lower end surface o the hopper 210, a residue discharge part 21501 may be formed, which communicates with the circular groove 2150 to discharge the residue that is stuck in the circular groove 2150 to outside of the circular groove 2150. As illustrated in FIG. 22, the residue discharge part 21501 may be formed to have another groove that is further dented downwards on a predetermined location of the circular groove 2150 and where one side of the outer side of the circular groove 2150 including the outer side of the other groove has an open surface. Therefore, as the cutting part 225 rotates, the residue stuck in the circular groove 2150 can be pushed and moved to the other groove and be directly discharged through its outer open surface or through the outer open surface of the circular groove. Here, it is preferable to have the residue discharged towards the outlet 217 formed on the bottom surface of the hopper 210 through the open surface.

Here, the cutting part 225 according to an embodiment of the present disclosure may be formed in a dual structure that includes a core body 2255 and an outer shell 2259 that covers the outside of the core body 2255 with a material different from the core body 2255. As illustrated in FIGS. 24 and 25, the core body 2255, that is made of a material that has a relatively greater hardness than the outer shell 2259, forms the inside of the cutting part 225, and the outer shell 2259 is formed to cover the outer side of the core body 2255 and to have a predetermined thickness.

The cutting part 225 must be made of an environmentally friendly material that is harmless to humans, has a great hardness, and that can be easily processed, and that is light. Especially, in the case of the chopping blade 226, as it contacts with the material for juice extraction that is put into the hopper 210 for the first time and that is not cut yet, when rotating, when a strong load is applied, and the hardness is not secured due to the shape characteristics of the hook form, the chopping blade 226 may be easily damaged. Thus, in the present disclosure, the cutting part 225 is formed in a dual structure where the inner side of the cutting part 2255 forms the core body 2255 made of a material with great hardness and the outside of the core body 2255 is covered by the outer shell 2259 made of a material different from the core body 2255, thereby securing hardness and satisfying the remaining conditions required for the cutting part 225 at the same time.

Here, the core body 2255 may be made of an Ultem material, and the outer shell 2259 may be made of a polyoxymethylene or polyacetal (POM) material or an acrylonitrile butadiene styrene (ABS) material.

The core body 2255 and the outer shell 2259 that have different material from each other may be prepared to be coupled firmly through insert injection. The overall shape of the core body 2255 may correspond to the shape of the chopping blade 226 and the slicing blade 226 to be similar to the overall shape of the cutting part 225, wherein the core body 2255 has at least one of a protrusion part 2256 protruding from the surface of the core body 2255, a groove 2257 dented from the surface of the core body 2255, and a penetrating hole 2258 penetrating the core body 2255, thereby increasing the coupling force between the core body 2255 and the outer shell 2259. Here, the outer side of the protrusion part 2256, the inner side of the groove 2257, and the inner side of the penetrating hole 2258 may be formed in a curved surface, to increase the coupling surface area between the core body 2255 and the outer shell 2259, and further, by the curved surface, contact can be made in various directions, thereby strengthening the coupling force between the core body 2255 and the outer shell 2259. Moreover, the outer side of the protrusion part 2256, the inner side of the groove 2257, the inner side of the penetrating hole 2258 may be formed in a curved surface, thereby further increasing the coupling surface area.

As illustrated in the present embodiment, in the surrounding area of the rotation center of the cutting part 225, the protrusion part 2256 and the groove 2257 are formed to extend continuously, and the protrusion part 2256 of the predetermined shape is formed to be distanced along the rotation direction, and in the area corresponding to the chopping blade 226 where a strong load may be applied, the penetrating hole 2258 is formed, thereby strengthening the coupling force.

Further, as illustrated in FIG. 26, it is preferable to prepare a separate a coupling member 2254 where the n square-shaped groove 2251 and the screw groove 2252 are formed on the lower surface of the cutting part 225 that couples between the driving force transmission part 219 and the cutting part 225, and it is preferable to prepare and couple the coupling member 2254, core body 2255 and the outer shell 2259 by insert injection.

The cutting part 225 according to the present disclosure is rotatably immobilized on the lower end surface of the hopper 210, and it may be detachable. The cutting part 225 may be contaminated by the material for juice extraction, and in the present disclosure, the cutting part 225 may be made to be detachable so that it may be separated from the hopper 210 and easily cleaned. Hereinafter, with reference to FIGS. 27 to 36, the detachable structure of the cutting part 225 will be described.

First of all, FIGS. 27 to 30 illustrate the detachable structure of the cutting part 225 according to an embodiment of the present disclosure.

In the present embodiment, as described above, the bushing part 218 is disposed in the connecting hole 2152, and the driving force transmission part 219 is inserted inside the bushing part 218. The configuration of the driving force transmission part 219, that includes the coupling part 2191, the upper protrusion part 2195, and the shaft hole 2192 to which the upper rotation shaft 233 of the screw 230 may be inserted, is the same as the configuration described above with reference to FIGS. 8 to 9, and in the present disclosure, a locking part 2197 is formed, which protrudes in the radial direction from the outer side of the pillar protruding above the upper protrusion part 2195. Here, two locking parts 2197 may be formed on both sides that are symmetrical by 180 degrees.

After inserting the driving force transmission part 219 from below the lower end surface of the hopper 210 into the connecting hole 2152, if the cutting part 225 having an n square-shaped penetrating hole 2253 at the central shaft according to the shape of the upper protrusion part 2195 is inserted into the upper protrusion part 2195 and immobilized, the locking part 2197 protrudes above the cutting part 225. Here, by an immobilizing cap 228 configured to be inserted into the locking part 2197 for immobilization from above the cutting part 225, the cutting part 225 may be rotatably immobilized on the lower end surface of the hopper 210.

The immobilizing cap 228 is a member for covering and immobilizing the locking part 2197 protruding above the cutting part 225, and includes an up/down guide part 2281 that is open upwards from the lower end of the immobilizing cap 228 to provide a path such that the locking part 2197 can move up and down, and an insertion part 2282 for inserting and immobilizing the locking part 2197 in a circumferential direction at the upper end of the up/down guide part 2281. Here, described above, when there are two locking parts 2197 formed to protrude symmetrically, the configuration of the up/down guide part 2281 and the insertion part 2282 may be made in two that are symmetrical.

Therefore, when the immobilizing cap 228 is moved downwards with the lower end of the up/down guide part 2281 positioned in the position of the locking part 2197, the locking part 2197 is placed at the upper end of the up/down guide part 2281, wherein when the immobilizing cap 228 is rotated in a circumferential direction, the locking part 2197 is placed in the insertion part 2282. Therefore, in a state where the cutting part 225 is placed between the driving force transmission part 219 and the immobilizing cap 228, the immobilizing cap 228 may be immobilized to the driving force transmission part 219. In the case of separating the cutting part 225 from the hopper 210, the immobilizing cap 228 may be separated by rotating it in the opposite direction in the reverse order of the aforementioned process.

Here, on the lower surface of the immobilizing cap 228, an elastic body 2284 made of an elastic material, may be immobilized. The elastic body 2284 may be made of, for example, rubber. As illustrated, the elastic body 2284 may be formed in a circular ring shape, and on the lower surface of the immobilizing cap 228, an immobilizing groove 2285 may be formed, that is dented in a circular ring shape so that the elastic body 2284 can be inserted therein and immobilized.

It is preferable that the lower surface of the elastic body 2284 is formed to protrude more downwards than the lower surface of the immobilizing cap 228. Therefore, by allowing the immobilizing cap 228 to be rotated and placed in the insertion part 2282 only when the elastic body 2284 is compressed by applying force of pressurizing the immobilizing cap 228 downwards from above the cutting part 225, it is possible to further strengthen the immobilizing force by the immobilizing cap 228.

Further, on the bottom surface of one end in the circumferential direction of the insertion part 2282, a seating groove 2283 may be formed, that is dented inwardly so as to seat the locking part 2197. When the locking part 2197 is placed above the seating groove 2283, as the immobilizing cap 228 is moved upwards by the elastic force of the elastic body 2284, the locking part 2197 may be seated on the seating groove 2283. Therefore, it is possible to inhibit the locking part 2197 from being stuck in the seating groove 2283 and the coupling from being easily released. In order to release the coupling of the immobilizing cap 228, it is possible to pressurize the immobilizing cap 228 downwards in order to release the state where the locking part 2197 is stuck in the seating groove 2283, and compress the elastic body 2284, so that the locking part 2197 is placed to be spaced apart on the upper portion of the seating groove 2283, and in this state, by rotating the immobilizing cap 228 in the circumferential direction, the immobilized coupling of the immobilizing cap 228 can be released.

Next, with reference to FIGS. 31 to 33, the detachable structure of the cutting part 225 according to another embodiment of the present disclosure will be described.

In the present embodiment, on the rotation shaft of the cutting part 225, a rotation support part 229 for rotatably supporting the cutting part 225 is formed. Therefore, a shaft bundle is formed for enabling relative rotation of the cutting part 225 with respect to the rotation support part 229. The rotation support part 229 is made in the form where it protrudes outwardly of the connecting hole 2152 when inserted into the hopper 210 for detachment while playing the function of the bushing part 218 described above.

When the shaft bundle including the rotation support part 229 is inserted into the connecting hole 2152 formed at the center of the lower end surface of the hopper 210 inside the hopper 210, the rotation support part 229 protrudes below the lower end surface of the hopper 210. Here, it is possible to immobilize the cutting part 225 to the periphery of the rotation support part 229 that protrudes below the lower end surface of the hopper 210, to immobilize the cutting part 225 that includes the shaft bundle to the bottom surface of the hopper 210. On the contrary, when the coupling between the immobilizing part 2295 and the rotation support part 229 is released, the cutting part 225 that includes the shaft bundle can be separated from the hopper 210.

The immobilizing part 2295 may be formed in a circular ring form, and may include at least one or more immobilizing protrusion parts 2296 that protrude inwardly in the radial direction. In the present embodiment, three immobilizing protrusion part 2296 spaced equally are formed inwardly in the radial direction.

To correspond to the immobilizing part 2295, on an outer circumference surface of the rotation support part 229, an up/down guide part 2292 may be formed, having a groove providing a path that is open upwards from the lower end of the rotation support part 229 to enable up and down movement of the immobilizing protrusion part 2296 of the immobilizing part 2295, and an insertion part 2293 that is a groove for inserting the immobilizing protrusion part 2296 in the circumferential direction from the upper end of the up/down guide part 2292. Therefore, with the rotation support part 229 protruding below the lower end surface of the hopper 210, by placing the immobilizing protrusion part 2296 of the immobilizing part 2295 below the lower end of the up/down guide part 2292 and then raising the immobilizing part 2295 to be disposed on the upper end of the up/down guide part 2292, and then rotating the immobilizing part 2295 so that the immobilizing protrusion part 2296 of the immobilizing part 2295 is placed in the insertion part 2293, it is possible to immobilize the immobilizing part on the outer circumference surface of the rotation support part 229. With the immobilizing part 2295 immobilized to the outer circumference surface of the rotation support part 229, it is possible to have the upper surface of the immobilizing part 2295 to contact the lower surface of the hopper 210, and firmly immobilize the cutting part 225 that includes the shaft bundle.

A grip part 2297 that protrudes outwardly in the radial direction of the immobilizing part 2295 may be formed, and by holding the grip part 2297 and applying force, it is possible to easily rotate the immobilizing part 2295 when coupling or releasing.

Further, in a predetermined location of the outer circumference surface of the rotation support part 229, at least one or more protruding guide protrusion parts 2291 may be formed, and on the inner side of the connecting hole 2152, a guide groove part 21521 for inserting the guide protrusion part 2291 may be formed to correspond to the guide protrusion part 2291. When inserting the cutting part 225 including the shaft bundle through the connecting hole 2152, by enabling the guide protrusion part 2291 to be inserted into the guide groove part 21521, it is possible to guide the insertion position of the shaft bundle.

Next, FIGS. 34 to 36 illustrate the detachable structure of the cutting part 225 according to another embodiment of the present disclosure.

In the present embodiment, the configuration where the rotation support part 229 is formed on the rotation shaft of the cutting part 225 to rotatably support the cutting part 225 to form the shaft bundle is identical to the embodiment described above. However, there is a difference that in the present disclosure, instead of being immobilized and coupled by the immobilizing part 2295 below the lower end surface of the hopper 210, the shaft bundle that includes the rotation support part 229 is detachably coupled directly to the connecting hole 2152 formed in the center of the lower end surface of the hopper 210.

In the present disclosure, on the outer circumference surface of the rotation support part 229, at least one or more immobilizing protrusion part 2294 is formed, and in the inner circumference surface of the connecting hole 2152, an insertion part (not illustrated) for inserting the immobilizing protrusion part 2296 may be formed. Although not illustrated, just as the configuration where the immobilizing protrusion part 2296 of the immobilizing part 2295 is inserted and immobilized in the insertion part 2293 formed on the outer circumference of the rotation support part 229 as described in the aforementioned embodiment, with the configuration where the immobilizing protrusion part 2294 protruding on the outer circumference surface of the rotation support part 229 is inserted into the insertion part (not illustrated) formed in the inner circumference surface of the connecting hole 2152, it is possible to immobilize the shaft bundle in the connecting hole 2152.

Further, as illustrated, on the inner circumference surface of the connecting hole 2152, an immobilizing step part 21522 is formed, that is spaced apart in the circumferential direction and protrudes inwardly in the radial direction, and in a state where the immobilizing protrusion part 2296 is inserted between the distanced space of the immobilizing step part 21522, the shaft bundle including the rotation support part 229 may be rotated, so that the immobilizing protrusion part 2296 is placed below the immobilizing step part 21522, thereby immobilizing the cutting part 225 including the shaft bundle on the lower end surface of the hopper 210.

Again, to describe about the configuration of the hopper 210, on the inner side of the hopper 210, at least one or more first inner protrusions 2155 may be formed, that interact with the chopping blade 226. As illustrated in FIGS. 9a and 9b, the first inner protrusions 2155 may be formed to protrude below the inner side longitudinally in the vertical direction on the inner side of the hopper 210. The first inner protrusions 2155 interact with the chopping blade 226, and plays the role of catching and holding the material for juice extraction put into the hopper 210, thereby improving the efficiency of shredding by the chopping blade 226. If it were not for the first inner protrusion 2155, a phenomenon may occur where the material for juice extraction rotates together with the chopping blade 226 without being cut. If there were no first inner protrusion 2155, a phenomenon may occur where the material for juice extraction rotates together with the chopping blade 226 without being cut. However, when the chopping blade 226 is rotated in a state where the material for juice extraction is supported in the rotation direction by the first inner protrusion 2155, the material for juice extraction can be easily shredded. Therefore, it is preferable that the height of inward protrusion of the first inner protrusion 2155 is relatively great compared to the second inner protrusion that will be described hereinafter so as to support the material for juice extraction in the radial direction.

By the aforementioned interference prevention groove 2154, one side of the outer circumference surface of the hopper 210 is inwardly dented, and as illustrated, together with the interference prevention groove 2154, the first inner protrusion 2155 may be configured.

Here, the lower end of the first inner protrusion 2155 may be formed to be placed at the upper end of the chopping blade 226, and as illustrated in FIG. 9a, at the lower end of the first inner protrusion 2155, a penetrating groove 2156 that penetrates both sides may be formed. Here, the upper end of the chopping blade 226 may pass through the penetrating groove 2156. As a penetrating groove 2156 is formed on the lower end of the first inner protrusion 2155 so as to correspond to the shape of the upper end of the chopping, the lower end of the first inner protrusion 2155 and the upper end of the chopping blade 226 may be placed to overlap each other. At the same time, by further increasing the radial direction length of the chopping blade 226, it is possible to increase the cutting efficiency.

FIG. 10a illustrates a modified example of the position relationship between the first inner protrusion 2155 and the chopping blade 226, and the lower end of the first inner protrusion 2155 and the chopping blade 226 do not overlap each other, and are spaced apart. The upper end of the chopping blade 226 is located below the lower end of the first inner protrusion 2155.

However, in the present disclosure as well, a penetrating groove 2156 (see FIG. 9b) that penetrates through both lower ends of the first inner protrusion 2155 and that is dented to the upper portion may be formed. Here, the penetrating groove 2156 provides a space for the material shredded by the first inner protrusion 2155 and the chopping blade 226 to be discharged smoothly in the circumferential direction. When hard fruits or vegetable such as carrots are stuck in the first inner protrusion 2155, a lot of load is applied, and the space secured by the penetrating groove 2156 allows the material shredded by the first inner protrusion 2155 and the chopping blade 226 to be discharged smoothly.

FIG. 10b illustrates another modified example of the position relationship between the first inner protrusion 2155 and the chopping blade 226, and in the present embodiment, based on a virtual line extending to an end line of the inner end of the first inner protrusion 2155, an upper outer end line of the chopping blade 226 is identical to that or placed further inwardly in the radial direction. In this way, the material of a larger caliber can be introduced into the juice extracting drum more smoothly using the chopping blade 226.

Further, on the inner side of the hopper 210, at least one or more second inner protrusions 2157 that interact with the slicing blade 227 may be formed. As illustrated in FIGS. 9a and 9b, the second inner protrusion may be formed to protrude inwardly in the radial direction corresponding to the position at which the end of the slicing blade 227 rotates on the inner side of the hopper 210. The second inner protrusion 2157 interacts with the slicing blade 227. The second inner protrusion 2157 inhibits the material for juice extraction from spinning with no traction together with the slicing blade 227, above the slicing blade 227, thereby allowing the material for juice extraction to be introduced smoothly into the outlet 217. Some of the material for juice extraction placed on the bottom surface of the hopper is pushed as the slicing blade 227 rotates, and therefore, introduced into the outlet 217, and others of the material for juice extraction gradually moves outwards in the radial direction by the centrifugal force, and if there were no second inner protrusion 2157, a problem may occur where the material for juice extraction placed above the slicing blade 227 is not introduced into the outlet 217 but spins with no traction above the slicing blade 227 together with the slicing blade 227. together. Here, the material for juice extraction that is pushed outwards above the slicing blade 227 by the centrifugal force may collide with the second inner protrusion 2157 and break loose away from the slicing blade 227.

In the present embodiment, the second inner protrusion 2157 is formed below the first inner protrusion 2155. Further, forming the outlet 217 vertically below the first inner protrusion 2155 and the second inner protrusion 2157 enables the material for juice extraction that is cut by and broken loose from the first inner protrusion 2155 and the second inner protrusion 2157, to fall vertically below and to be supplied directly inside the juice extracting drum 280 through the outlet 217.

Hereinafter, description will be made regarding the screw 230, juice separating drum 260, juice extraction drum 280, that constitute the juice extracting part 200, and that are placed below the hopper 210. First, the screw 230 will be described with reference to FIGS. 37 to 40.

Figure 37:
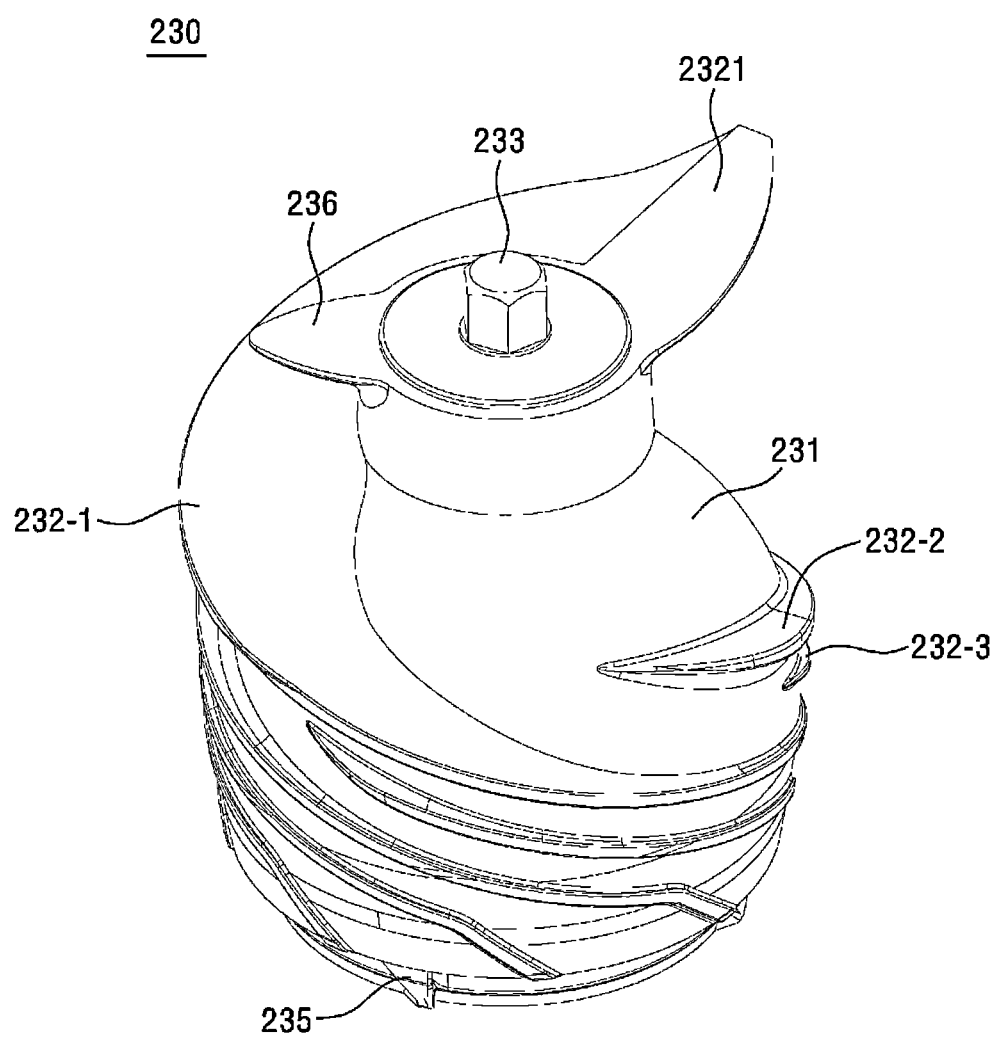
FIG. 37 is a perspective view of a screw illustrated in FIGS. 4*a* and 4*b*.
Figure 38:
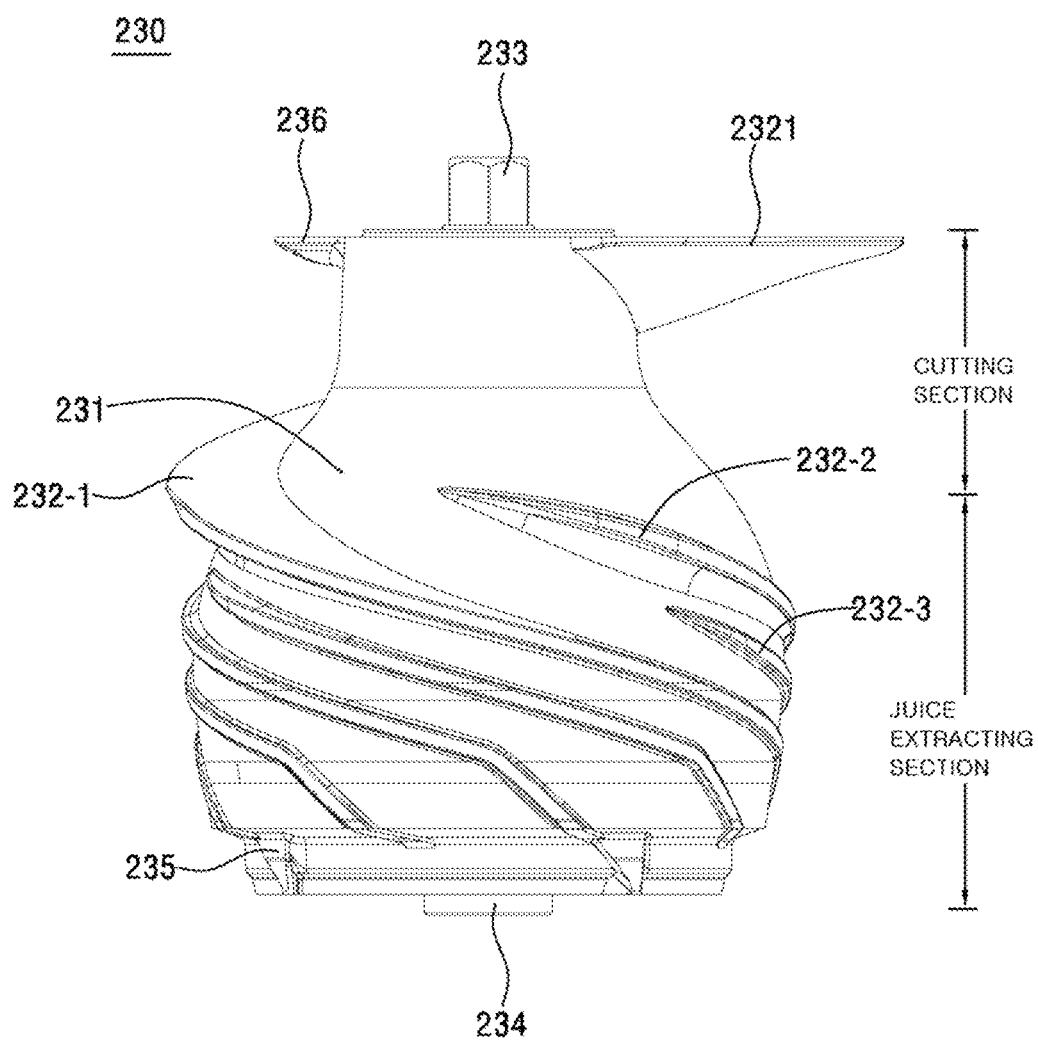
FIG. 38 is a side view of FIG. 37.
Figure 39:
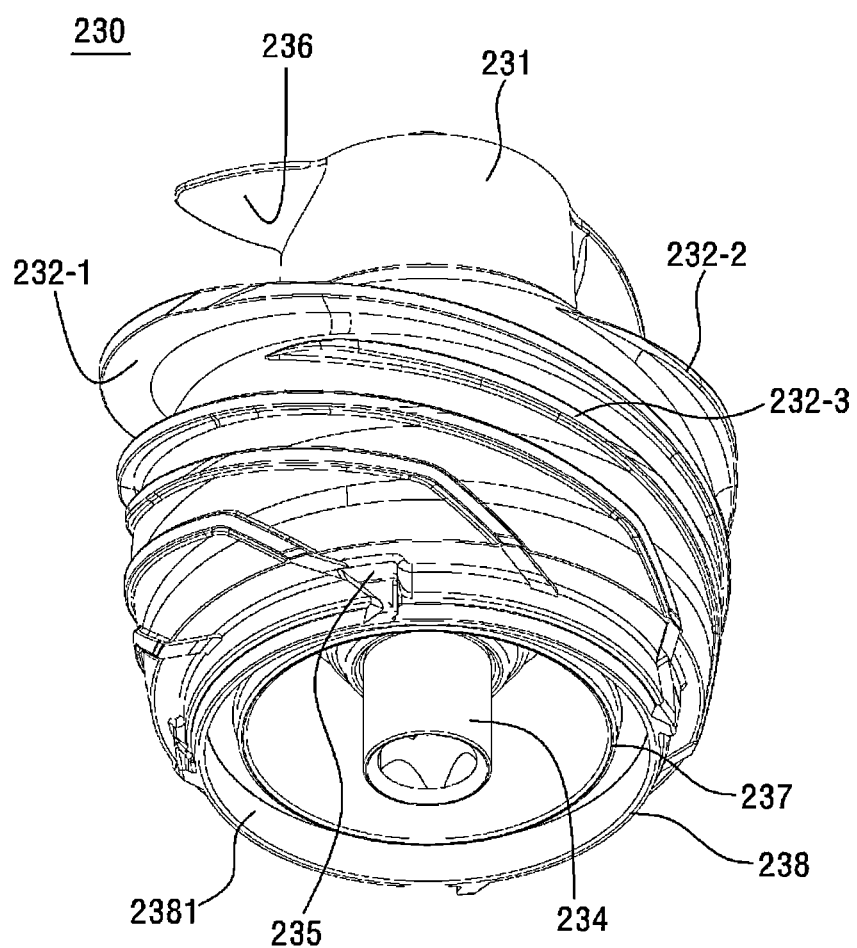
FIG. 39 is a perspective view illustrating a low surface of the screw illustrated in FIG. 37.
Figure 40:
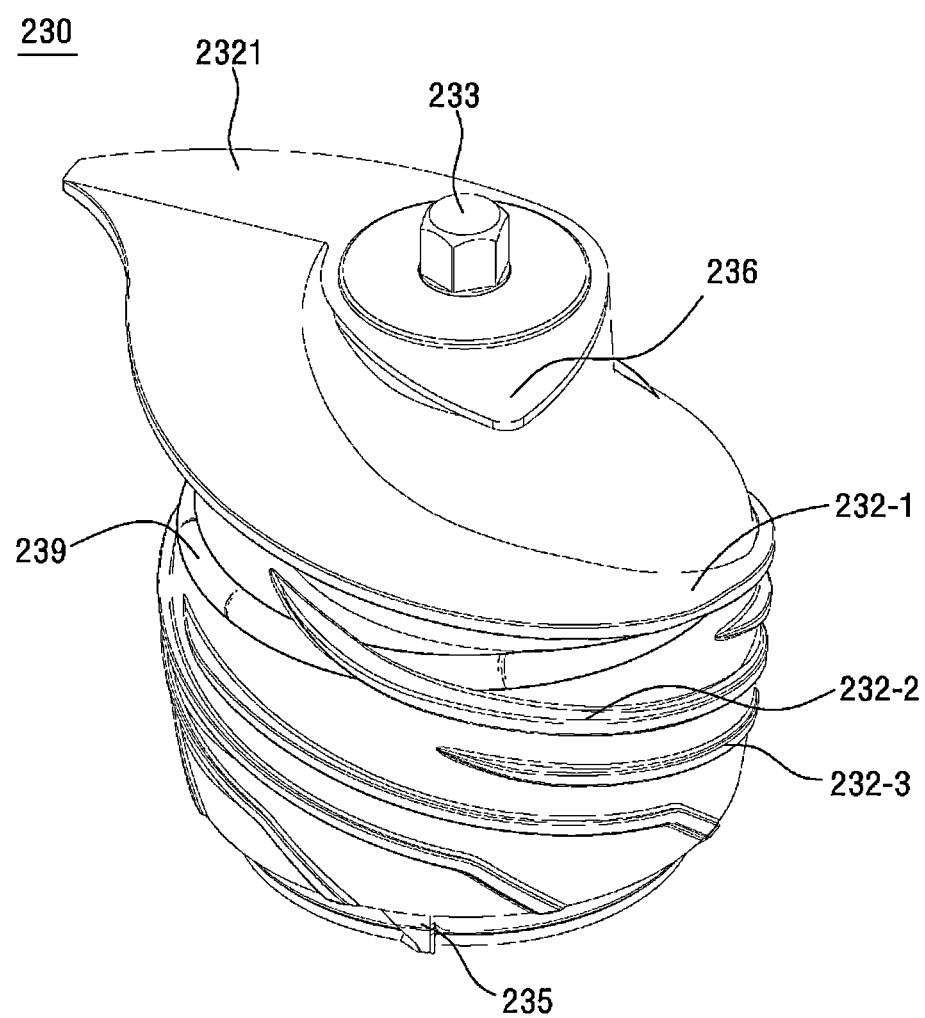
FIG. 40 is a modified example of the screw illustrated in FIGS. 37 to 39.

FIG. 37 is a perspective view of the screw illustrated in FIGS. 4a and 4b, FIG. 38 is a side view of FIG. 37, FIG. 39 is a perspective view illustrating a lower surface of the screw illustrated in FIG. 37, and FIG. 40 is a modified example of the screw illustrated in FIGS. 37 to 39.

The screw 230 is mounted inside the juice separating drum 260, and receives the rotation force from the driving shaft 130 to rotate, compressing and crushing the material for juice extraction together with the juice separating drum 260.

The screw 230 may be formed to include a screw body 231 and a screw thread 232 protruding in a spiral form on the outer side of the screw body 231.

As illustrated, the screw body 231 may be divided into an upper portion and a lower portion based on the area having the largest diameter in the screw body 231. Here, the upper portion forms a cutting section of additionally cutting the material for juice extraction being put into from the hopper 210, and the lower portion forms a juice extracting section of compressing the material for juice extraction and producing the juice in earnest below the cutting section.

The lower portion of the screw body 231 is formed such that the diameter gradually decreases as it gets closer to the bottom, thereby forming a space for the residue separated by juice extraction. However, the shape of the lower portion of the screw body 231 is not limited thereto. For example, the lower portion of the screw body 231 may be formed in a straight downward line without having any changes in diameter.

Further, the upper portion of the screw body 231 is formed such that the diameter gradually decreases as it gets closer to the top, and as illustrated, and the degree of change in diameter according to change in height is larger than compared to the lower portion of the screw body 231. The foremost end of the screw body 231 has the smallest diameter and is formed to become bigger as it gets closer to the bottom. Due to this shape, the size of the material gets gradually smaller by the compression and crushing, providing space for the material to be transferred. In other words, since the diameter of the upper portion of the screw body 231 becomes gradually bigger as it gets closer to the bottom, the size of the space where the material is to be transferred, formed by the screw body 231 together with the screw thread 232, becomes gradually smaller along the transfer direction of the material. That is, as the material is compressed and crushed by the rotation of the screw 230, the size of the material becomes gradually smaller, as it moves down the screw 230 along the transfer space that becomes gradually smaller along the screw thread 232 formed in a downward direction.

The screw thread 232 is formed to protrude in a spiral form on the outer circumference surface of the screw body 231, and as the subject of juice extraction is compressed in the narrow gap between the screw 230 and the juice separating drum 260 by this screw thread 232, it is transferred downwards. Here, it is preferable that the screw thread 232 protrudes such that it touches or is close to the juice separating drum 260. As described above, the diameter of the upper portion of the screw body 231 becomes gradually smaller as it gets closer to the top, and therefore, as it gets closer to the upper portion of the screw body 231, the height of protrusion of the screw thread 232 becomes bigger.

The screw thread 232 may be formed in one or in plural, and in the present disclosure, of a plurality of screw threads 232, any one screw thread (first screw thread 232-1) may be formed to extend to the upper end of the screw body 231, forming a single blade 2321 at the upper end of the screw body 231, so that a single blade screw 230 may be used. Using a double-blade screw where two screw threads extend symmetrically towards the upper end of the screw body 231 takes a lot of load, and therefore, the present disclosure uses the single blade screw 230, but there is no limitation thereto.

Here, in the present disclosure, the diameter of the single blade 2321 of the upper end of the screw body 231 may be formed to protrude further outwards than the longest diameter of the screw body 231. As such, by forming the size of the diameter of the single blade 2321 to be greater than the longest diameter of the screw body 231 while maintaining the size of the screw body 231 as it was, it is possible to obtain a larger space for the material for juice extraction being put into from above. This enables the material for juice extraction subdivided in the hopper 210 above to be introduced into the screw 230 more smoothly.

As illustrated, a second screw thread 232-2 may be formed downwardly in a spiral starting from the upper portion of the screw body 231, that is the juice extracting section, and between the first screw thread 232-1 of the lower portion of the screw body 231 and the second screw thread 232-2, another screw thread, a third screw thread 232-3, may be formed. Therefore, the width between the neighboring screw threads 232 formed in the screw body 231 is relatively great in the upper portion of the screw body 231, whereas in the lower portion of the screw body 231, the width is relatively narrow due to the multiple number of screw threads 232. That is, the cutting section, which is the upper portion of the screw 230, may mainly perform the function of crushing large-size subjects for juice extraction, while the juice extracting section, which is the lower portion of the screw 230, mainly performs the juice extracting function through crushing and compression by rotation of the screw 230.

Further, a plurality of residue guide step 235 may be formed in a circumferential direction, to protrude outwardly of the diameter of the lower end of the screw body 231. The residue guide step 235 performs the function of sweeping down the residue separated by juice extraction when the screw 230 rotated and then transferred below the juice separating drum 260. By such a residue guide step 235 formed on the outer circumference surface of the diameter of the lower end of the screw 230, it is possible to smoothly remove the residue stuck below the juice separating drum 260, thereby further increasing the juice extraction efficiency.

The rotation shaft 233 of the upper portion of the screw 230 protruding above the upper end of the screw body 231 is formed in an n square-shaped shaft, and is coupled to the n square-shaped shaft hole 2192 of the driving force transmission part 219, to deliver the driving force to the cutting part 225.

Further, a rotation shaft 234 of the lower portion of the screw 230 protruding downwards from the inside hollow of the screw body 231 is formed as a n square-shaped shaft hole, and the rotation shaft 234 is inserted into the n square-shaped driving shaft 130 protruding from the upper portion of the main body 100, to receive the driving force from a motor 1001. As described regarding the coupling structure between the rotation shaft 233 of the upper portion of the screw 230 and the driving force transmission part 219, it is possible to form the driving shaft 130 as an n square-shaped shaft and form the rotation shaft 234 of the lower portion of the screw 230 as an n square-shaped shaft hole, facilitating the coupling between the two members. For example, in the case of forming the driving shaft 130 as a hexagonal square-shaped shaft, the rotation shaft 234 of the lower portion of the screw 230 may be formed as a dodecagonal shaft hole.

At the top end of the screw body 231, a grip part 236 may be formed. The grip part 236 may be formed to protrude from the top end of the screw body 231 having a single blade 2321 and a predetermined horizontal direction angle, which is to facilitate the user to easily grab and take out the screw 230 mounted inside the juice extracting drum 280 together with the single blade 2321 for reasons such as cleaning, etc.

FIG. 40 illustrate a modified example of the screw 230 described above, and in the present embodiment, along the circumferential direction in the form of a circular ring or belt at a boundary point of the upper portion and the lower portion of the screw 230 between the cutting section and the juice extracting section, an overload prevention rib 239 is formed, that protrudes by a predetermined thickness from the screw main body 231.

The overload prevention rib 239 is for inhibiting an overload caused by the pressure of the screw 230 in the juice extracting section if too much material of juice extraction is supplied from the cutting section to the juice extracting section. By the overload prevention rib 239, the distance between the screw 230 and the juice separating drum 260 will be reduced, thereby inhibiting too much material for juice extraction from being put into the space in between.

The rest of the configuration of the screw 230 except for the overload prevention rib 239 is identical to the aforementioned, and thus description about the identical configuration will be omitted.

Hereinafter, the juice separating drum 260 according to an embodiment of the present disclosure will be described in detail with reference to FIGS. 41 to 43.

Figure 41:
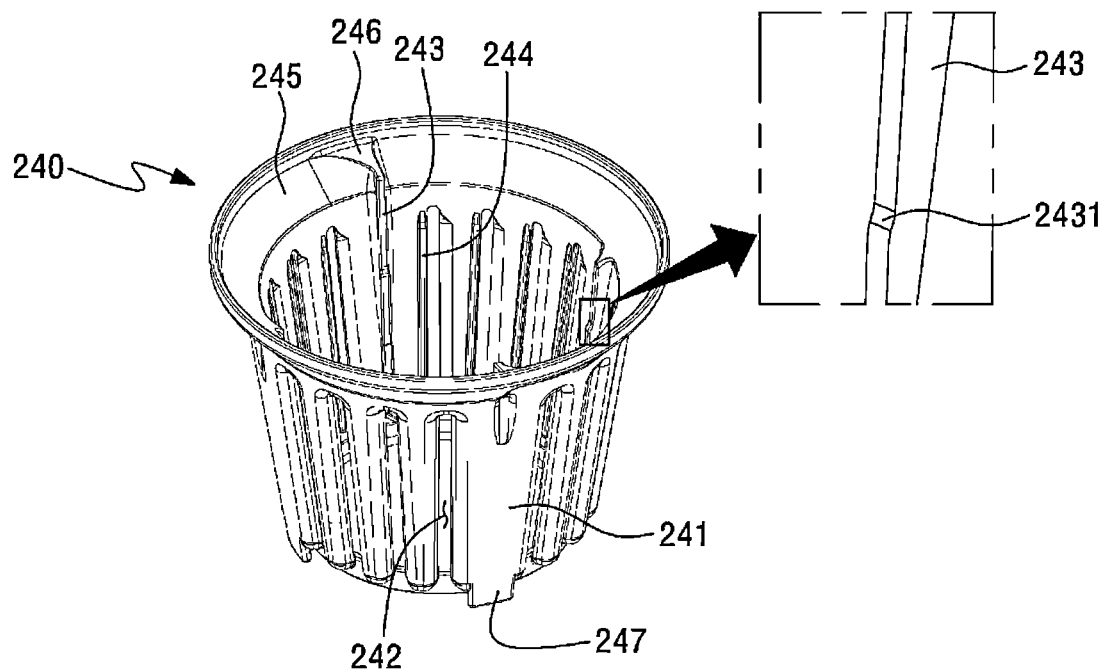
FIGS. 41 and 42 are exploded perspective views of a juice separating drum illustrated in FIGS. 4*a* and 4*b*.
Figure 41:
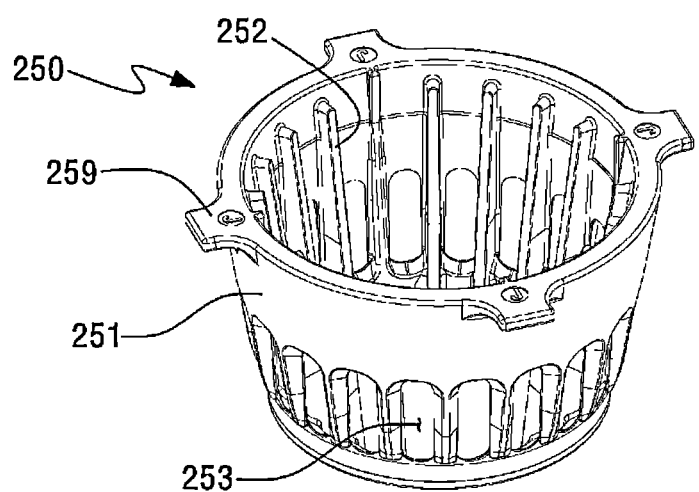
Figure 42:
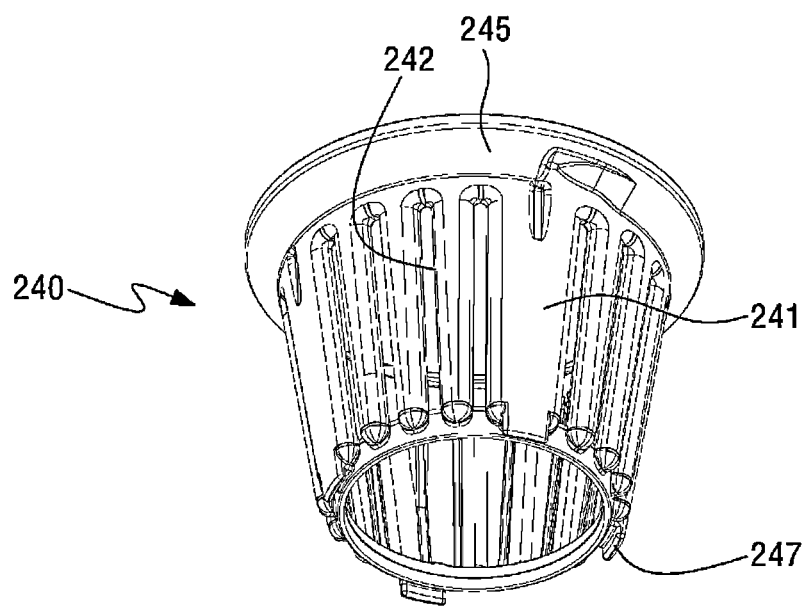
Figure 42:
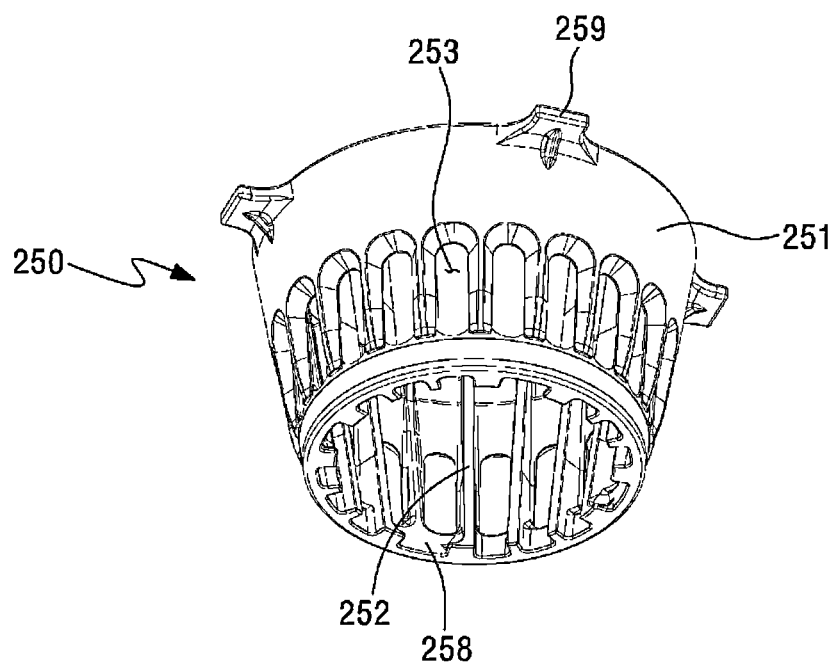
Figure 43:
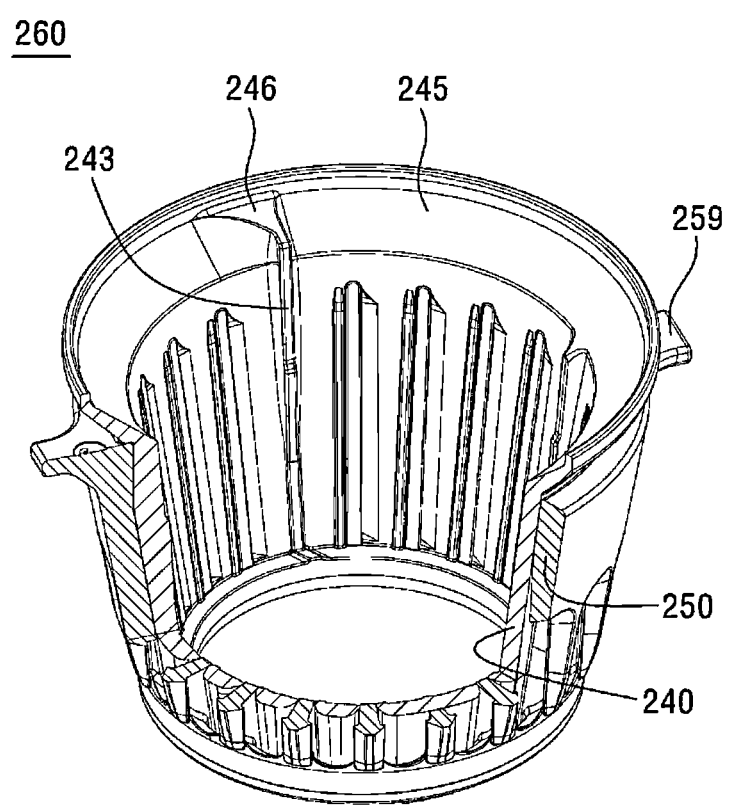
FIG. 43 is a partially cut-away combined perspective view of a juice separating drum.

FIGS. 41 and 42 are exploded perspective views of the juice separating drum illustrated in FIGS. 4a and 4b, and FIG. 43 is a partial cut away combined perspective view of FIG. 43.

As illustrated, the juice separating drum 260 according to the present disclosure may be configured by a combination of an inner module 240 and an outer module 250. Here, the inner module 240 and the outer module 250 may be made of a material such as polyetherimide (PEI) and the like.

The inner module 240 is mainly in a cylindrical shape, of which the upper and lower side may be open. Here, the inner module 240 includes a plurality of inner plate parts 241, and by these plurality of inner plate parts 241, a plurality of slits 242 are formed longitudinally in the up/down length direction.

Here, the plate part 241 is named for the convenience of describing in the present disclosure, and when differentiating the cylindrical module into a hole part where the slit 242 is formed and the plate part where the slit 242 is not formed, the plate part where the slit 242 is not formed will be defined as "plate part 241".

Here, in the slit 242, the width of the slit 242 of the upper portion may be smaller than the width of the slit 242 of the lower portion. That is, the width of the slit 242 may become narrower as it gets closer to the upper side.

Further, on the inner circumference surface of the inner module 240, a plurality of first rib steps 244 may be formed along the circumferential direction, protruding longitudinally along the up/down length direction. The first rib step 244 enables compression or crushing of the material by interaction with the screw thread 232 as the screw 230 rotates. If there were no first rib step 244, the subject of juice extraction will remain stagnant without going downwards, or the compressing force or crushing force may be low or not occur at all. Here, the first rib step 244 may be formed at one side of the slit 242 of the inner module.

Further, on the inner side of the inner module 240, a predetermined number of second rib steps 243 may be formed along the circumferential direction, protruding longitudinally along the up/down length direction. The second rib step 243 downwardly transfers the material for juice extraction being put inside the juice separating drum 260 and performs the function of crushing the subject of juice extraction. The second rib step 243 may perform the function of reinforcing the hardness of the inner module 240, and perform the function of guiding the subject of juice extraction inside the juice separating drum 260. Further, the second rib step 243 may adjust the position of the screw 230 an perform the function of adjusting the juice extracting space.

The protrusion height of the second rib step 243 may be formed to have an identical height from the upper portion to the lower portion of the inner module 240, but it is preferable that the protrusion height gradually decreases as it gets closer to the lower portion of the inner module 240. Further, the second rib step 243 may be formed to have a downward inclination as it gets closer from the upper portion to the lower portion of the inner module 240, and in the middle of that, a step 2431 may be formed, that protrudes towards the screw and stepped. The step 2431 may be implemented in various modified ways regarding the position, number or protrusion height, depending on the shape of the screw 230 and the design conditions of the screw thread 232. The number and array form of the second rib step 243 may be modified in various ways considering the design conditions and efficiency of juice extraction. In the embodiment of the present disclosure, the direction in which the second rib step 243 is formed was described to be formed vertically in up/down direction as an example, but the scope of right of the present disclosure is not limited thereto.

Here, the first rib step 244 is formed on the inner side of the lower portion of the inner plate part 241 (more specifically, at one side of the slit 242), and the second rib step 243 is formed overall from the upper portion to the lower portion on the inner side of the inner plate part 241.

The upper end of the inner module 240 includes an expansion part 245 that expands such that the diameter increases as it gets closer to the upper portion as illustrated. Since the upper end of the inner module 240 expands in a trumpet shape, at the inner side of the expansion part 245, the single blade 2321 of the upper end of the screw 230 can rotate without any interference.

Further, at one side of the expansion part 245, a material inflow guide part 246 may be formed, that is a curved surface part gradually facing towards the inner side along the rotation direction of the screw 230. If there were no material inflow guide part 246, a problem may occur where the material for juice extraction does not flow downwards, but spins with no traction, together with the single blade 2321 on the expansion part 245. When the material for juice extraction rotates together with the single blade 2321, contact with the material inflow guide part 246 may induce the material to break away from the single blade 2321 and move downwards. Further, since the material inflow guide part 246 is formed by a smooth curved surface, the problem of the material getting stuck in the material inflow guide part 246 may be solved. The upper surface of the material inflow guide part 246 is formed not to be interfered with the lower surface of the single blade 2321.

Here, the material inflow guide part 246 may be formed integrally with the second rib step 243 at the upper end of the second rib step 243, or separately from the second rib step 243. Further, the material inflow guide part 246 may be formed in plural, spaced apart from each other in the circumferential direction. As illustrated in FIG. 12, it is preferable that at least one of the material inflow guide part 246 is placed below the outlet 217 of the hopper 210. The material inflow guide part 246 placed below the outlet 217 enables the hard material for juice extraction or material for juice extraction that has been crushed relatively large, to remain inside the hopper 210, so that it can be cut sufficiently by the cutting part 225.

On a lower end surface of the inner module 240, a predetermined number of fitting protrusions 247 are formed. When coupling the inner module 240 and the outer module 250, the fitting protrusion 247 is inserted into a fitting groove part 258 formed on a lower surface of the outer module 250, so as to couple the two members 240, 250.

Next, the outer module 250 will be described. The outer module 250 is configured to include an outer plate part 251 that is mainly cylindrical and of which the upper and lower side are open, and a rib 252 protruding from the inner side of the outer plate part 251.

The outer plate part 251 may accommodate the inner module 240 inwards, so as to detachably couple the outer module 250 and the inner module 240. That is, when being coupled with the inner module 240, the outer module 250 may be coupled to accommodate and cover the inner module 240 inside therein. Here, the outer module 250 may cover and support the inner module 240.

When the outer module 250 and the inner module 240 are being settled by moving up/down, the rib 252 is inserted from below the slit 242 of the inner module 240 into the slit 242 and thus coupled. Here, a fine gap is formed between the slit 242 and the rib 252, through which the juice produced inside the drum 260 may be discharged outside.

As such, in the present embodiment, the slit 242 of the inner module 240 and the rib 252 of the outer module 250 are coupled, and through the gap between the slit 242 and the rib 252, an outflow hole for discharging the juice is formed, and thus, they may be easily cleaned by separating the inner module 240 and the outer module 250.

Here, the rib 252 may be formed to correspond to the shape of the aforementioned slit 242, and the width of the rib 252 at the upper side may be smaller than the width of the rib 252 at the lower side such that the width of the rib 252 becomes narrower as it gets closer to the upper side.

Due the shape of the rib 252 and the slit 242 described above, when coupling the outer module 250 and the inner module 240 while moving them up/down, as the upper portion of the rib 252 having a relatively small width is inserted into the lower portion of the slit 242 having a relatively large width, the outer module 250 and the inner module 240 can be easily coupled.

Further, on the outer plate part 251, a plurality of juice discharging holes 253 may be formed on the lower end side.

As such, the juice formed inside the juice separating drum 260 formed by the coupling of the inner module 240 and the outer module 250 passes through the slit hole which is the fine gap formed between the slit 242 of the inner module 240 and the rib 252 of the outer module 250 and the juice discharging hole 253 formed on the outer module 250, thereby being discharged outside of the juice separating drum 260.

Here, it is preferable that the width of the gap formed between the slit 242 and the rib 252 is formed to gradually increase in the radial direction, to facilitate discharge of the juice. For example, when the width of the slit 242 is formed to gradually increase as it gets closer in the radial direction, the size of the gap gradually increases in the radial direction.

Further, it is preferable that in terms of length direction the gap has a smaller width as it gets closer to the bottom, so that the material can be crushed more minutely as it gets closer to the bottom, to inhibit the residue produced from being discharged through the gap and to support the strong pressure from the screw 230.

On the upper end of the outer module 250, a predetermined number of drum immobilizing parts 259 are formed, that protrude in the horizontal direction. These may be inserted into the drum immobilizing groove 2802 formed on the upper end of the juice extracting drum 280 that will be described hereinafter, thereby immobilizing the position of the juice separating drum 260 within the juice extracting drum 280.

Further, on the lower end surface of the outer module 250, a predetermined number of dented fitting groove parts 258 are formed. When coupling the inner module 240 and the outer module 250, the fitting protrusion 247 is inserted into the fitting groove part 258 formed on the lower surface of the outer module 250, thereby coupling the inner module 240 and the outer module 250.

The present disclosure uses the juice separating drum 260 that forms an outflow hole by coupling the inner module 240 and the outer module 250, but it is still okay to use a mesh drum in which a multiple circular mesh hopes are formed on the drum surface, which is widely known in prior art. Further, in the present embodiment, the rib 252 is formed on the outer module 250 and the slit 242 is formed on the inner module 240 so that the outflow hole for discharging the juice is formed when the inner module 240 and the outer module 250 are coupled to each other, but the outflow hole for discharging the juice may also be formed in the method of forming the aforementioned rib 252 on the inner side of the juice extracting drum 280 without forming a separate outer module 250, and then inserting the rib 252 into the inner module 240.

Hereinafter, the juice extracting drum 280 according to an embodiment of the present disclosure will be described in more detail with reference to FIGS. 44 to 48.

Figure 44:
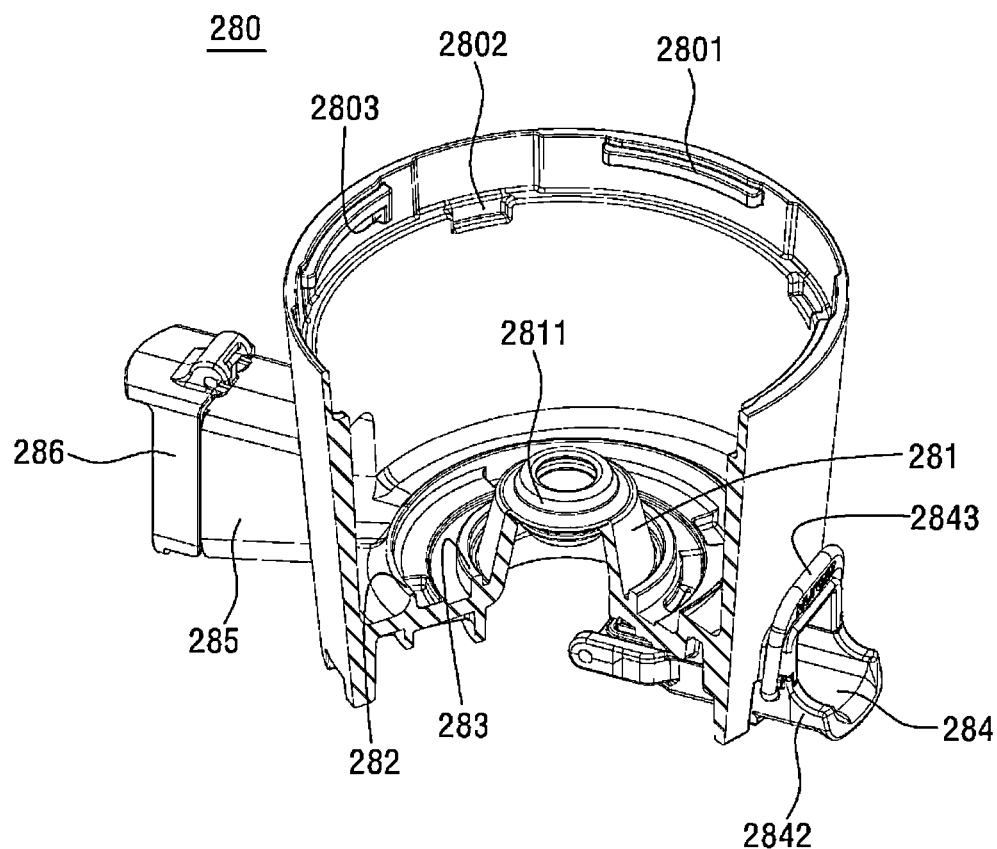
FIG. 44 is a partially cut-away combined perspective view of the juice extracting drum illustrated in FIGS. 4*a* and 4*b*.
Figure 45:
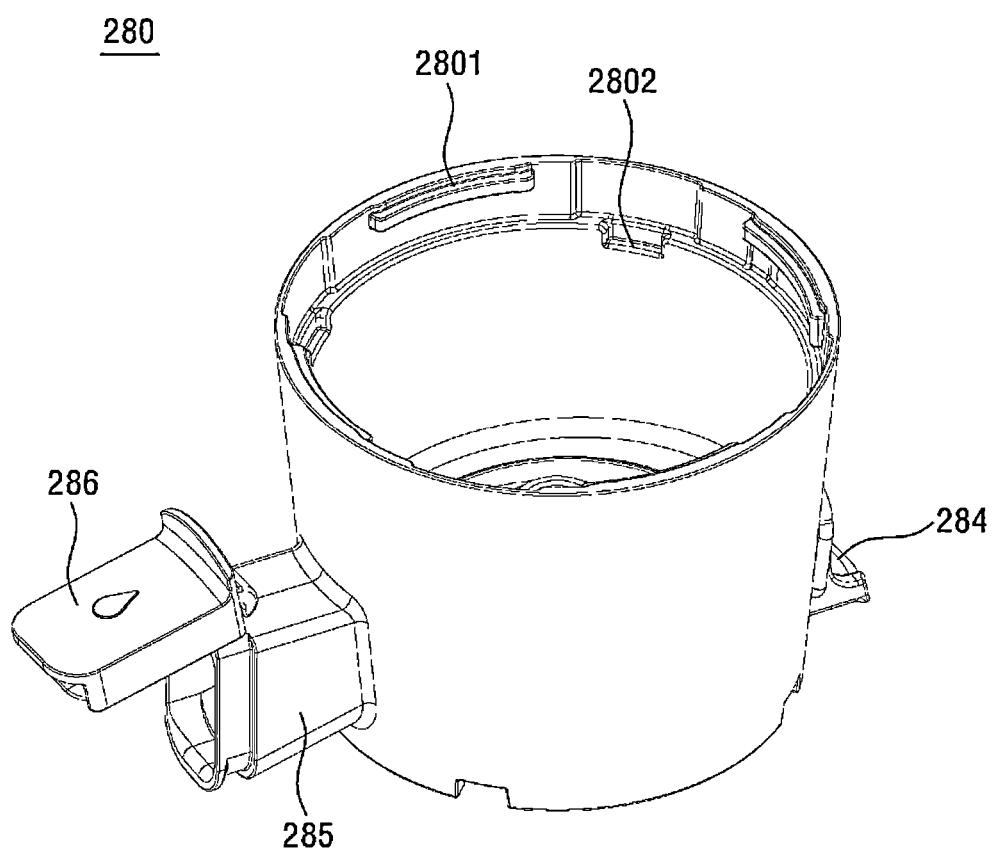
FIG. 45 is a perspective view of the juice extracting drum, illustrating a state where a juice lid part shown in FIG. 44 is opened.
Figure 46:
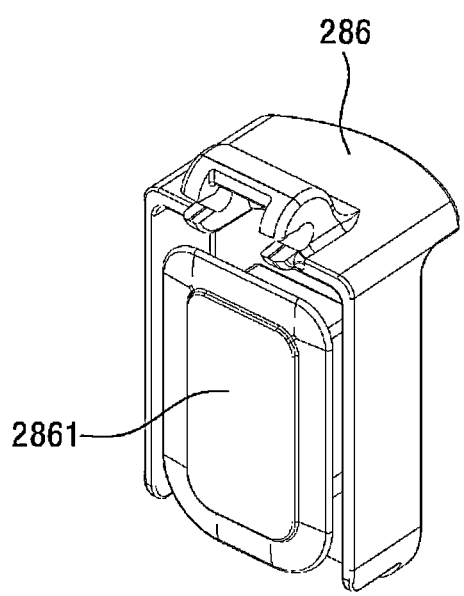
FIG. 46 is a perspective view illustrating a rear surface of the juice lid part illustrated in FIG. 45.
Figure 47:
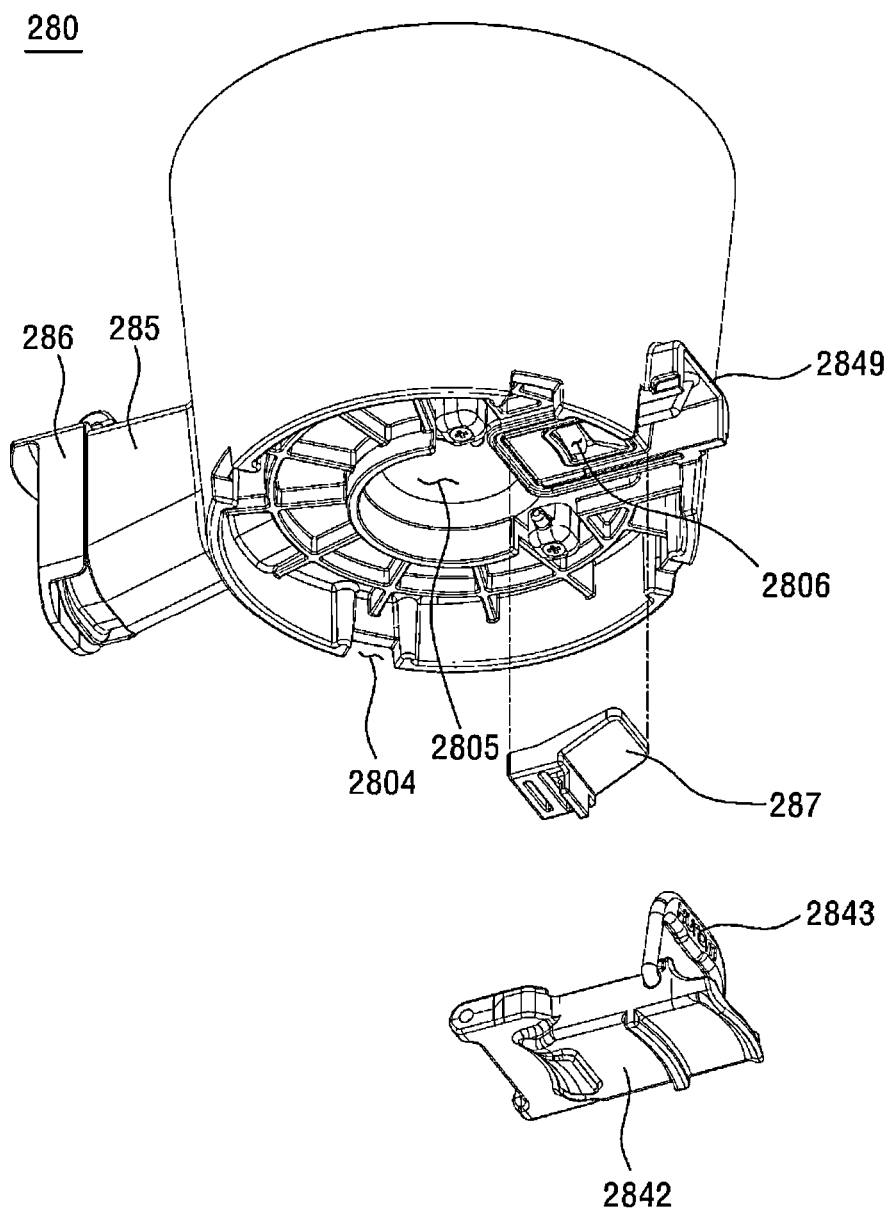
FIG. 47 is a perspective view illustrating a low surface o the juice extracting drum illustrated in FIG. 44.
Figure 48:
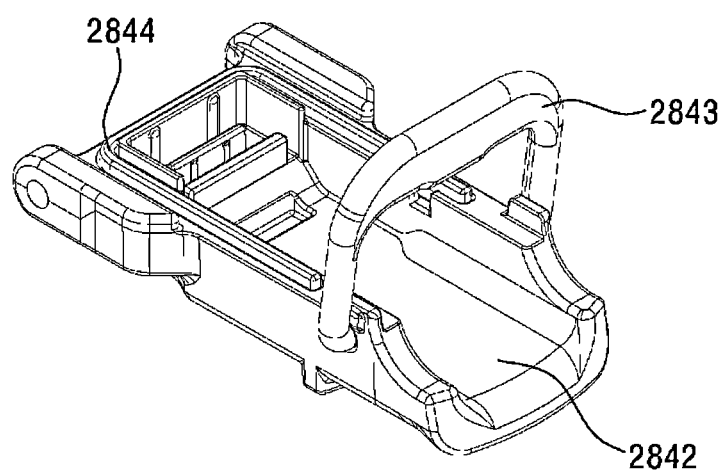
FIG. 48 is a perspective view of a low end of a residue outlet illustrated in FIG. 47.

FIG. 44 is a partially cut-away perspective view of the juice extracting drum illustrated in FIGS. 4a and 4b, FIG. 45 is a perspective view of the juice extracting drum, illustrating when the juice lid part is open in FIG. 44, FIG. 46 is a perspective view illustrating a rear side of the juice lid part illustrated in FIG. 45, FIG. 47 is a perspective view illustrating the lower surface of the juice extracting drum illustrated in FIG. 44, and FIG. 48 is a perspective view of the lower end portion of the residue discharge illustrated in FIG. 47.

The juice extracting drum 280 has an overall shape of a cylindrical container, accommodating the juice separating drum 260 and the screw 230 inside therein, and on the upper portion, the hopper 210 may be fastened as described above.

In the center of the lower surface of the juice extracting drum 280, a waterproof cylinder 281 having a penetrating hole 2805, is formed to protrude upwards, and through this penetrating hole 2805, the lower rotation shaft 234 of the screw 230 may be inserted and be coupled with the driving shaft 130. The waterproof cylinder 281 is formed to protrude upwards, so as to inhibit the juice from flowing into the driving shaft 130 through the penetrating hole 2805. Further, at one edge of the penetrating hole 2805, a packing ring 2811 made of a material such as rubber or silicone is inserted, thereby blocking the juice from flowing into the driving shaft 130 more effectively. In the present disclosure, a dual packing may be used, that is immobilized between the upper side and lower side of the upper end of the waterproof cylinder 281 to pack the upper side and the lower side together.

At the lower end of the outer side of the juice extracting drum 280, a juice discharge 285 for discharging juice and a residue discharge 284 for discharging residue may each be disposed in a spaced apart position.

At one edge of the inner side of the upper portion of the juice extracting drum 280, a plurality of settling protrusions 2801 are formed. By placing the coupling protrusions 2174 formed at one edge of the outer side of the lower end of the hopper housing 215 between the settling protrusions 2801 and slightly pressurizing the hopper 210 downwards to rotate the hopper 210, the coupling protrusion 2174 may be placed below the settling protrusion 2801, thereby coupling the juice extracting drum 280 and the hopper 210. Here, the settling protrusion 2801 has a rotation prevention step 2803 at one end of the settling direction, thereby inhibiting any additional rotation of the coupling protrusion 2174 and maintaining the settling between the two members 210, 280.

Further, it is preferable that when the coupling protrusion 2174 of the hopper 210 is placed in the space between the two settling protrusions 2801, there is sufficient space between the two settling protrusions 2801 so that the coupling protrusion 2174 can sufficiently move left and right. That is because, in the present disclosure as described above, the rotation shaft 234 of the lower portion of the screw 230 is made as n square-shaped shaft, and the shaft hole of the driving force transmission part 219 is made as 2n square-shaped shaft hole, and thus the user needs a rotation space to hold and rotate the hopper 210 to insert the driving force transmission part 219 into the rotation shaft 234 of the lower portion of the screw 230.

Further, at the outer side of the lower surface of the juice extracting drum 280, an immobilizing groove 2804 is formed, so that the driving shaft 130 can be coupled with the immobilizing protrusion 122 formed on the upper end surface of the main body 100, and immobilize the juice extracting drum 280 on the upper portion of the main body 100.

On the bottom surface of the juice extracting drum 280, in a position that is spaced apart by a predetermined distance from the inner side of the juice extracting drum 280, a first circular protrusion 282 is formed, that protrudes in a circular form. On the inner side of the first circular protrusion 282, an outer module 250 of the juice separating drum 260 is seated. Here, on the circular bottom surface between the inner side of the juice extracting drum 280 and the first circular protrusion 282, juice that is separated from the juice separating drum 260 is stored, so as to be discharged through the juice outlet 285. It is preferable that the circular bottom surface is formed to be inclined towards the juice outlet 285, so that the juice can flow towards the juice outlet 285 by its weight.

Further, a second circular protrusion 283 is formed to protrude in a circular form near the waterproof cylinder 281 of the bottom surface of the juice extracting drum 180. An inner ring 237 of the screw 230 is seated in the space between the second circular protrusion 283 and the waterproof cylinder 281, and an outer ring 238 is seated at one side outside the second circular protrusion 283, thereby immobilizing the position of the screw 230.

Here, in the present disclosure, an insert ring 2381 made of a stainless material is formed inside the outer ring 238, so as to reduce the wear caused by friction between the outer ring 238 and the second circular protrusion 283.

At one side of the bottom surface outside the second circular protrusion 283, a residue discharge hole 2806 may be formed so that the residue separated in the juice separating drum 260 may be discharged. The residue discharge hole 2806 is connected with the residue discharge 284 so that the residue inside the juice separating drum 260 can be discharged outside.

A residue packing 287 may be formed in the residue discharge hole 2806, that is made of an elastic material such as rubber or silicone. The residue packing 287 on the lower surface of the juice extracting drum 280 may be immobilized such that one end is immobilized and the other end can rotate freely. The residue packing 287 closes the residue discharge hole 2806 when there is no external force applied from inside the juice separating drum 260 to outside, but when external force is applied, the residue packing 287 is elastically deformed to open the residue discharge hole 2806. Therefore, the residue inside the juice separating drum 260 arrives at the bottom surface of the juice extracting drum 280, pushes the residue packing 287, and then discharged through the residue discharge 284.

Here, in the present disclosure, the residue discharge 284 is not formed to be immobilized at one side of the juice extracting drum 280, but may be formed in a structure where it can be opened or closed by rotation.

As illustrated, the residue discharge hole 2806 immobilized to the residue packing 287 and the part forming the upper end of the residue discharge 284 are formed integrally with the main body 100 of the juice extracting drum 280, and the residue discharge lower end 2842 forming the lower end of the residue discharge 284 is rotatably hinge-coupled on the lower surface of the juice extracting drum 280. On the upper surface of the residue discharge lower end 2842, a packing ring 2844 is mounted to surround the residue discharge hole 2806, so as to inhibit the juice or residue from being leaked outside. At one side of the end of the residue discharge lower end 2842, an immobilizing ring 2843 having the form of 'LI' is rotatably coupled.

Therefore, with the residue discharge lower end 2842 rotated to closely contact the bottom surface of the juice extracting drum 280, when the immobilizing ring 2843 is rotated and immobilized to the part 2849 that forms the upper end of the residue discharge 284 and that protrudes outwardly of the juice extracting drum 280, the residue discharge 284 for discharging the residue via the residue discharge hole 2806 is formed.

On the contrary, if the immobilizing ring 2843 is rotated to release the coupling, and the residue discharge lower end 2842 is rotated downwards, the residue packing 287 may be exposed outside, and the user may clean the inner side of the residue discharge 284 and the residue packing 287.

At one end of the juice discharge 285, a juice lid part 286 is rotatably coupled. By rotating the juice lid part 286 rotatably hinge-coupled to the upper portion of the juice discharge 285, the juice discharge 285 may be opened or closed. A packing 2861 for inhibiting the juice from leaking from inside the juice discharge 285 is settled inside the juice lid part 286.

Hereinafter, the main body 100 according to an embodiment of the present disclosure will be described.

Figure 49:
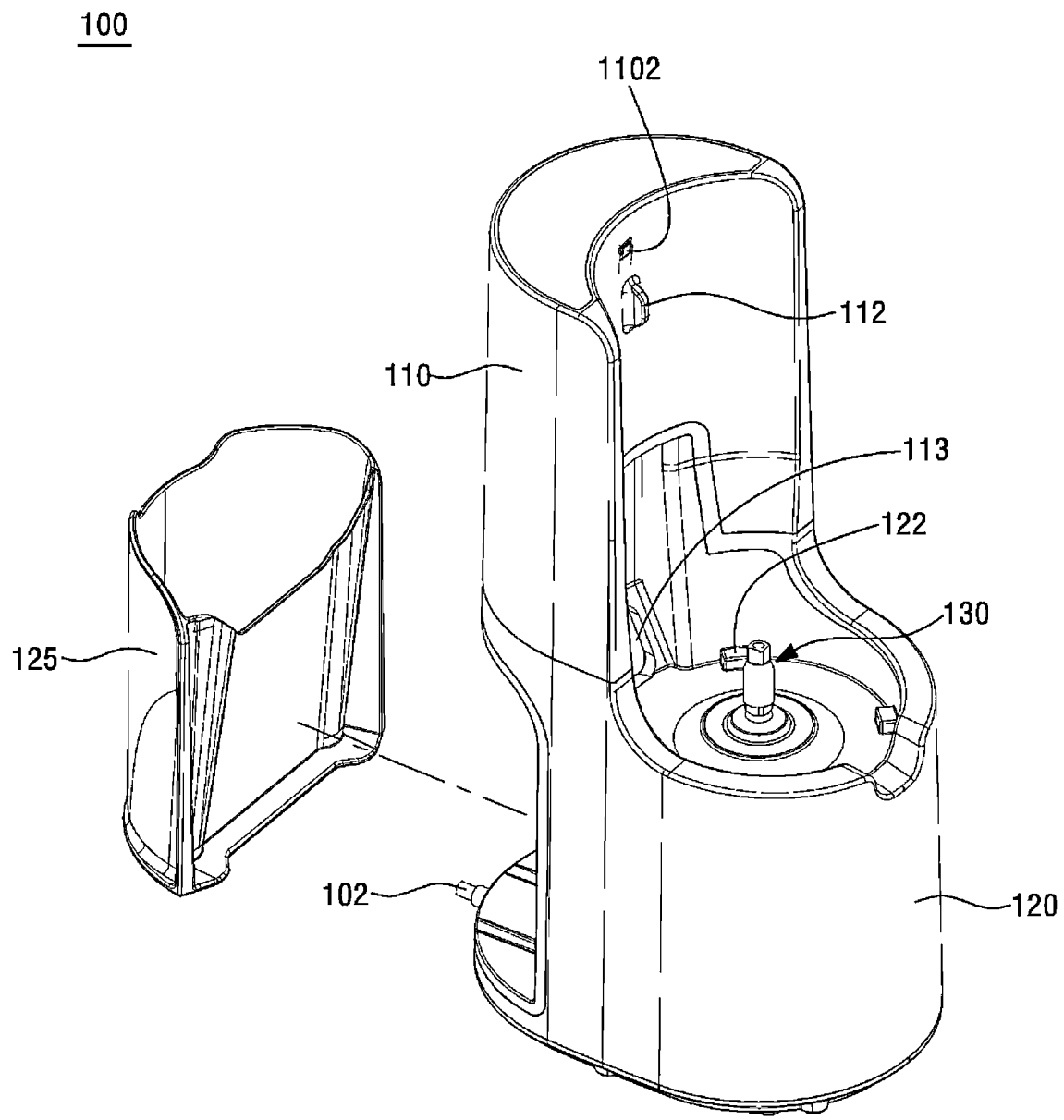
FIG. 49 is an exploded perspective view of the main body illustrated in FIG. 2.
Figure 50:
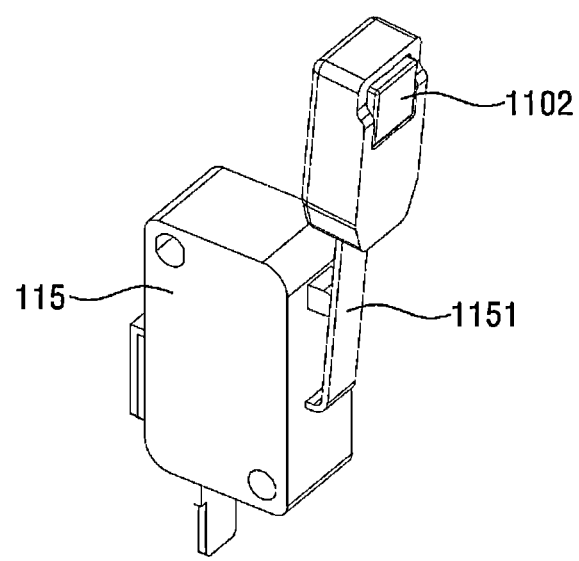
FIG. 50 is a perspective view of an open/close sensing part illustrated in FIG. 3.
Figure 57:
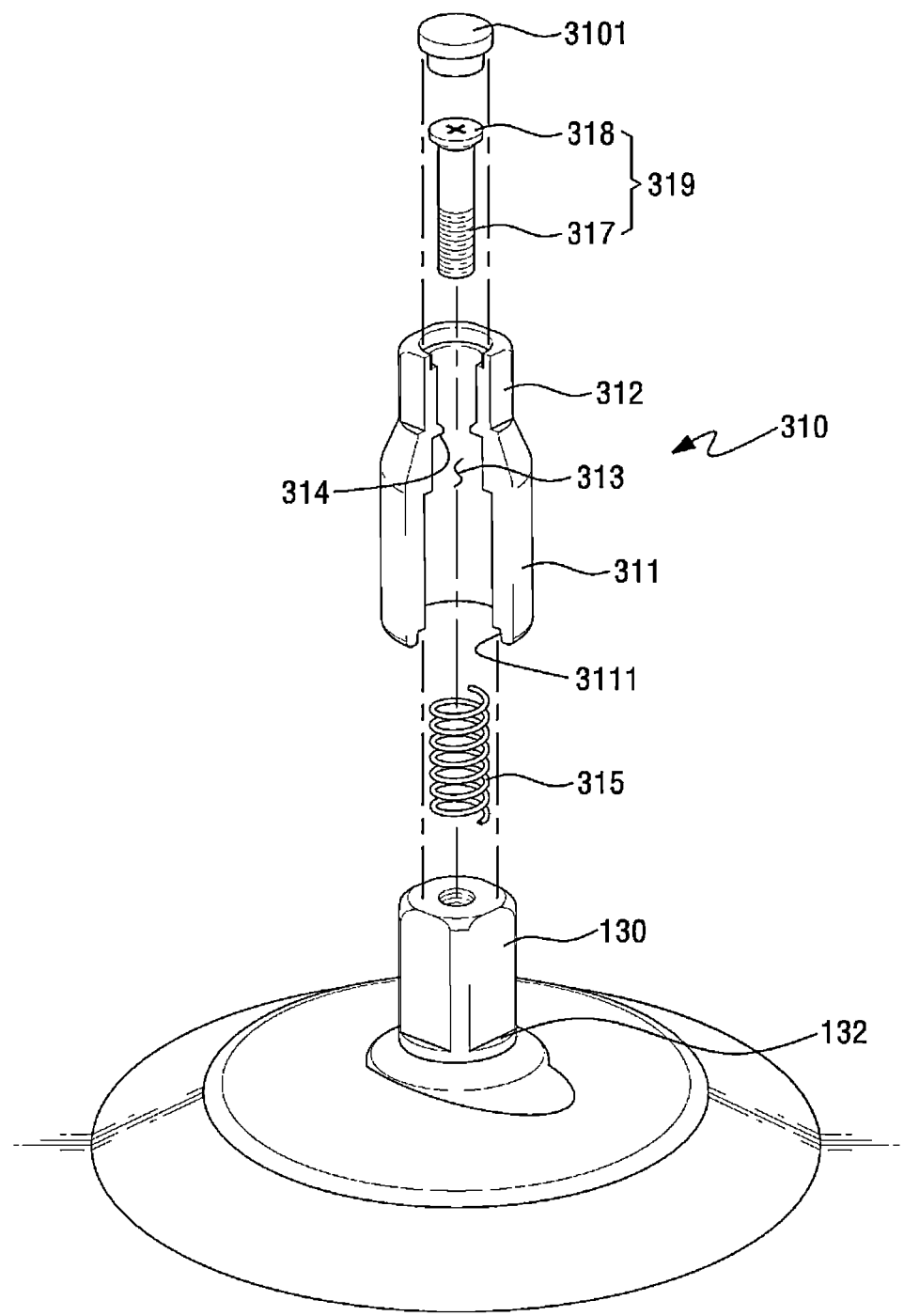
FIG. 57 is an exploded perspective view of a flow motor shaft illustrated in FIG. 49.

FIG. 49 is an exploded perspective view of the main body illustrated in FIG. 2, FIG. 50 is a perspective view of the open/close sensing part illustrated in FIG. 3, FIGS. 51a to 56b illustrated other modified examples of the release prevention structure of the hopper, FIG. 57 is an exploded perspective view of a flow motor shaft illustrated in FIG. 49, and FIGS. 58a and 58b are partially cut-away perspective views of the flow motor shaft, describing the operations of the flow motor shaft.

The main body 100 may be configured to include a lower main body part 120 and an upper main body part 110.

The lower main body part 120 is supported from the bottom surface, and on the upper surface of the lower main body part 120, a driving shaft 130 which rotates by decelerating by the motor 1001 is protruded. When the juice extracting part 200 is coupled to the driving shaft 130, the lower rotation shaft 234 of the screw 230 is inserted, thereby transmitting the rotation force of the driving shaft 130 to the screw 230.

At one side of the lower end of the lower main body part 120, a power cable 102 may be connected to receive power from outside. Inside the lower main body part 120, a motor 1001 that may be driven by external power, and a decelerating part 1002 for decelerating the rotation speed of the motor 1001 and transmitting the decelerated speed to the driving shaft 130, may be formed.

The upper main body part 110 is formed to protrude from one side of the lower main body part 120, to support the outer side of the juice extracting part 200 when the juice extracting part 200 is coupled on the lower main body part 120. A control button 104 for controlling the driving of the juice extractor may be formed on the outer side of the upper main body part 110.

On the inner side of the upper main body part 110, a rotation prevention key 112 that protrudes longitudinally in a predetermined length in a longitudinal direction may be formed as illustrated. On the outer side of the hopper 210, a rotation prevention key groove 2159 where the rotation prevention key 112 may be inserted may be formed so as to correspond to the rotation prevention key 112. The rotation prevention key groove 2159 may be integrally formed below the interference prevention groove 2154 as illustrated in FIG. 5.

When the juice extracting part 200 is coupled to the main body 100, the rotation prevention key groove 2159 is inserted into the rotation prevention key 112 and coupled thereto. Therefore, by the coupling structure of the rotation prevention key groove 2159 and the rotation prevention key 112, the circumferential direction of the hopper 210 may be immobilized. Further, when the material for juice extraction is stuck in the cutting part 225 and load is applied, the hopper 210 may receive a force for rotating in reverse direction to the fastening direction with the juice extracting drum 280, leading to a release of settling between the juice extracting drum 280 and the hopper 210. However, the aforementioned coupling structure inhibits the rotation of the hopper 210 and inhibits the above.

As described above, in the present disclosure, for safety of the user, the hopper 210 cannot be settled above the juice extracting drum 280 in a state where only the juice extracting drum 280 is seated on the main body 100, and the juice extracting part 200 may be coupled to the main body 100 only when the hopper 210 is settled on the juice extracting drum 280. The hopper 210 and the juice extracting drum 280 are immobilized by the coupling of the coupling protrusion 2174 and the settling protrusion 2801, and if the coupling protrusion 2174 and the settling protrusion 2801 are rotated to couple the juice extracting drum 280 and the hopper 210 with only the juice extracting drum 280 seated on the main body 100, the position of the rotation prevention key groove 2159 and the position of the rotation prevention key 112 do not match each other, and thus coupling is not made. Further, when immobilizing the hopper 210 to the upper main body part 110 by matching the position of the rotation prevention key groove 2159 and the position of the rotation prevention key 112, the coupling protrusion 2174 and the settling protrusion 2801 are located such that it is impossible to match and couple the coupling protrusion 2174 and the settling protrusion 2801. Therefore, in the present disclosure, the juice extracting part 200 may be coupled to the main body 100 only when the hopper 210 is coupled to the upper portion of the juice extracting drum 280.

In the embodiment described above, the upper main body part 110 that supports the outer side of the juice extracting part 200 is formed in the main body 100, and by the configuration of the rotation prevention key 112 formed in the upper main body part 110 and the rotation prevention key groove 2159 formed in the hopper 210, release between the hopper 210 and the juice extracting drum 280 is inhibited by the reverse direction rotation of the hopper 210 during juice extraction. Here, if there is no upper main body part 110 supporting the outer side of the juice extracting part 200 in the main body 100, a separate configuration of a release prevention part for inhibiting the hopper 210 from rotating in reverse direction and being released during juice extraction is necessary. Hereinafter, with reference to FIGS. 51a to 56b, various embodiments of the release prevention part will be described.

First, as illustrated in FIGS. 51a and 51b, a movement settling part 401 may be formed, that may move up and down inside the juice extracting drum 280. In the juice extracting drum 280, a housing may be formed outside the space for mounting the screw 230 so as to form a separate space where the movement settling part 401 can move up and down.

The movement settling part 401 may be formed in a long rod shape, and when the movement settling part 401 moves upwards, the upper end of the movement settling part 401 may be inserted into an upper guide hole 406 formed above the juice extracting drum 280 and protrude above the juice extracting drum 280.

Here, even when the upper end of the movement settling part 40 protruding above the juice extracting drum 280 is inserted into the settling groove 402 formed on the lower surface of the hopper 210, and a force of reverse direction is applied to the hopper 210, the rotation of the hopper 210 may be inhibited.

On the upper end surface of the main body 100 where the driving shaft 130 is formed to protrude, a movement guide protrusion 404 that protrudes upwards may be formed. Further, on the lower surface of the juice extracting drum 280, an insertion groove 403 corresponding to the movement guide protrusion 404 may be formed where the movement guide protrusion 404 may be inserted. Further, on the upper portion of the insertion groove 403, a lower guide hole 405 may be connected, where a lower end of the movement settling part 401 may be inserted. Therefore, when the movement settling part 401 moves downwards, the lower end of the movement settling part 401 will be inserted into the lower guide hole 405, and protrude downwards inside the insertion groove 403.

To describe the shape of the movement settling part 401 in more detail, as illustrated in FIGS. 51a and 51b, since the shaft direction location of the upper guide hole 406 where the upper end of the movement settling part 401 may be inserted and the shaft direction location of the lower guide hole 406 where the lower end of the movement settling part 401 may be inserted are different from each other, the movement setting part 401 may have an overall long rod shape, but have a bent or curved shape in the middle part.

Here, on the outer side of the upper end and on the outer side of the lower end of the movement settling part 401, steps 4011, 4012 protruding in the radial direction may be formed, limiting the position where the movement settling part 401 can move up and down.

When the movement settling part 401 moves upwards, the step 4011 formed on the upper end of the movement settling part 401 may contact the spring 407 placed between the lower end surface of the upper guide hole 406 and the step 4011, thereby limiting the up and down movement of the movement settling part 401. Further, when the movement settling part 401 moves downwards, the step 4012 formed on the lower end of the movement settling part 401 may contact the upper end surface of the lower guide hole 406, limiting the downward movement of the movement settling part 401.

As illustrated, in the present embodiment, the step 4012 formed on the lower end of the movement settling part 401 is formed together with the bent portion of the movement settling part 401.

Further, by changing the diameter of the movement settling part 401 below the lower end of the movement settling part 401 that may be inserted into the lower guide hole 406 to form a step 4013, and by forming, also on the inner side of the lower guide hole 406, a step 4051 protruding inwards, corresponding to the step 4013, downward movement of the movement settling part 401 may be limited by the contact between the two steps 4013, 4051.

When coupling the juice extracting part 200 in the right position inside the main body 100 as illustrated in FIG. 51a, a movement guide protrusion 404 is inserted into the insertion groove 403, wherein the movement guide protrusion 404 contacts the lower end of the movement setting part 401 placed inside the insertion groove 403, pushing the movement settling part 401 upwards, and thus, the movement settling part 401 moves upwards. Here, the upper end of the movement settling part that had been inserted into the upper guide hole 406 protrudes above the juice extracting drum 280, and is then inserted into the settling groove 402 formed on the lower surface of the hopper 210, thereby settling the juice extracting drum 280 and the hopper 210.

When the juice extracting part 200 is separated from the main body 100 as in FIG. 51b, the contact between the movement guide protrusion 404 and the movement settling part 401 is released, and the movement settling part 401 moves downwards again due to the elastic force by the spring 407, and then, the lower end of the movement settling part 401 that had been inserted into the lower guide hole 405 is placed inside the insertion groove 403 again, and the upper end of the movement settling part 401 protruding above the juice extracting drum 280 is placed inside the upper guide hole 406 again. Therefore, the settling between the juice extracting drum 280 and the hopper 210 by the movement settling part 401 may be released, and by rotating the hopper 210 or the juice extracting drum 280, the juice extracting drum 280 and the hopper 210 may be separated.

Next, another embodiment of the release prevention part will be described with reference to FIGS. 52a and 52b.

In the present embodiment, on one inner side of the handle part 216 formed in the hopper 210, an elastic settling part 411 is formed, that makes an elastic movement towards the handle part 216. That is, a spring 412 may be placed between the elastic settling part 411 and the handle part 216, so that the elastic settling part 411 can make an elastic movement towards the handle part 216 in a button method.

Here, the lower end of the elastic settling part 411 is curved towards the outer side of the juice extracting drum 280, and the lower end of the elastic settling part 411 may be inserted into the settling groove 413 formed on the outer side of the juice extracting drum 280.

In a state where the juice extracting drum 280 and the hopper 210 are coupled in the right position as in FIG. 52a, the elastic settling part 411 may make an elastic movement towards the juice extracting part 200, wherein the lower end of the elastic settling part 411 may be inserted into the settling groove 413, settling the juice extracting drum 280 and the hopper 210.

Further, when the user grips and pushes the elastic settling part 411 as in FIG. 52b, the elastic settling part 411 moves towards the handle part 216, wherein the elastic force can be stored in the spring 412. As the elastic settling part 411 moves towards the handle part 216, the coupling between the lower end of the elastic settling part 411 and the settling groove 413 is released, thereby releasing the settling of the juice extracting drum 280 and the hopper 210 by the elastic settling part 411, and by rotating the hopper 210 or the juice extracting drum 280, the juice extracting drum 280 and the hopper 210 can be separated.

Next, another embodiment of the release prevention part will be described with reference to FIGS. 53a and 53b.

In the present embodiment, a movement settling part 421 may be formed, that makes up/down movement within the hopper 210. In the hopper 210, outside the space where the material for juice extraction may be inserted, a housing may be formed so as to form a separate space where the movement settling part 421 may move up/down. The movement settling part 421 may be formed in a long rod shape, and when the movement settling part 421 moves downwards, the lower end of the movement settling part 421 may protrude below the hopper 210 through the lower guide hole 425 formed below the hopper 210.

Here, the lower end of the movement settling part 421 protruding below the hopper 210 may be inserted into the settling groove 424 formed on the upper surface of the juice extracting drum 280, thereby inhibiting rotation of the hopper 210 even when a reverse direction force is applied to the hopper 210.

Further, an upper guide hole 426 where the upper end of the movement settling part 421 may be formed above the hopper 210.

As illustrated, since the shaft direction position of the upper guide hole 426 where the upper end of the movement settling part 421 may be inserted and the shaft direction position of the lower guide hole 426 where the lower end of the movement settling part 421 may be inserted are different from each other, the movement settling part 421 may have an overall long rod shape, but the middle part may be bent or curved.

The movement settling part 421 may be elastically supported in up/down direction by the spring 422. A spring insertion part 4211 may be formed, that protrudes downwards from the middle part of the movement settling part 421, and a spring 422 may be placed between the spring insertion part 4211 and the housing inner wall of the hopper 210. When the movement settling part 421 moves downwards, by allowing the lower end of the spring insertion part 4211 to contact with the housing inner wall of the hopper 210, downward movement of the movement settling part 421 may be limited. Further, when the external force applied to the movement settling part 421 is removed and the movement settling part 421 moves upwards due to the elastic force of the compressed spring 422, the upward movement of the movement settling part 421 may be limited by the spring 422 immobilized to the movement settling part 421.

Further, the movement settling part 421 may be used as one example of the configuration for sensing whether the lid is open or closed.

On the lower surface of the lid part 220 that is hinge-coupled to the hopper 210 to cover the upper surface of the hopper 210, an elastic movement guide protrusion 423 that protrudes downwards may be formed.

When the juice extracting drum 280 and the hopper 210 are coupled and then the lid part 220 is closed as in FIG. 53a, the elastic movement guide protrusion 423 contacts the upper end of the movement settling part 421, pushing the movement settling part 421 downwards, and thus moving the movement settling part 421 downwards. Here, the lower end of the movement settling part 421 placed inside the lower guide hole 425 protrudes downwards from below the hopper 210, and inserted into the settling groove 424 formed on the upper surface of the juice extracting drum 280, and thereby settling between the juice extracting drum 280 and the hopper 210.

When the lid part 220 is opened as in FIG. 53b, the pressing force by the elastic movement guide protrusion 423 gradually decreases, and due to the elastic force by the spring 422, the movement settling part 421 moves upwards again, and thus the lower end of the movement settling part 421 is placed within the lower guide hole 421 again. Therefore, settling between the juice extracting drum 280 and the hopper 210 by the movement settling part 421 may be released, and the juice extracting drum 280 and the hopper 210 may be separated by rotating the hopper 210 or the juice extracting drum 280.

Next, another embodiment of the release prevention part will be described with reference to FIGS. 54a and 54b.

In the present embodiment, on the outer side of the hopper 210 and the juice extracting drum 280, a guide 432, 433 for guiding the sliding movement in the up and down direction may be formed respectively, and the sliding settling part 431 may make a sliding movement in up and down direction along the guide 432, 433.

The guide 432, 433 may be formed to protrude in parallel at both sides on the lower end of the hopper 210 and on the upper end of the juice extracting drum 280. When the hopper 210 and the juice extracting drum 280 are coupled, the guide 432 formed on the hopper 210 and the guide 433 formed on the juice extracting drum 280 are disposed in the form of extending in the up and down direction.

The sliding settling part 431 makes a sliding coupling with the guide 432, 433 so that it can make a up and down sliding movement along the guide 432, 433. It is preferable that the up and down length of the sliding settling part 431 is formed to cover all of the guide formed on the lower end of the hopper 210 and the guide 433 formed on the upper end of the juice extracting drum 280.

As illustrated in the cross-sectional view of FIGS. 54a and 54b, on the rear surface of the sliding settling part 431, sliding coupling can be made in various forms with the guide 432, 433.

If the sliding settling part 431 is made to move in up and down direction, and the circumferential direction movement of the hopper 210 and the juice extracting drum 280 can be limited by the contact between the sliding settling part 431 and the guide 432, 433, the configuration of the sliding settling part 431 and the guide 432, 433 may be modified in various forms besides the configuration illustrated.

When the sliding settling part 431 is moved downwards along the guide 432, 433 as in FIG. 54a, the sliding settling part 431 may be respectively settled with the guide 432, 433 formed in the hopper 210 and the juice extracting drum 280, thereby settling between the juice extracting drum 280 and the hopper 210.

When the sliding settling part 431 is moved upwards along the guide 432, 433 as in FIG. 54b, the settling formed between the sliding settling part 431 and the juice extracting drum 280 may be released, and the settling between the juice extracting drum 280 and the hopper 210 by the sliding settling part 431 may be released.

Next, another embodiment of the release prevention part will be described with reference to FIGS. 55a and 55b.

In the present embodiment, a rotation settling part 441 may be formed, that may be hinge-coupled to the outer side of the hopper 210 to rotate, and in the juice extracting drum 280, a settling groove 442 may be formed, where the opposite end of the rotation settling part 441 may be inserted.

The rotation settling part 441 may be hinge-coupled to the outer side of the lower end of the hopper 210 having the horizontal direction as the rotation shaft, and rotate. When rotated in a counterclockwise direction and fastened to the settling groove 442 as in FIG. 55a, the rotation settling part 441 may extend downwards from the hinge-coupled portion, and have a form of being bent inwardly towards the juice extracting drum 280. Further, it is preferable that the end of the rotation setting part 441 is horizontally bent so as to be inserted into the settling groove 442. In order for the user to easily rotate the rotation settling part 441 using the fingers, in the area below the middle portion of the rotation settling part 441, a step protrusion 4411 protruding longitudinally in the radial direction may be formed.

The settling groove 442 is made on the upper end of the juice extracting drum 280 as a groove where the one end of the rotation setting part 441 may be inserted.

When the rotation setting part 441 is rotated towards the juice extracting drum 280 as in FIG. 55a, the opposite end of the rotation setting part 441 is inserted into the settling groove 442, thereby settling between the juice extracting drum 280 and the hopper 210.

When the rotation settling part 441 is rotated in the opposite direction as in FIG. 55b, the coupling between the end of the rotation settling part 441 and the settling groove 442 will be released, thereby releasing the settling between the juice extracting drum 280 and the hopper 210 by the rotation settling part 441.

In the drawings, it is described that the rotation setting part 441 and the hopper 210 are hinge-coupled and the settling groove 442 is formed in the juice extracting drum 280 as an example, but the rotation setting part may be configured to hinge-coupled to the juice extracting drum 280 and the settling groove may be formed in the hopper 210.

Next, another embodiment of the release prevention part will be described with reference to FIGS. 56a and 56b.

In the present embodiment, similarly as the embodiment in FIGS. 53a and 53b, a movement settling part 451 may be formed, that makes an up/down movement in the hopper 210. In the hopper 210, separate from the space where the material for juice extraction is inserted, a housing may be formed to form a space where the movement settling part 451 can make up/down movement. The movement settling part 451 may be made in a long rod shape, and when the movement settling part 451 moves downwards, the lower end of the movement settling part 451 may protrude below the hopper 210 through the lower guide hole 455 formed below the hopper 210.

Here, the lower end of the movement settling part 451 protruding below the hopper 210 is inserted into the settling grove 453 formed on the upper surface of the juice extracting drum 280, and thus even when a reverse direction force is applied to the hopper 210, the hopper 210 may be inhibited from rotating.

On the upper portion of the movement settling part 451 in the hopper 210, a cam part 452 may be formed, that includes a cam surface that rotates while in contact with the upper end of the movement settling part 451 and the circumferential direction outer side, and that moves the movement settling part 451 up/down. As the cam part 452 rotates, the radial direction distance between the cam surface contacting with the movement settling part from the rotation shaft of the cam part 452 changes, and thus it is possible to move the movement setting part 451 up/down.

Here, although not illustrated, as in the embodiment of FIGS. 53a and 53b, it is preferable that the movement setting part 451 is elastically supported in the up/down direction, and thus even when the cam part 452 rotates, the upper end of the movement setting part 451 maintains contact with the cam surface. Here, a rotation knob 4521 may be formed, that extends from the rotation shaft of the cam part 452 towards the outside of the hopper 210. When the user holds and rotates the rotation knob 4521, the cam part 452 will rotate, to change the position of the cam surface contacting with the movement settling part 451, and thus it is possible to move the movement settling part 451 up/down.

Further, on the upper surface of the juice extracting drum 280, a setting groove 452 may be formed, where the lower end of the movement settling part 451 protruding downwards below the hopper 210 may be inserted.

As in FIG. 56a, it is possible to hold the rotation knob 4521 of the cam part 452 and rotate it to a predetermined position, to move the movement settling part 451 downwards, wherein the lower end of the movement settling part 451 may protrude below the lower end of the hopper 210 and inserted into the setting groove 452 formed in the juice extracting drum 280, and thus it is possible to settle the juice extracting drum 280 and the hopper 210.

If the user holds the rotation knob 4521 of the cam part 452 and rotate it to another position as in FIG. 56b, the position of the cam surface contacting with the upper end of the movement setting part 451 will change, and thus it is possible to move the movement settling part 451 upwards by the elastic force, and the settling between the lower end of the movement settling 451 and the settling groove 452 will be released, and the lower end of the movement settling part 451 will be placed inside the hopper 210.

FIGS. 56a and 56b illustrate a state where the cam part 452 and the movement settling part 451 are formed in the hopper 210 and the settling groove 452 is formed in the juice extracting drum 280, but the cam part and the movement settling part may be formed in the juice extracting drum 280 and the settling groove may be formed in the hopper 210 instead.

To describe with reference to FIG. 49 again, at one side of the lower surface of the upper main body part 110, a residue discharge connecting hole 113 is formed, that communicates with the residue discharge 284. Further, at one side of the lower main body part 120, a residue cup 125 may be separated or mounted. When the residue cup 125 is coupled to the lower main body part 120, the residue being discharged may be stored through the residue discharge 284 of which one end may be inserted into the residue discharge connecting hole 113.

Inside the upper main body part 110, an open/close sensing part 115 for sensing whether the lid part 220 is open or closed, may be immobilized and mounted.

As illustrated in FIG. 50, the open/close sensing part 115 may be formed as a micro switch, wherein a second magnet 1102 is immobilized to the end of a rotating bar 1151 extending outwardly. The second magnet 1102 forms a magnetism with a first magnet 2211 that is immobilized to a magnet placement part 221 of the lid part 220 described above. As the magnet placement part 221 rotates when the lid part 220 opens/closes, the magnetism between the first magnet 2211 and the second magnet 1102 changes (attraction force or repulsion force will occur depending on the polarity of the first magnet 2211 and the second magnet 1102). Therefore, depending on the change of position of the first and second magnets, the rotation bar 1151 will move, and thus the sensor part inside the open/close sensing part 115 will sense whether the lid part 220 is open or closed.

When the lid part is open, power supply to the motor 1001 will be blocked, so as to inhibit rotation of the screw 230.

On the upper surface of the lower main body part 120, the driving shaft 130 may be formed to protrude, and the lower rotation shaft 234 of the screw 230 may be coupled to the driving shaft 130 directly, but in the present disclosure, a flow driving shaft is used so as to automatically couple the driving shaft 130 and the rotation shaft 234 below the screw 230. Hereinafter, the configuration of the flow driving shaft will be described in detail.

In the driving shaft 130 protruding outwards the main body 100, a driving force transmission part 310 is coupled. Here, the driving shaft 130 is made as an n square-shaped shaft, and the driving force transmission part 310 is made as an n square-shaped shaft hole, so that they can be mutually coordinated, thereby coupling the driving force transmission part 310 to the driving shaft 130, and further, the driving force transmission part 310 may rotate together with the driving shaft 130 in an interlocked manner.

To described the shape of the driving force transmission part 310 in more detail, the driving force transmission part 310 is may be configured to include a motor shaft coupling part 311 that is made as an n square-shaped shaft hole, to be coupled with an n square-shaped driving shaft 130, and a screw coupling part 312 that is made as an n square-shaped shaft in the upper portion of the motor shaft coupling part 311. The screw coupling part 312 is matched with the lower rotation shaft 234 of the screw 230 made as an n square-shaped shaft hole.

Here, a coil spring 315 may be disposed between the driving force transmission part 310 and the driving shaft 130, and thus the driving force transmission part 310 may make an elastic movement in the shaft direction on the driving shaft 130. In more detail, a spring insertion shaft 317 that extends upwards on the upper end of the driving shaft 130 may be formed, and in the spring insertion shaft 317, the coil spring 315 may be inserted. Here, on the upper end of the spring insertion shaft 317, a head part 318 may be further formed, that forms a step in a shaft radial direction. Here, the spring insertion shaft 317 as that mentioned above may be made as a screw nail 319 that may be screw-coupled on the upper end of the driving shaft 130.

Further, on the upper end of the n square-shaped shaft hole of the motor shaft coupling part 311, a step hole 313 for forming a step may be formed in a shaft central direction, and in the step hole 313, the upper end of the spring insertion shaft 317 may be inserted. Here, the step formed by the step hole 313 contacts the upper end of the driving shaft 130 when the driving force transmission part 310 makes a shaft downwards movement, thereby forming a downward limit of the driving force transmission part 310.

Further, on the lower end of the motor shaft coupling part 311, a step groove 3111 having a step, is formed, and to correspond thereto, a step 132 is formed to protrude at a predetermined position on the outer circumference surface of the driving shaft 130, and thus when the driving force transmission part 310 makes a shaft downwards movement, the step groove contacts the step 132, thereby forming the downward limit of the driving force transmission part 310.

In the middle of the step hole 313, an inner protrusion 314 may be formed that protrudes inwardly towards the central direction of the shaft. The inner protrusion 314 contacts with the upper end of the coil spring 315 when the driving force transmission part 310 makes a shaft downwards movement, thereby compressing the coil spring 315. Further, when the driving force transmission part 310 makes a shaft upwards movement by the elastic energy of the coil spring 315, the inner protrusion 314 contacts with the head part 318, wherein the head part 318 forms an upward limit of the driving force transmission part 310.

Further, on the upper end of the driving force transmission part 310, a lid part 3101 for blocking the opening may be formed, Through the opening of the upper end of the driving force transmission part 310, a screw nail 319 may be inserted to be coupled with the driving shaft 130, wherein a step may be formed on the upper end of the driving force transmission part 310, and the lid part 3101 may be seated on the step, so as to shield the opening of the upper end of the driving force transmission part 310. Here, the lid part 3101 inhibits the juice from penetrating between the head part 318 of the screw nail 219 and the inner side of the screw coupling part 312.

Therefore, if there is no force of pressurizing the driving force transmission part 310 from above to below, as illustrated in FIG. 58a, by the elastic force of the coil spring 315, the driving force transmission part 310 will be placed in an upwards limit position, and when pressurizing the driving force transmission part 310 from above to below, the driving force transmission part 310 will make a shaft downwards movement, and thus will be placed in an downwards limit position as illustrated in FIG. 58b. Here, the coil spring 315 will be compressed to store the elastic energy, and when the pressurizing from the above is released from the driving force transmission part 310, the driving force transmission part 310 will make an elastic movement back to the upwards limit position by the elastic energy of the coil spring 315.

When seating the juice extracting part 200 on the main body 100, if the lower rotation shaft 234 of the screw 230 matches with the screw coupling part 312 of the driving force transmission part 310, the driving force of the driving shaft 130 may be transmitted to the screw 230 by the driving force transmission part 310.

On the other hand, when the lower rotation shaft 234 of the screw 230 does not match with the screw coupling part 312 of the driving force transmission part 310, as the screw 230 pressurizes the driving force transmission part 310, the driving force transmission part 310 makes a shaft downward movement.

When the motor 1001 is rotated in such a state, the driving force transmission part 310 coupled to the driving shaft 130 will rotate, and the screw coupling part 312 of the upper portion of the driving force transmission part 310 will be in a position matching with the lower rotation shaft 234 of the screw 230. Here, by the elastic energy of the coil spring 315, the driving force transmission part 310 will make an elastic shaft upward movement, and thus automatically matching with the lower rotation shaft 234, and thereby transmitting the driving force of the driving shaft 130 to the screw 230. The scope of rights of the present disclosure is not limited to the embodiments described above, and the present disclosure can be implemented in various forms of embodiments within the claims set attached hereto. Without departing from the gist of the present disclosure claimed in the claims set, any person of ordinary skill in the art to which the present invention pertains is considered to be within the scope of the description of the claims of the present invention to various ranges that can be modified.

What is claimed is:

1. A juice extractor comprising a cutting part for cutting a material for juice extraction beforehand by a rotation in a direction within a hopper above a screw, the cutting part being connected to the screw and rotatable in the same axial direction as the rotation axis of the screw, wherein the cutting part is rotatably coupled at only one side on a lower end surface of the hopper so that an open space that is not interfered above the cutting part is formed inside the hopper and comprises:
   a chopping blade extending upwards in a spiral form towards the open space inside the hopper from a center of the rotation and an upper end part of the chopping blade has a cross-section that becomes smaller towards a tip of the upper end part to form a shape of an ox horn; and
   a slicing blade extending horizontally on the lower end surface of the hopper.
2. The juice extractor according to claim 1, wherein the chopping blade and the slicing blade are formed integrally.
3. The juice extractor according to claim 2, wherein the slicing blade has a shape curved in a direction opposite to the rotation direction of the cutting part.
4. The juice extractor according to claim 2, wherein the chopping blade and the slicing blade each extends in opposite directions from a center of the rotation, and the slicing blade has a shape curved in a direction opposite to the direction in which the chopping blade extends in a spiral form.
5. The juice extractor according to claim 1, wherein the cutting part is formed with a dual structure of a core body and an outer shell covering an outer portion of the core body with a material different from that of the core body.
6. The juice extractor according to claim 5, wherein at least one of a protrusion protruding from a surface of the core body, a groove dented from the surface of the core body, and a penetrating hole penetrating the core body is formed in the core body.
7. The juice extractor according to claim 1, further comprising a juice extracting drum coupled to a lower portion of the hopper and accommodating inside thereof the screw that compresses the material for juice extraction,
wherein the lower end surface of the hopper comprises one or more outlets for moving the material for juice extraction crushed in the hopper to the juice extracting drum placed below, and
an inclined surface inclined downwards in a radial direction towards the outlets from the center of the lower end surface of the hopper,
wherein a radial direction width of the inclined surface gradually decreases along the rotation direction of the cutting part.
8. The juice extractor according to claim 1,
wherein the hopper comprises a hopper housing of which an upper portion is open and the cutting part is mounted on the lower end surface; and
a lid part that is hinge-coupled to an upper end of the hopper housing to open and close the upper portion;
wherein the lid part comprises a safety guide part that is inserted into the upper end of the hopper housing.
9. The juice extractor according to claim 1,
wherein a lower surface of the cutting part and the lower end surface of the hopper are coupled by an uneven structure of a circular ring form.
10. The juice extractor according to claim 9,
wherein the lower surface of the cutting part has a circular protrusion protruding in a circular ring form, and the lower end surface of the hopper has a circular groove to enable insertion of the circular protrusion, and one end portion of the circular groove has a residue discharge part that communicates with the circular groove and discharges waste placed in the circular groove to outside of the circular groove.
11. The juice extractor according to claim 1,
wherein a lower surface of the slicing blade is in parallel to the lower end surface of the hopper.
12. The juice extractor according to claim 2,
wherein the cutting part is detachable.
13. The juice extractor according to claim 1,
further comprising a juice extracting drum coupled to a lower portion of the hopper and accommodating inside thereof the screw that compresses the material for juice extraction; and
a packing ring formed in a up/down symmetrical structure immobilized along an outer edge of the lower end surface of the hopper, and sealing a space between the hopper and the juice extracting drum.
14. The juice extractor according to claim 1,
further comprising a juice extracting drum coupled to a lower portion of the hopper and accommodating inside thereof the screw that compresses the material for juice extraction; and
a release inhibition part for inhibiting coupling between the hopper and the juice extracting drum from being released by a reverse direction rotation of the hopper during the juice extraction.
15. The juice extractor according to claim 1,
wherein the hopper further comprises a bushing part formed on a connecting hole formed at a center of the lower end surface of the hopper; and
a driving force transmission part comprising a coupling part that is inserted into a hole formed inside the bushing part to rotate and has a shaft hole where an upper rotation shaft of the screw is inserted and an upper protrusion part that is formed on an upper end of the coupling part to protrude upwardly of an upper surface of the bushing part to couple the cutting part, wherein a lower surface of the driving force transmission part is formed higher than the lower surface of the bottom surface of the hopper.

16. The juice extractor according to claim 1, further comprising a first inner protrusion that is formed to protrude inwardly on an inner surface of the hopper, and to support the material for juice extraction so as to interact with the chopping blade during a rotation of the cutting part.

17. The juice extractor according to claim 16, wherein a lower end of the first inner protrusion is formed to space apart from an upper portion of the lower end surface of the hopper.

18. The juice extractor according to claim 17, wherein a lower end portion of the first inner protrusion has a penetration groove that penetrates both protruding side surfaces so that the cut material for juice extraction passes through.

19. The juice extractor according to claim 16, wherein at a position where a distal end portion of the slicing blade of the inner side surface of the hopper is located, a second inner protrusion protruding inwardly is formed below the first inner protrusion.

* * * * *